US012169852B2

(12) United States Patent
Yamagishi

(10) Patent No.: US 12,169,852 B2
(45) Date of Patent: *Dec. 17, 2024

(54) RECEPTION APPARATUS, TRANSMISSION APPARATUS, AND DATA PROCESSING METHOD

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,861

(22) Filed: Jun. 24, 2022

(65) Prior Publication Data

US 2022/0335475 A1 Oct. 20, 2022

Related U.S. Application Data

(63) Continuation of application No. 17/092,047, filed on Nov. 6, 2020, now Pat. No. 11,410,199, which is a (Continued)

(30) Foreign Application Priority Data

Jun. 9, 2015 (JP) .................................. 2015-116302

(51) Int. Cl.
  *G06Q 30/00* (2023.01)
  *G06F 13/00* (2006.01)
  (Continued)

(52) U.S. Cl.
  CPC ......... *G06Q 30/0267* (2013.01); *G06F 13/00* (2013.01); *G06Q 30/0261* (2013.01);
  (Continued)

(58) Field of Classification Search
  CPC .......... G06Q 30/0267; G06Q 30/0261; G06Q 30/0269; G06Q 30/0277; G06F 13/00;
  (Continued)

(56) References Cited

U.S. PATENT DOCUMENTS 10,885,555 B2 * 1/2021 Yamagishi .............. H04L 67/06
10,917,475 B2   2/2021 Eyer
  (Continued)

FOREIGN PATENT DOCUMENTS

CA    2 908 242 A1   10/2014
CN    102648609 A    8/2012
  (Continued)

OTHER PUBLICATIONS

"Information technology—Dynamic adaptive streaming over HTTP (DASH)—Part 3: Implementation Guidelines," Technical Report, ISO/IEC TR 23009-3, First Edition, Apr. 15, 2015, (9 pages).

(Continued)

*Primary Examiner* — Meredith A Long
(74) *Attorney, Agent, or Firm* — Oblon, McClelland, Maier & Neustadt, L.L.P.

(57) ABSTRACT

An apparatus and a method by which a content such as an advertisement corresponding to a user at the reception apparatus side can be selectively outputted to the reception apparatus are provided. A transmission apparatus transmits signaling data (MPD) having a user information setting region, a control information file capable of being accessed or generated applying user information-set data generated by a process for the MPD, and a user information-corresponding advertisement capable of being acquired and reproduced on the basis of description data of the control information file. The reception apparatus sets user information to the user information setting region of the MPD, applies the generated user information-set data to acquire a control information (Continued)

file of a user information-corresponding advertisement, applies the description data of the acquired control information file to acquire the user information-corresponding advertisement, and outputs the user information-corresponding advertisement.

16 Claims, 51 Drawing Sheets

Related U.S. Application Data continuation of application No. 15/557,945, filed as application No. PCT/JP2016/062984 on Apr. 26, 2016, now Pat. No. 10,885,555.

(51) Int. Cl.

| | |
|---|---|
| *G06Q 30/0251* | (2023.01) |
| *H04L 67/06* | (2022.01) |
| *H04N 21/2668* | (2011.01) |
| *H04N 21/475* | (2011.01) |
| *H04N 21/482* | (2011.01) |
| *H04N 21/643* | (2011.01) |
| *H04N 21/81* | (2011.01) |
| *H04N 21/845* | (2011.01) |
| *G06Q 30/0241* | (2023.01) |
| *H04L 67/02* | (2022.01) |
| *H04N 21/435* | (2011.01) |
| *H04N 21/45* | (2011.01) |

(52) U.S. Cl.
CPC ......... *G06Q 30/0269* (2013.01); *H04L 67/06* (2013.01); *H04N 21/2668* (2013.01); *H04N 21/4758* (2013.01); *H04N 21/4825* (2013.01); *H04N 21/64322* (2013.01); *H04N 21/812* (2013.01); *H04N 21/8456* (2013.01); *G06Q 30/0277* (2013.01); *H04L 67/02* (2013.01); *H04N 21/435* (2013.01); *H04N 21/45* (2013.01)

(58) Field of Classification Search
CPC ..... H04L 67/06; H04L 67/02; H04N 21/2668; H04N 21/4758; H04N 21/4825; H04N 21/64322; H04N 21/812; H04N 21/8456; H04N 21/435; H04N 21/45
See application file for complete search history.

(56) References Cited

U.S. PATENT DOCUMENTS

| | | | |
|---|---|---|---|
| 10,979,163 B2 | 4/2021 | Kitazato | |
| 11,410,199 B2 * | 8/2022 | Yamagishi | ......... H04N 21/2668 |
| 2008/0127246 A1 | 5/2008 | Sylvain | |
| 2012/0259994 A1 | 10/2012 | Gillies et al. | |
| 2013/0185398 A1 | 7/2013 | Thang et al. | |
| 2014/0101118 A1 | 4/2014 | Dhanapal | |
| 2015/0215369 A1 | 7/2015 | Yamagishi | |
| 2015/0269629 A1 | 9/2015 | Lo et al. | |
| 2016/0057467 A1 | 2/2016 | Yamagishi et al. | |

FOREIGN PATENT DOCUMENTS

| | | |
|---|---|---|
| CN | 104584505 A | 4/2015 |
| JP | 2010-504013 | 2/2010 |
| JP | 2011-87103 A | 4/2011 |
| JP | 2014-057227 | 3/2014 |
| JP | 2014-57227 A | 3/2014 |
| JP | 2014-517558 | 7/2014 |
| WO | WO 2008/032185 A1 | 3/2008 |
| WO | WO 2014/042028 A1 | 3/2014 |
| WO | 2014/171473 A1 | 10/2014 |
| WO | WO2014/171473 | 10/2014 |

OTHER PUBLICATIONS

"Guidelines for Implementation: DASH-IF Interoperability Points," DASH Industry Forum, Version 3.0 (Final Version), Apr. 7, 2015, (22 pages).

International Search Report issued Aug. 9, 2016 in PCT/JP2016/062984 filed Apr. 26, 2016.

Extended European Search Report issued Feb. 26, 2019 in Patent Application No. 16807220.5, 9 pages.

"Guidelines for Implementation: DASH-IF Interoperability Points" DASH Industry Forum, Version 3.0 (Final Version), XP55333561, 2015, 153 pages (reference previously filed, submitting complete copy).

"Information technology—Dynamic adaptive Streaming over HTTP (DASH)—Part 3: Implementation guidelines" ISO/IEC JTC 1/SC 29 N, PDTR 23009-3, XP030021949, 2015, 62 pages.

Vetro, A. "The MPEG-DASH Standard for Multimedia Streaming Over the Internet" Industry and Standards, http://ieeexplore.ieee.org/ielx5/93/6077856/06077864.pdf?tp=&arnumber=6077864&isnumber=6077856, XP055343912, 2011, 6 pages.

Japanese Office Action Issued in Application JP2017-523151 on Jun. 9, 2020, (4pages).

Information technology—Dynamic adaptive streaming http (DASH)—Part 3: Implementation Guidelines, ISO/IEC TR 23009-3, First edition, ISO pp. 29-32, Apr. 15, 2015 (10 pages).

Guidelines for Implementation: DASH-IF Interoperability Points, DASH Industry Forum, Version 3.0 (Final Version), pp. 70-90 Apr. 15, 2015 (23 pages).

* cited by examiner

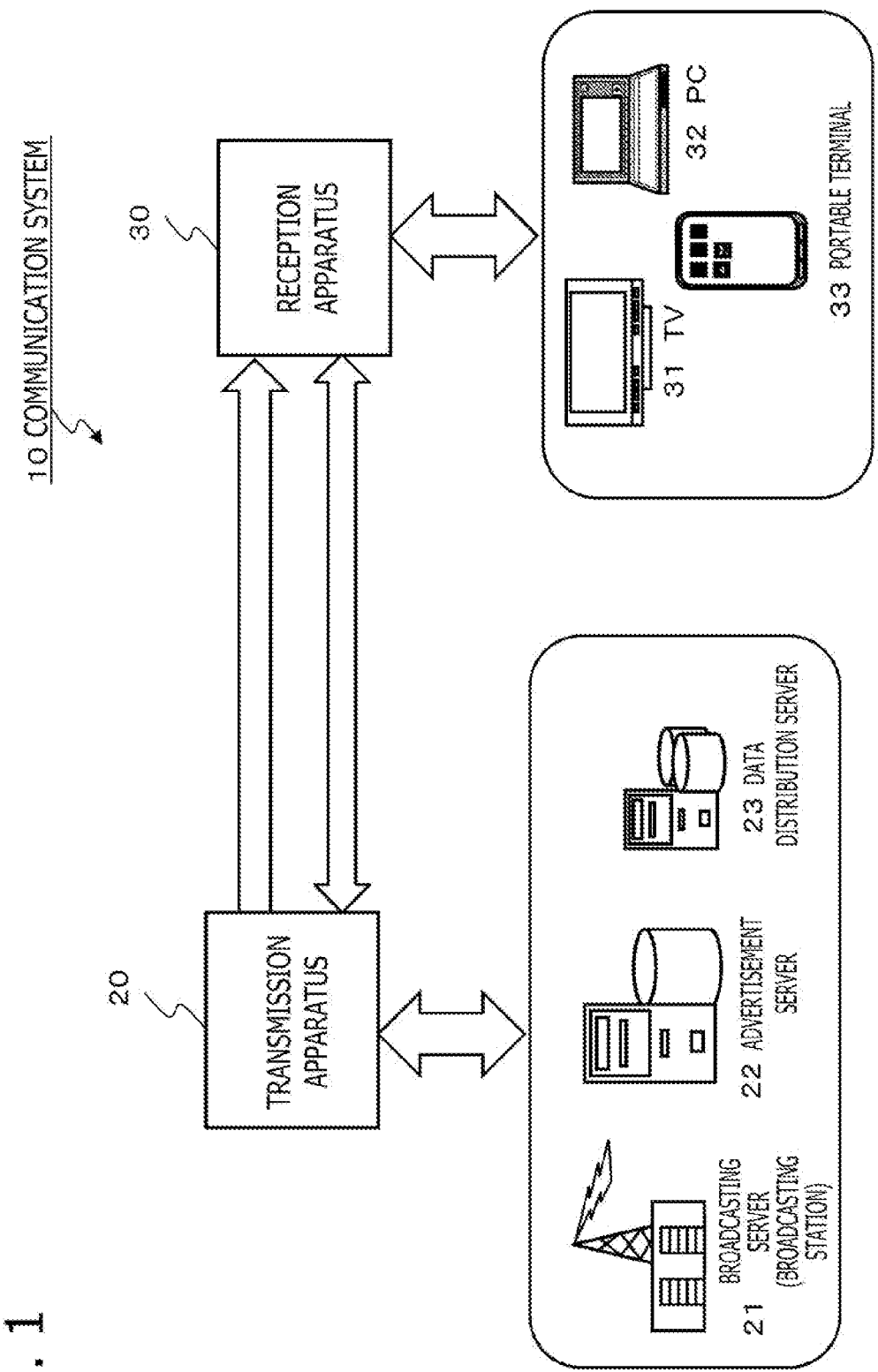

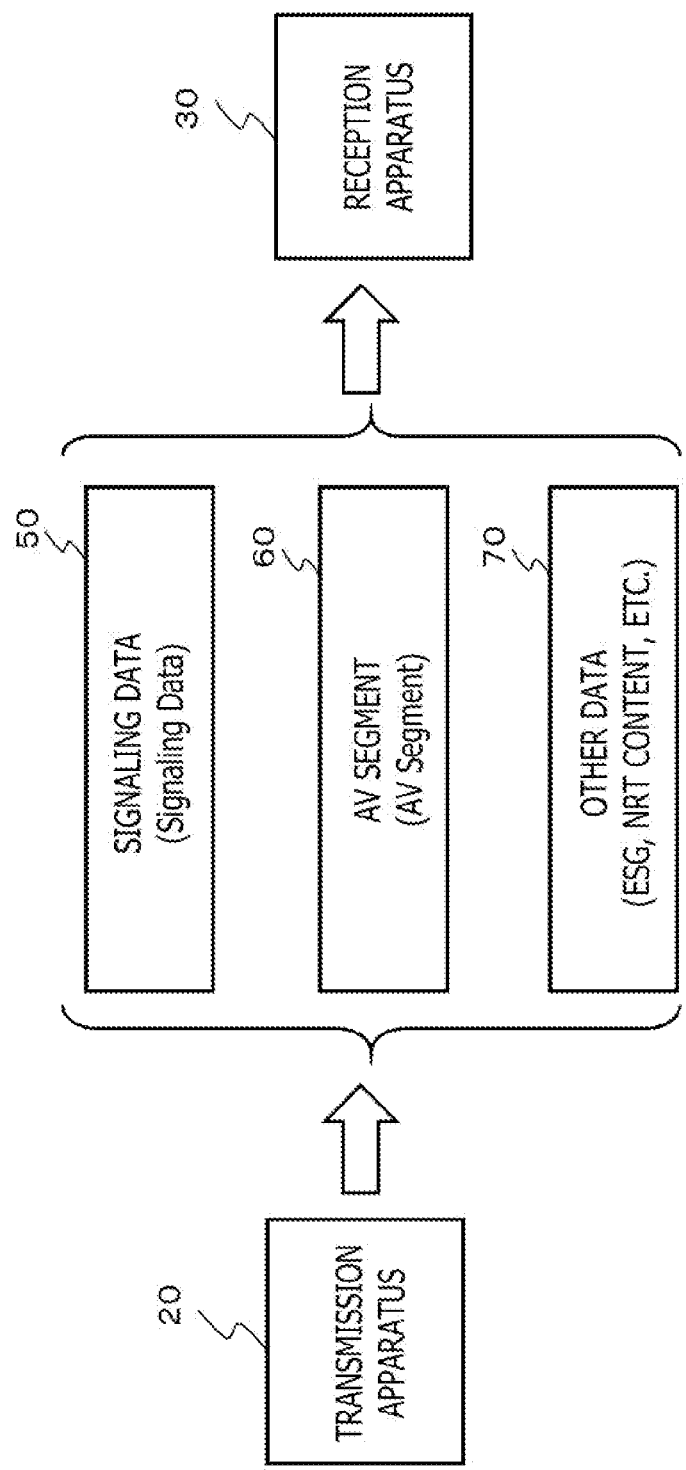

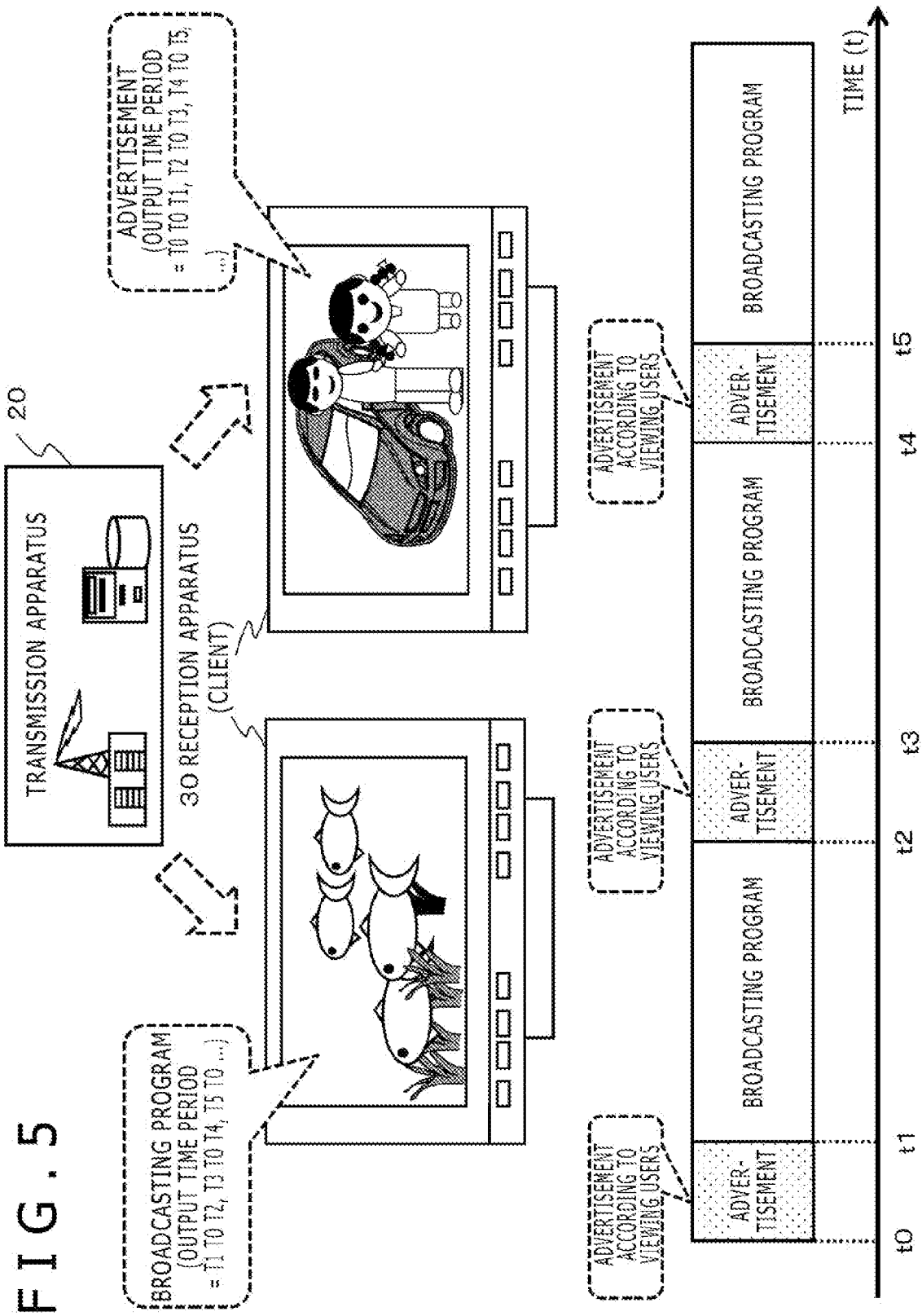

FIG. 6

(A) EXAMPLE OF ADVERTISEMENT SETTING BY AGE

| | |
|---|---|
| AGE (age) = EQUAL TO OR OLDER THAN 20 YEARS OLD | ADVERTISEMENT OF ALCOHOLIC BEVERAGES (ALCOHOLIC BEVERAGES) |
| AGE (age) = EQUAL TO OR YOUNGER THAN 15 YEARS OLD | ADVERTISEMENT OF TOYS |

(B) EXAMPLE OF ADVERTISEMENT SETTING BY RESIDENCE

| | |
|---|---|
| ADDRESS (Location) = ALASKA | ADVERTISEMENT OF HEATING EQUIPMENT |
| ADDRESS (Location) = HAWAII | ADVERTISEMENT OF AIR CONDITIONERS |

(C) EXAMPLE OF ADVERTISEMENT SETTING BY AGE AND BY RESIDENCE

| | | |
|---|---|---|
| AGE (age) = EQUAL TO OR OLDER THAN 18 YEARS OLD | ADDRESS (Location) = NEW YORK | ADVERTISEMENT OF RESTAURANTS IN NEW YORK |
| AGE (age) = EQUAL TO OR YOUNGER THAN 15 YEARS OLD | ADDRESS (Location) = CALIFORNIA | ADVERTISEMENT OF TOY STORES IN CALIFORNIA |

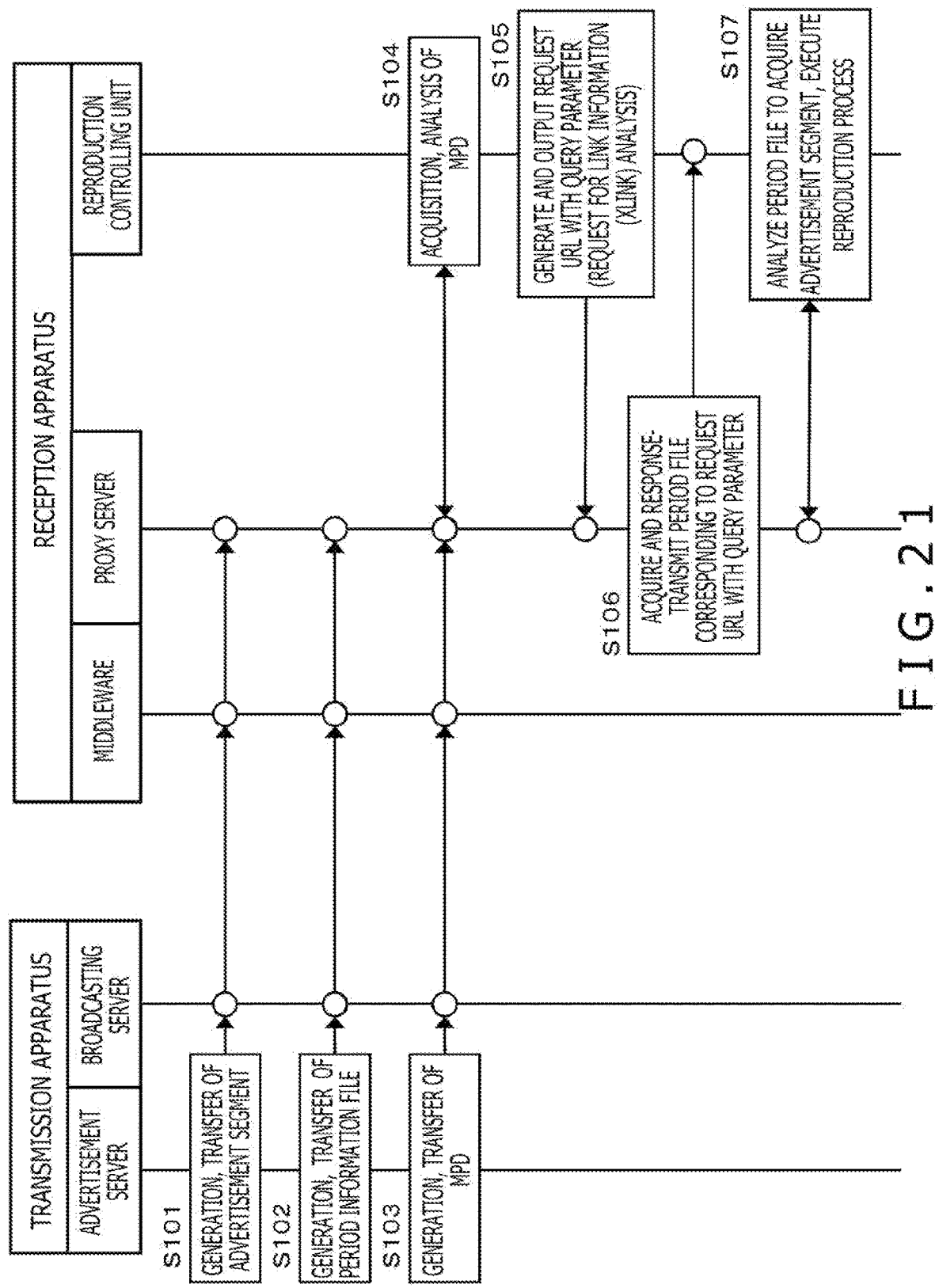
F I G. 2 1

FIG. 22

| CORRESPONDENCE TABLE OF PERIOD (PERIOD) INFORMATION FILE - URL WITH QUERY PARAMETER | |
|---|---|
| (A) URL-1 OF PERIOD (PERIOD) INFORMATION FILE (EXAMPLE: http://a.com/period-1.xml) | |
| (a1) | URL-11 OF MPD/Period/@xlink:href (EXAMPLE: http://a.com/xlinkResolver?age=child&location=CA) |
| (a2) | URL-12 OF MPD/Period/@xlink:href (EXAMPLE: http://a.com/xlinkResolver?age=child&location=NY) |
| (B) URL-2 OF PERIOD (PERIOD) INFORMATION FILE (EXAMPLE: http://a.com/period-2.xml) | |
| (b1) | URL-21 OF MPD/Period/@xlink:href (EXAMPLE: http://a.com/xlinkResolver?age=adult&location=MA) |
| (b2) | URL-22 OF MPD/Period/@xlink:href (EXAMPLE: http://a.com/xlinkResolver?age=adult&location=MS) |
| (b3) | URL-23 OF MPD/Period/@xlink:href (EXAMPLE: http://a.com/xlinkResolver?age=adult&location=MD) |

FIG. 23

```
<PeriodResolvingTable>
<PeriodToXLink id=1>
<PeriodFileURL>http://a.com/period-1.xml</PeriodFileURL>
<XLinkURL>http://a.com/xlinkResolver?age=child&location=CA</XLinkURL>
<XLinkURL>http://a.com/xlinkResolver?age=child&location=NY</XLinkURL>
</PeriodToXLink>
<PeriodToXLink id=2>
<PeriodFileURL>http://a.com/period-2.xml</PeriodFileURL>
<XLinkURL>http://a.com/xlinkResolver?age=adult&location=MA</XLinkURL>
<XLinkURL>http://a.com/xlinkResolver?age=adult&location=MS</XLinkURL>
<XLinkURL>http://a.com/xlinkResolver?age=adult&location=MD</XLinkURL>
</PeriodToXLink>
</PeriodResolvingTable>
```

FIG. 24

| CORRESPONDENCE TABLE OF PERIOD (PERIOD) INFORMATION FILE - QUERY PARAMETER VALUE | |
|---|---|
| (A) URL-1 OF PERIOD (PERIOD) INFORMATION FILE (EXAMPLE: http://a.com/period-1.xml) | |
| (a1) | VALUE OF PARAMETER (EXAMPLE: groupId OR THE LIKE) DESIGNATED BY MPD/Period/@xlink:href, PART 1 (EXAMPLE: groupId="123") |
| (a2) | VALUE OF PARAMETER (EXAMPLE: groupId OR THE LIKE) DESIGNATED BY MPD/Period/@xlink:href, PART 2 (EXAMPLE: groupId="456") |
| (B) URL-2 OF PERIOD (PERIOD) INFORMATION FILE (EXAMPLE: http://a.com/period-2.xml) | |
| (b1) | VALUE OF PARAMETER (EXAMPLE: groupId OR THE LIKE) DESIGNATED BY MPD/Period/@xlink:href, PART 3 (EXAMPLE: groupId="789") |
| (b2) | VALUE OF PARAMETER (EXAMPLE: groupId OR THE LIKE) DESIGNATED BY MPD/Period/@xlink:href, PART 4 (EXAMPLE: groupId="135") |
| (b3) | VALUE OF PARAMETER (EXAMPLE: groupId OR THE LIKE) DESIGNATED BY MPD/Period/@xlink:href, PART 5 (EXAMPLE: groupId="246") |

FIG. 25

```
<PeriodResolvingTable>
  <PeriodToXLink id=1>
    <PeriodFileURL>http://a.com/period-1.xml</PeriodFileURL>
    <ParameterNameValuePair> groupId='123' </ParameterNameValuePair>
    <ParameterNameValuePair> groupId='456' </ParameterNameValuePair>
  </PeriodToXLink>
  <PeriodToXLink id=2>
    <PeriodFileURL>http://a.com/period-2.xml</PeriodFileURL>
    <ParameterNameValuePair> groupId='789' </ParameterNameValuePair>
    <ParameterNameValuePair> groupId='135' </ParameterNameValuePair>
    <ParameterNameValuePair> groupId='246' </ParameterNameValuePair>
  </PeriodToXLink>
</PeriodResolvingTable>
```

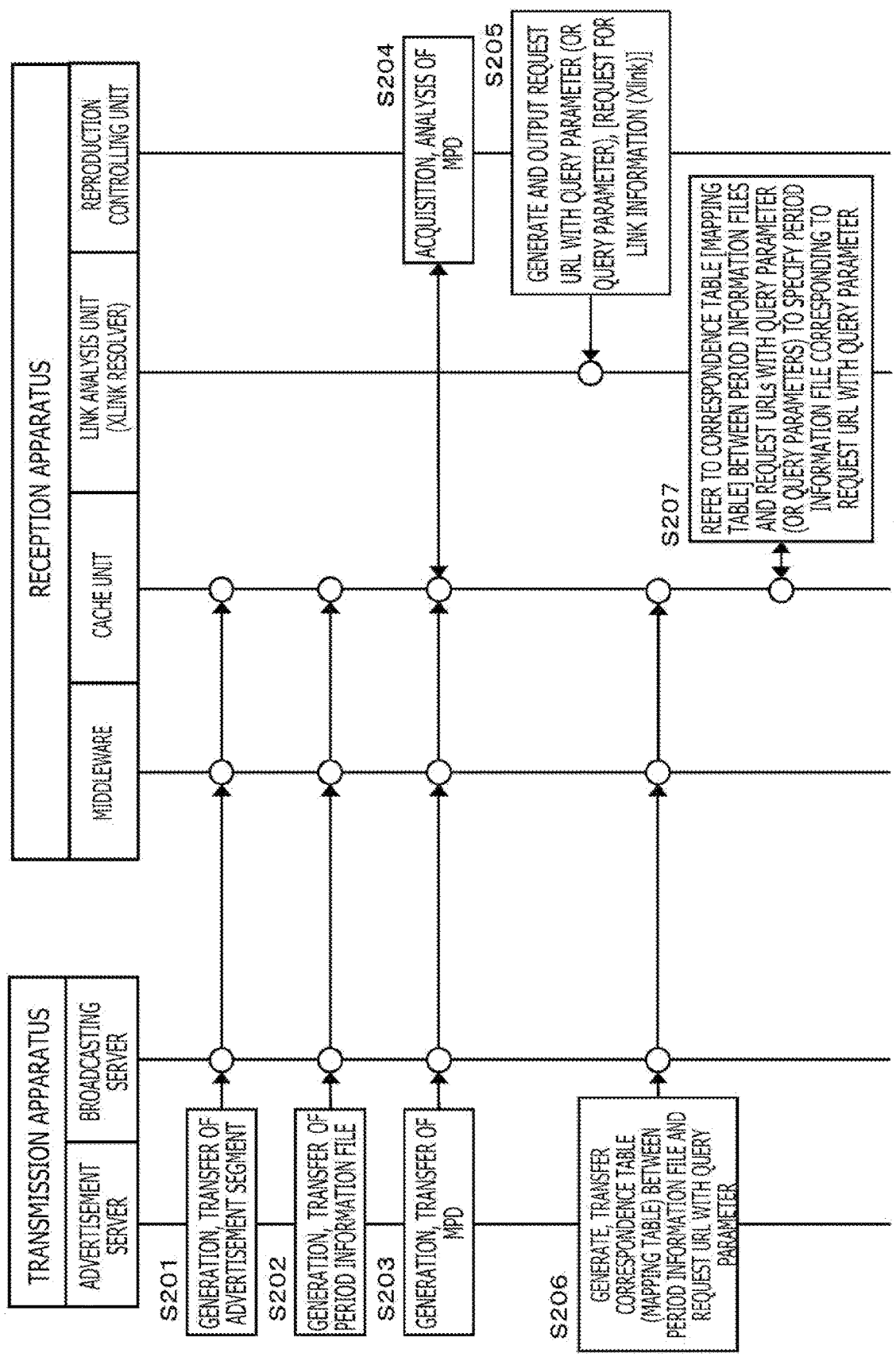
F I G. 26

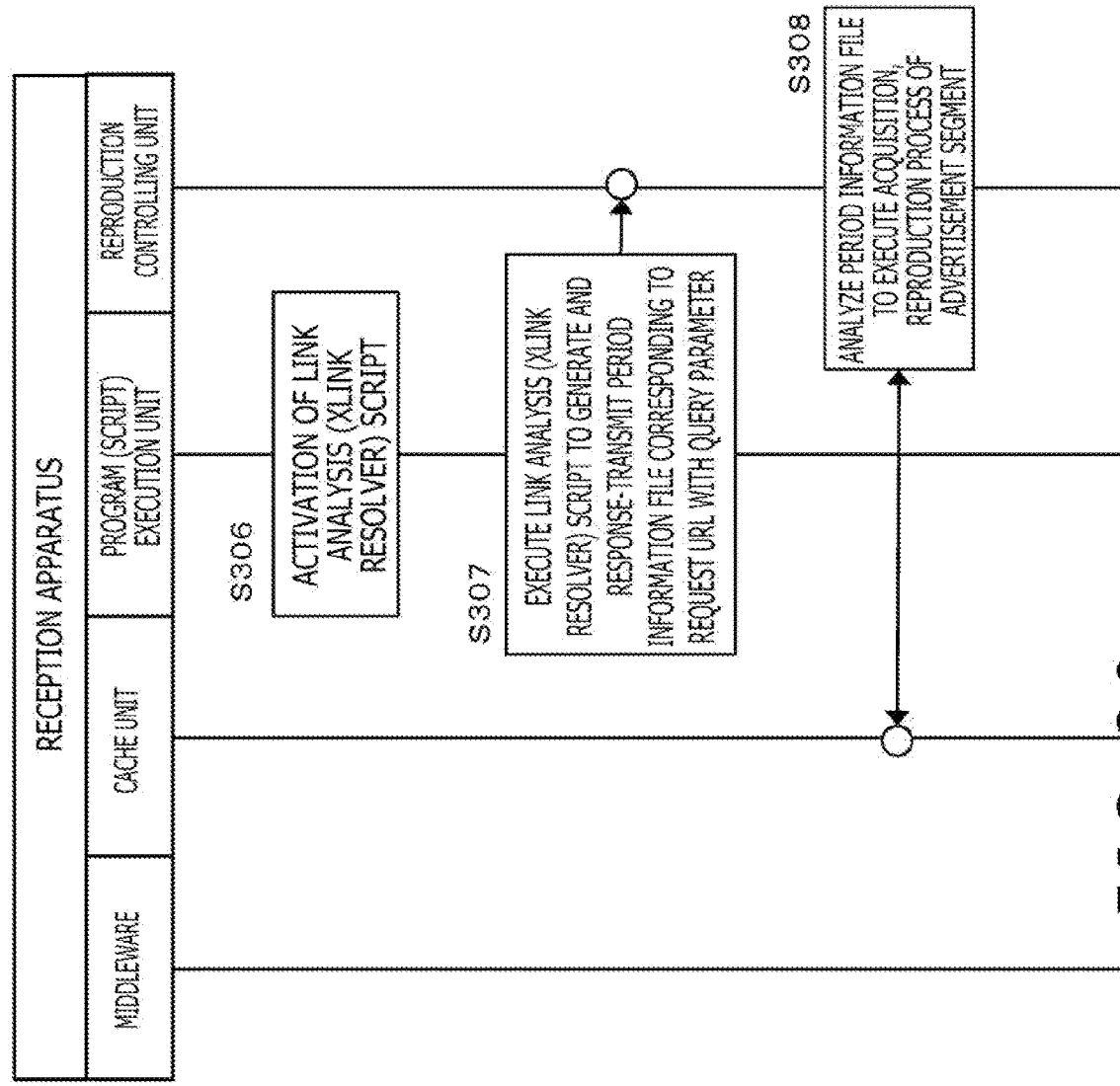
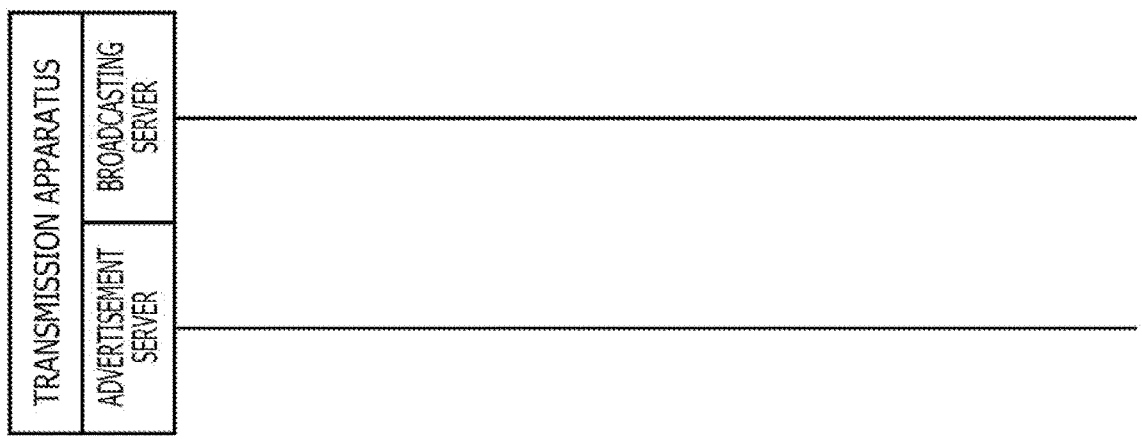
FIG. 29

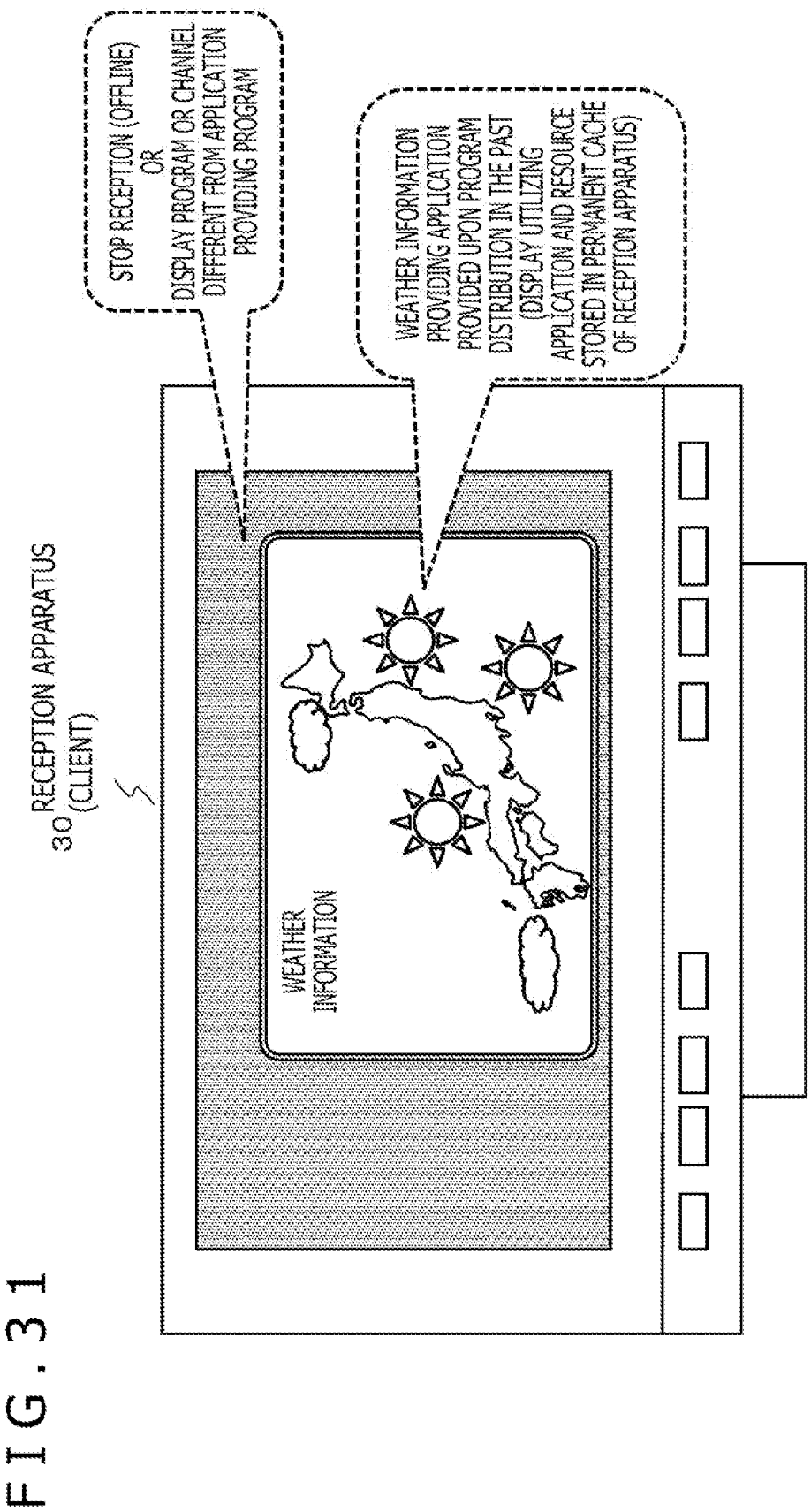

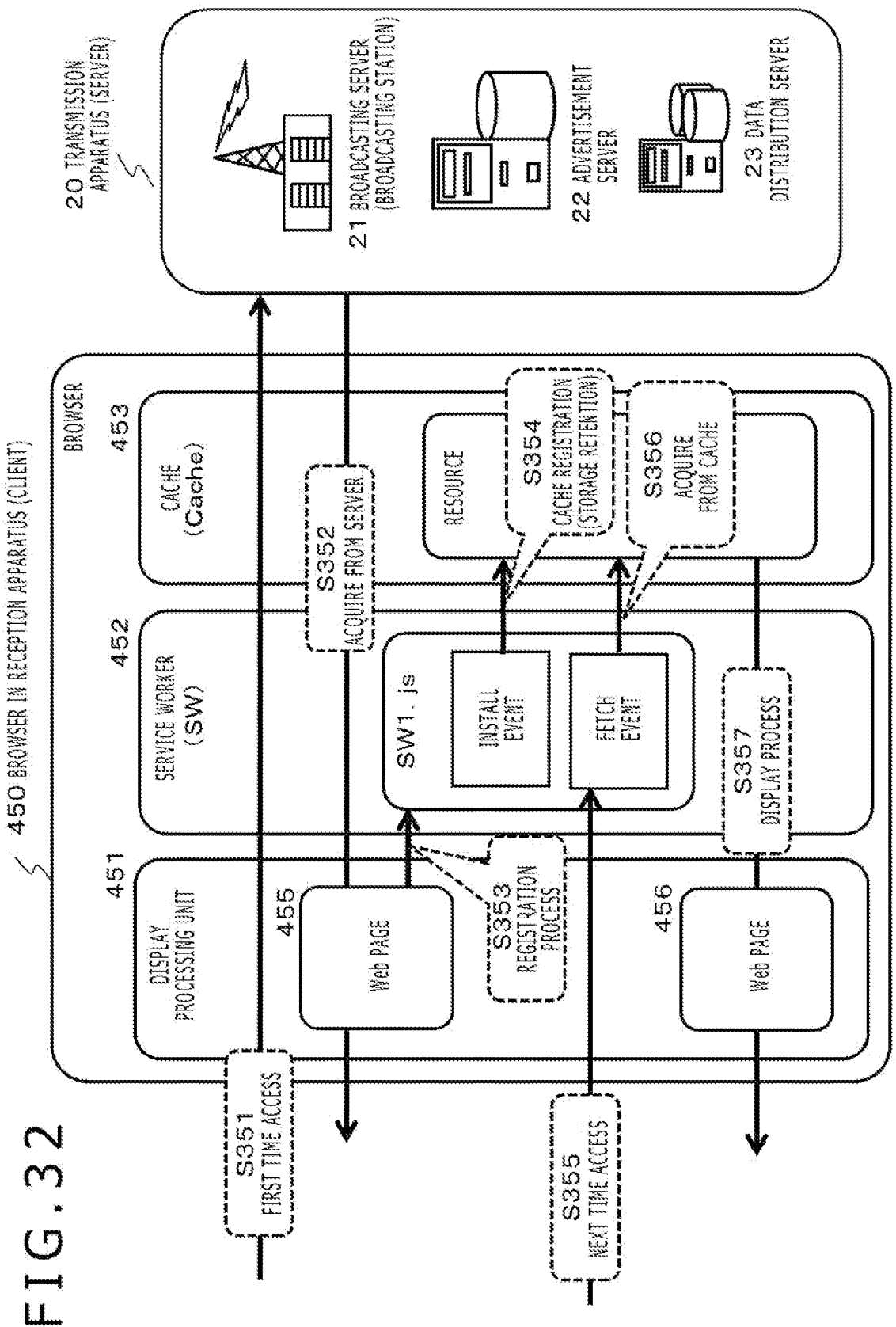

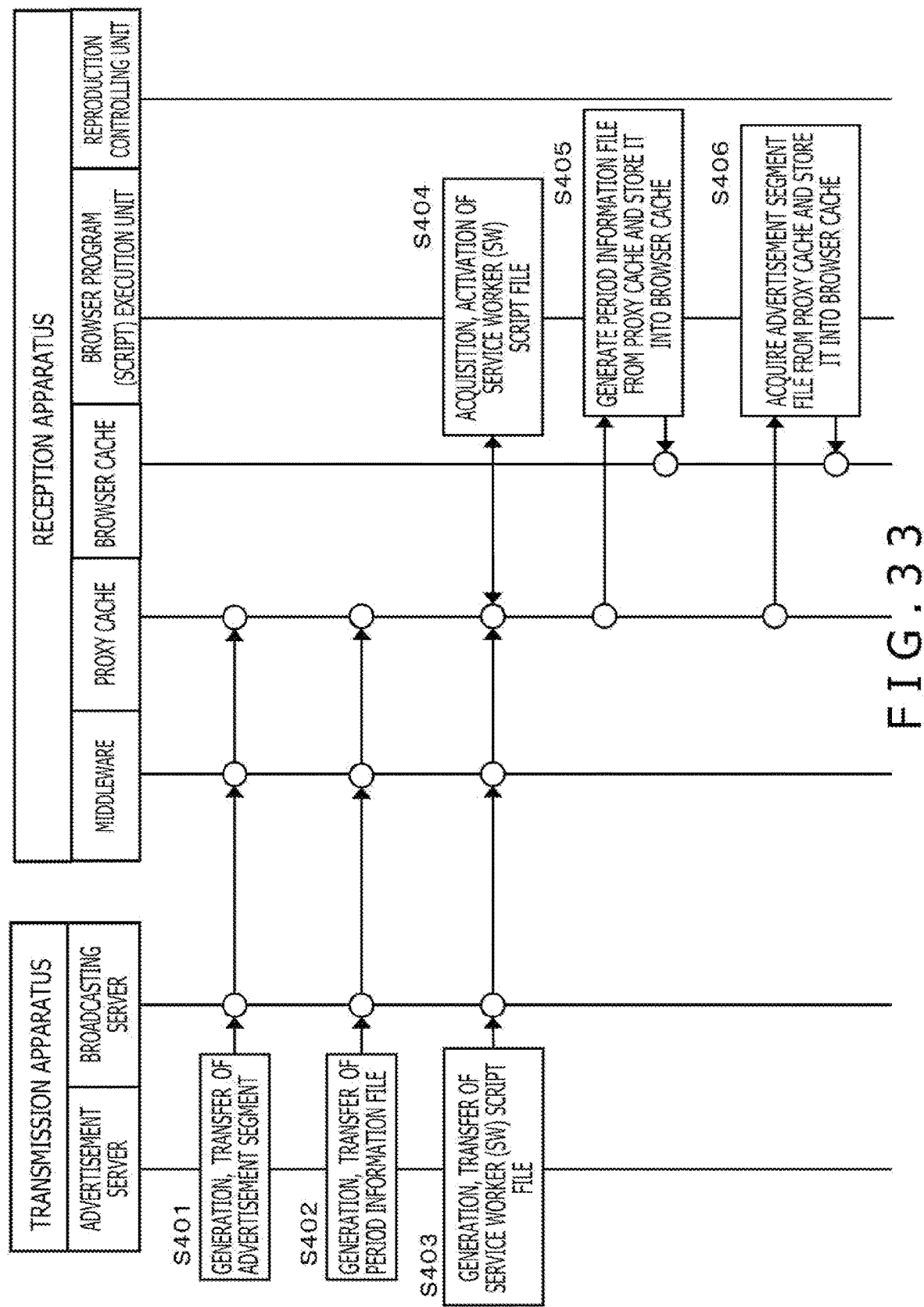
F I G. 3 3

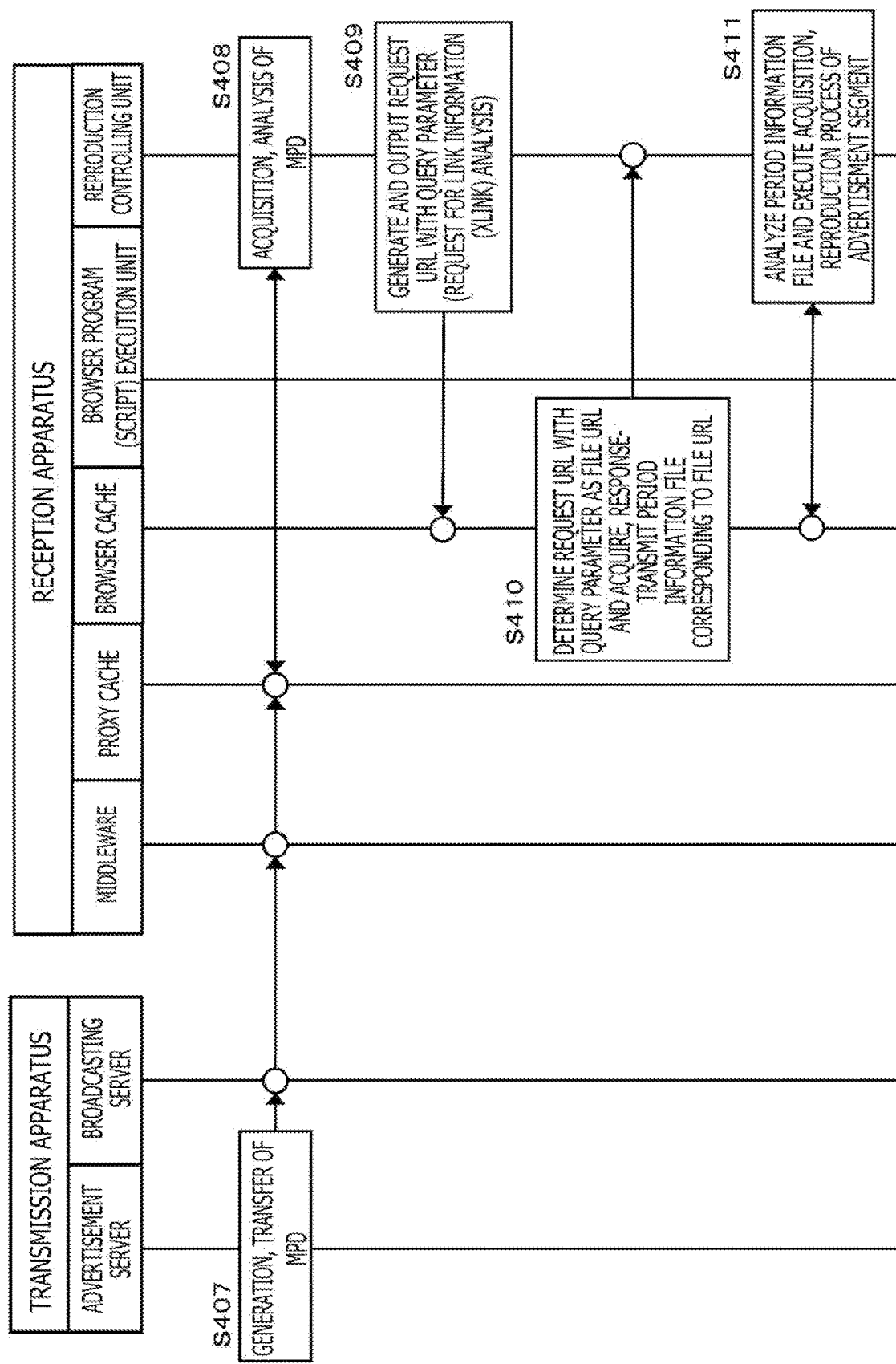
F I G. 34

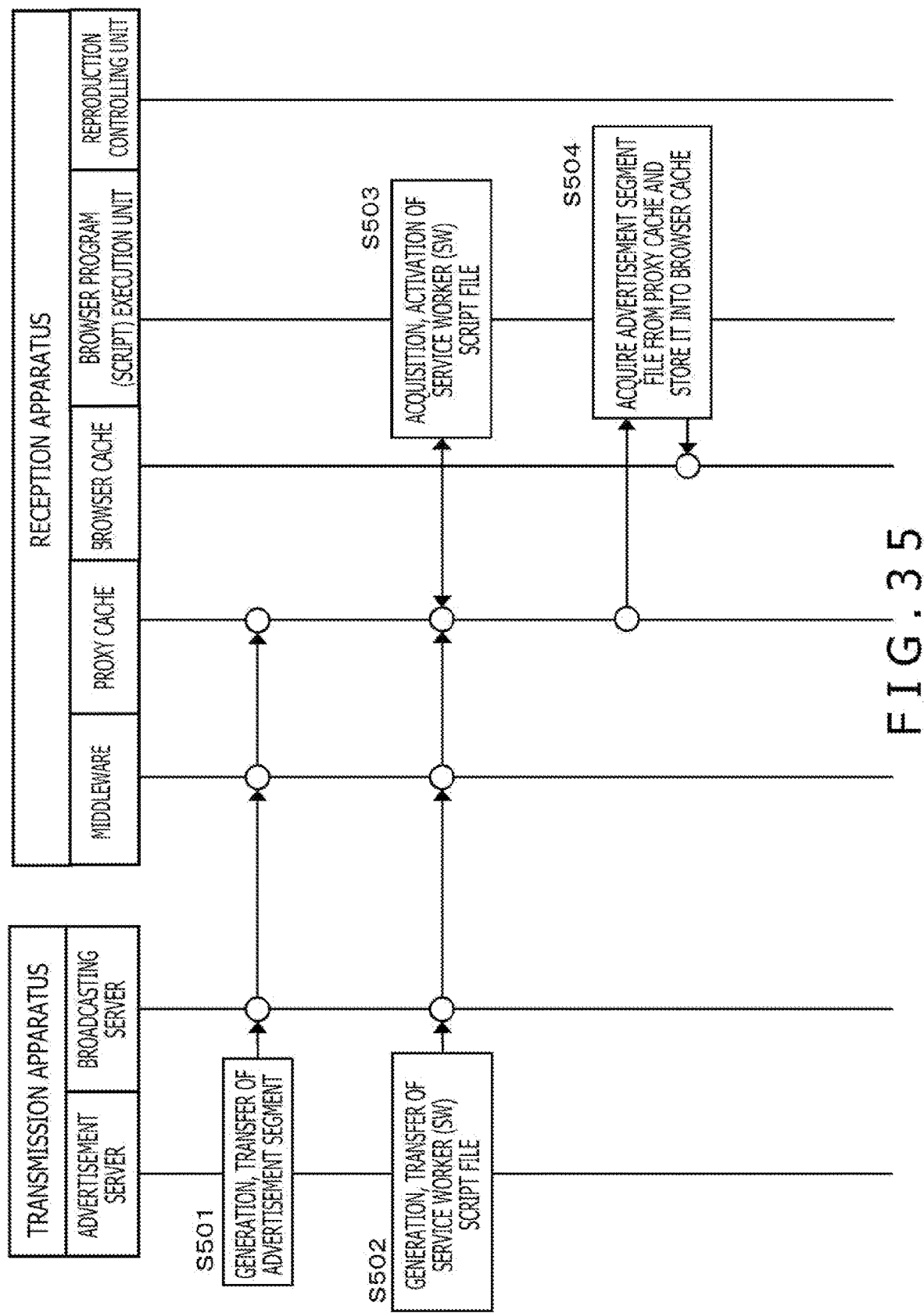
F I G . 3 5

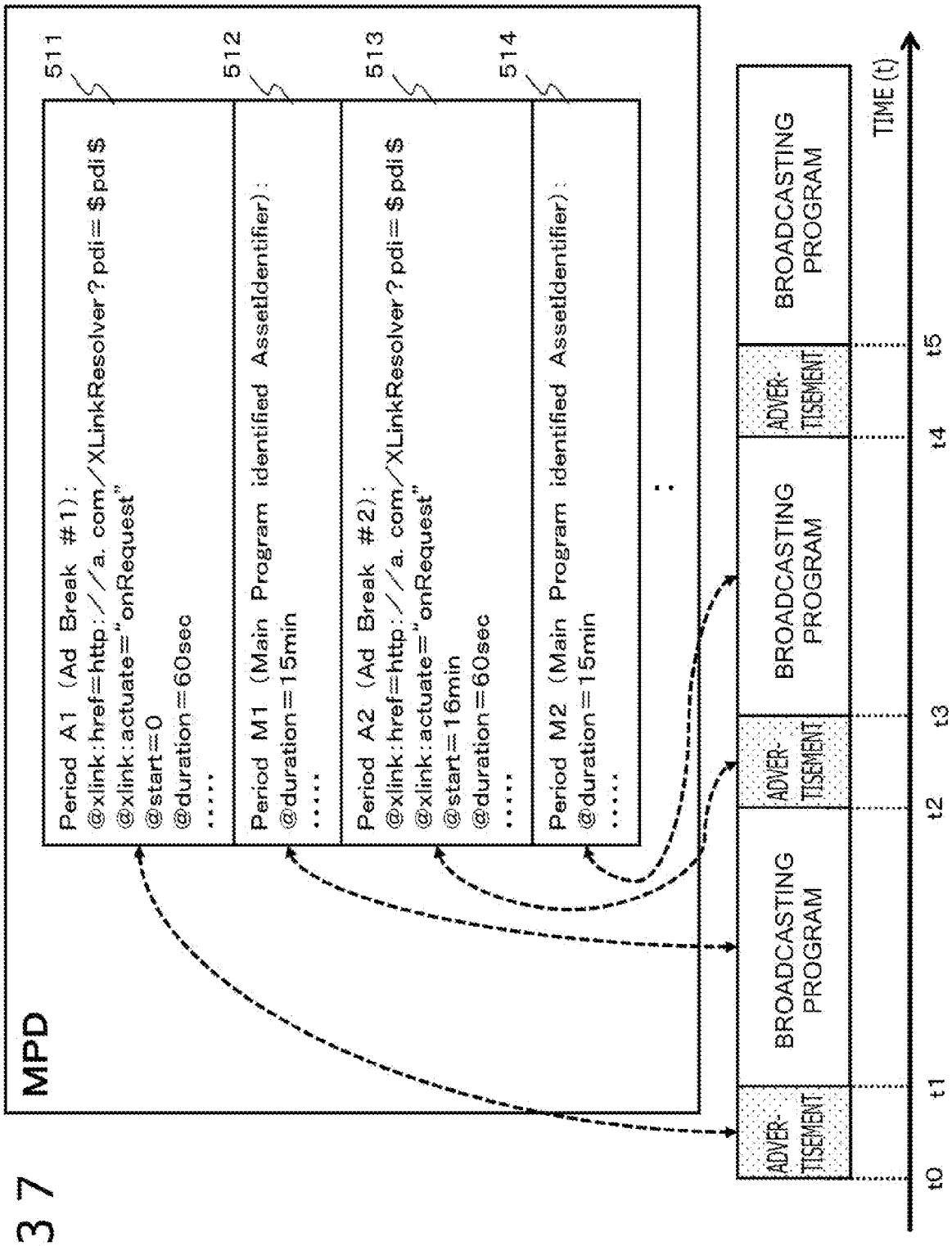

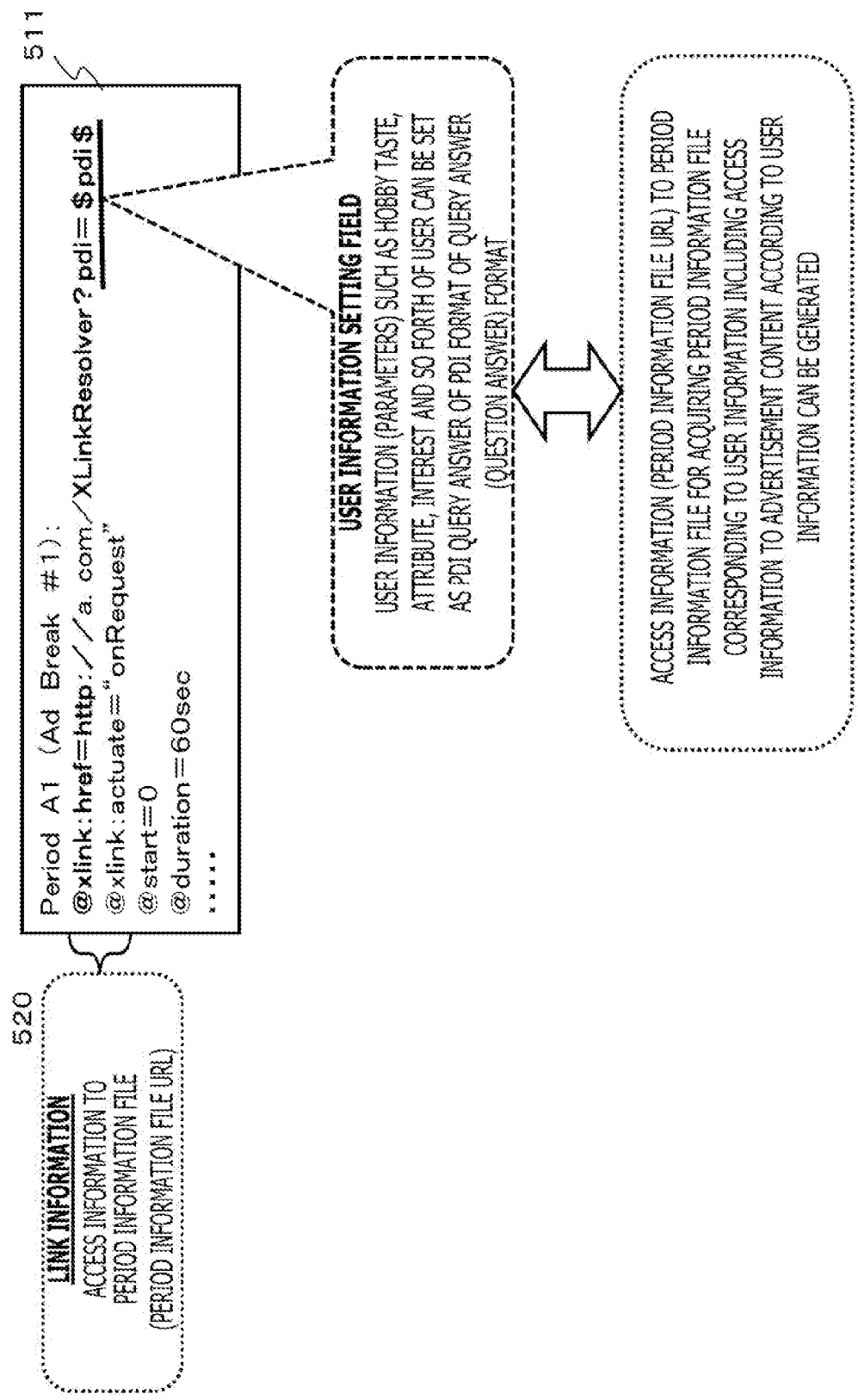

FIG. 39

| CORRESPONDENCE TABLE OF PERIOD (PERIOD) INFORMATION FILE - PDI INSTANCE |||
|---|---|---|
| (A) URL-1 OF PERIOD (PERIOD) INFORMATION FILE (EXAMPLE: http://a.com/period-1.xml) |||
| (a1) | PDI INSTANCE - PART 1 (EXAMPLE):<br><PDITable ...><br>  <QIAType @id='123' ... ><br>    <Q ... ><QText...>How old are you?</QText></Q><br>    <A @answer='35' ... /><br>  </QIAType><br></PDITable>) ||
| (a2) | PDI INSTANCE - PART 2 (EXAMPLE):<br><PDITable ...><br>  <QBAType @id='456' ... ><br>    <Q><QText>Are you male?</QText></Q><br>    <A @answer='true'/><br>  </QBAType><br></PDITable>) ||

FIG. 40

| (B) URL-2 OF PERIOD (PERIOD) INFORMATION FILE (EXAMPLE: http://a.com/period-2.xml) |
|---|

CORRESPONDENCE TABLE OF PERIOD (PERIOD) INFORMATION FILE - PDI INSTANCE

| | |
|---|---|
| (b1) | PDI INSTANCE - PART 3 (EXAMPLE:<br>\<PDITable ...\><br>\<QSAType @id='789' ... \><br>\<Q ... \><br>\<QText ...\>Which sport do you like best?\</QText\><br>\<Selection selectionId='1'\>Baseball\</Selection\><br>\<Selection selectionId='2'\>Basketball\</Selection\><br>\<Selection selectionId='3'\>Soccer\</Selection\><br>\</Q\><br>\<A @answer='3' ... /\><br>\<QSAType\><br>\</PDITable\>) |
| (b2) | PDI INSTANCE - PART 4 (EXAMPLE:<br>\<PDITable ...\><br>\<QTAType @id='135' ... \><br>\<Q ... \><br>\<QText ...\>What is your favorite keyword you're interested in?\</QText\>\</Q\><br>\<A @answer='MARS' ... /\><br>\<QTAType\><br>\</PDITable\>) |
| (b3) | PDI INSTANCE - PART 5 (EXAMPLE:<br>\<PDITable ...\><br>\<QBAType @id='246' ... \><br>\<Q\>\<QText\>Are you retired?\</QText\>\</Q\><br>\<A @answer='true'/\><br>\<QBAType\><br>\</PDITable\>) |

```
<PeriodResolvingTable>
  <PeriodToXlink id='1'>
    <PeriodFileURL>http://a.com/period-1.xml</PeriodFileURL>
    <XLinkURL><![CDATA[<PDITable ...><QIAType @id='123' ...><Q ...><QText ...>How old are you?</QText></Q><A @answer='35' .../>
    </QIATtype></PDITable>]]></XLinkURL>
    <XLinkURL><![CDATA[<QBAType @id='456' ...><Q><QText>Are you male?</QText></Q><A @answer='true'/></QBAType>]]></XLinkURL>
  </PeriodToXlink>
  <PeriodToXlink id='2'>
    <PeriodFileURL>http://a.com/period-2.xml</PeriodFileURL>
    <XLinkURL><![CDATA[<PDITable ...><QSAType @id='789' ...><Q ...><QText ...>Which sport do you like best?</QText><Selection
selectionId='1'>Baseball</Selection><Selection selectionId='2'>Basketball</Selection><Selection selectionId='3'>Soccer</Selection></Q><A @answer='3'...
/></QSAType></PDITable>]]></XLinkURL>
    <XLinkURL><![CDATA[<PDITable ...><QTAType @id='135' ...><Q ...><QText ...>What is your favorite keyword you're interested in<QText></Q><A
@answer='MARS' .../></QTAType></PDITable>]]></XLinkURL>
    <XLinkURL><![CDATA[<PDITable ...><QBAType @id='246' ...><Q><QText>Are you retired?</QText></Q><A
@answer='true'/></QBAType></PDITable>]]></XLinkURL>
  </PeriodToXlink>
</PeriodResolvingTable>
```

F I G. 4 1

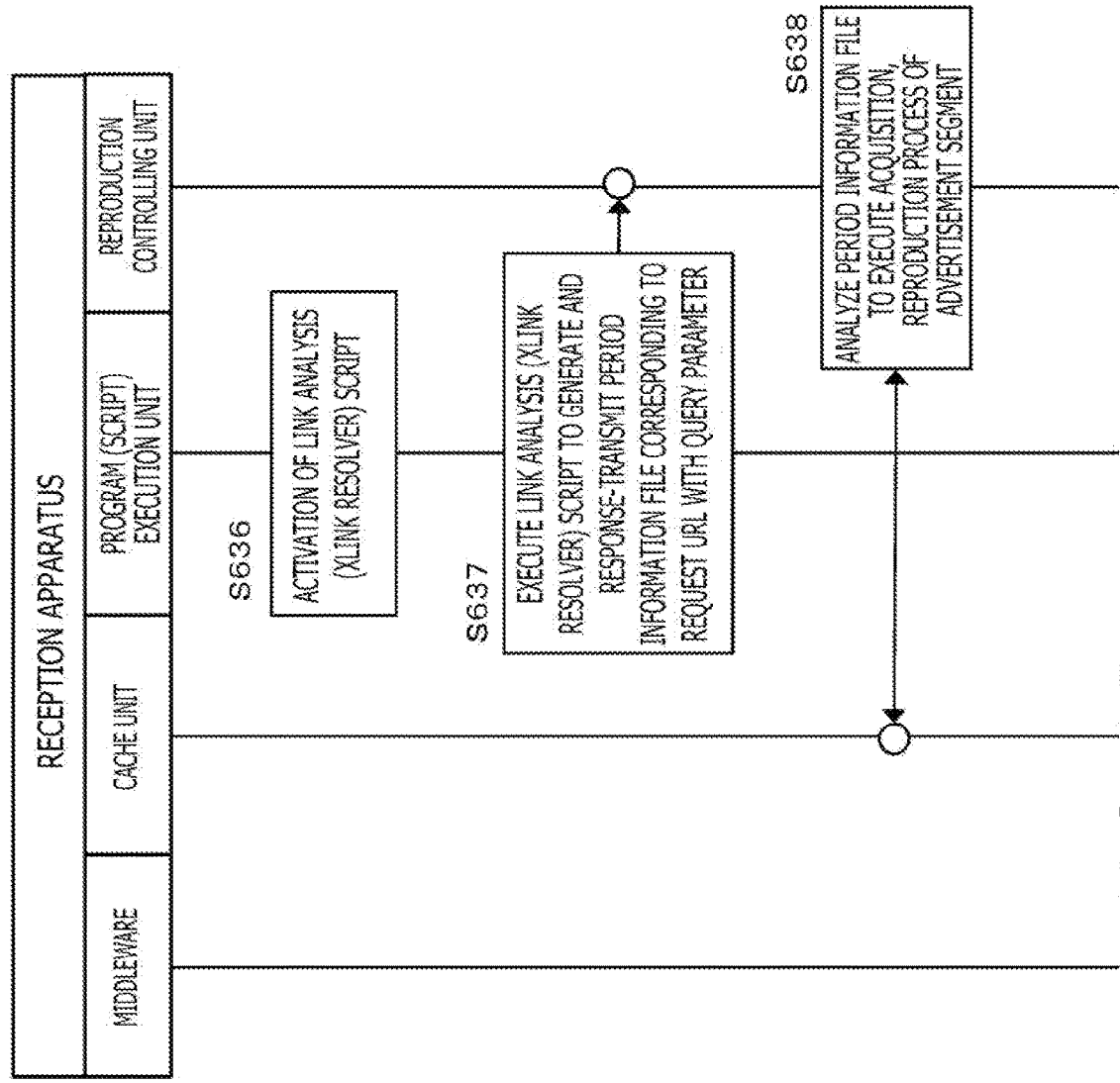
F I G. 4 5

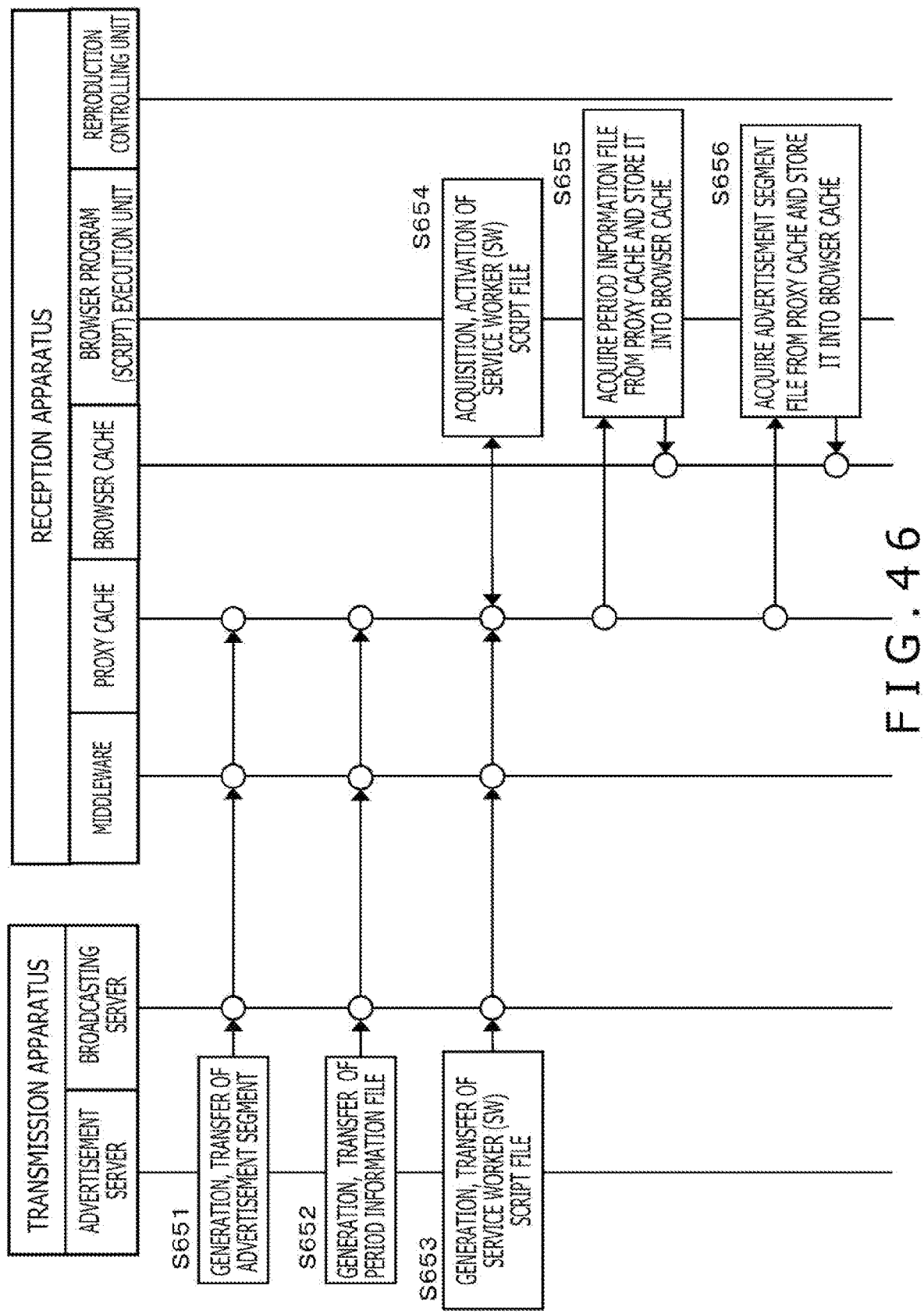
F I G. 46

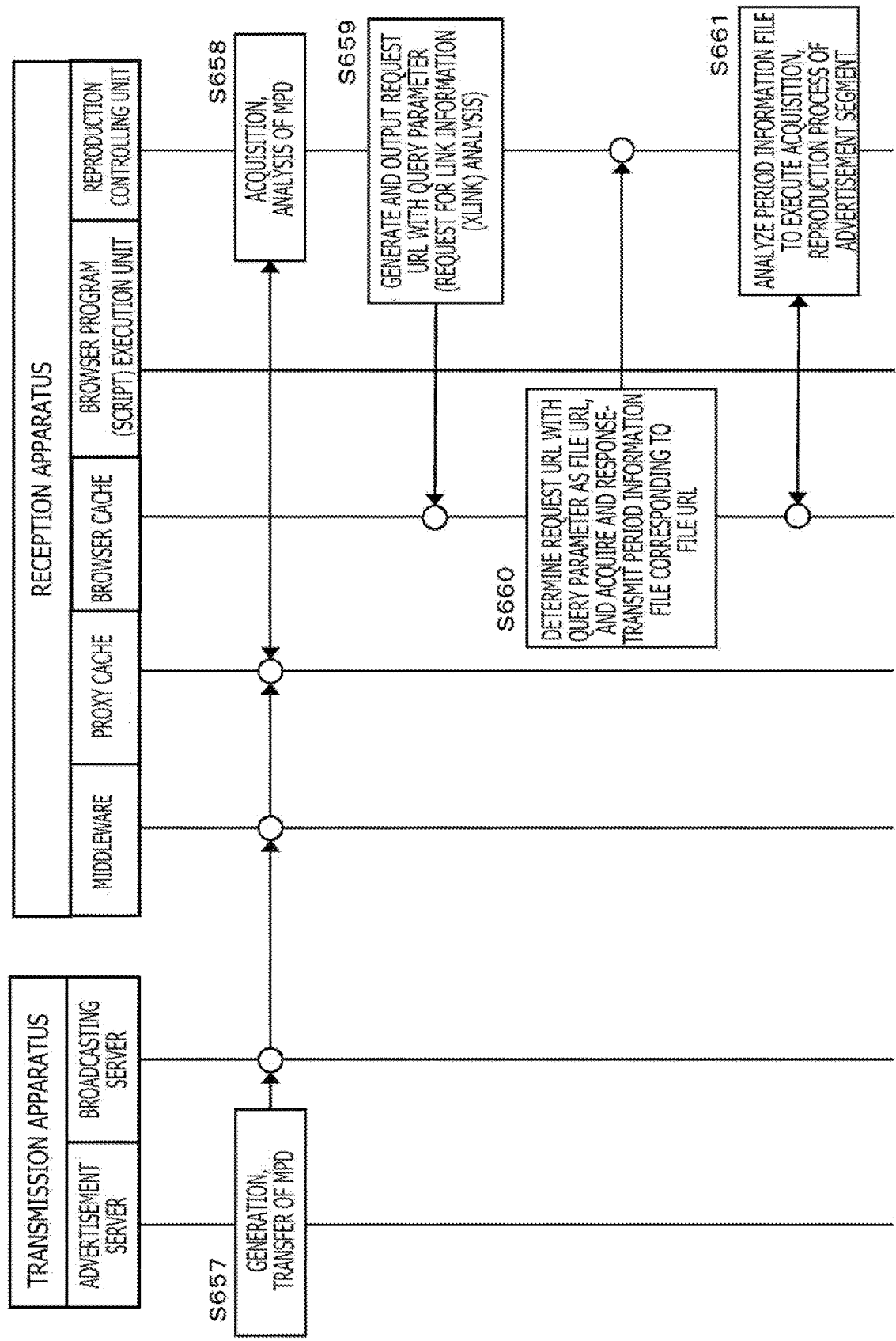
F I G. 4 7

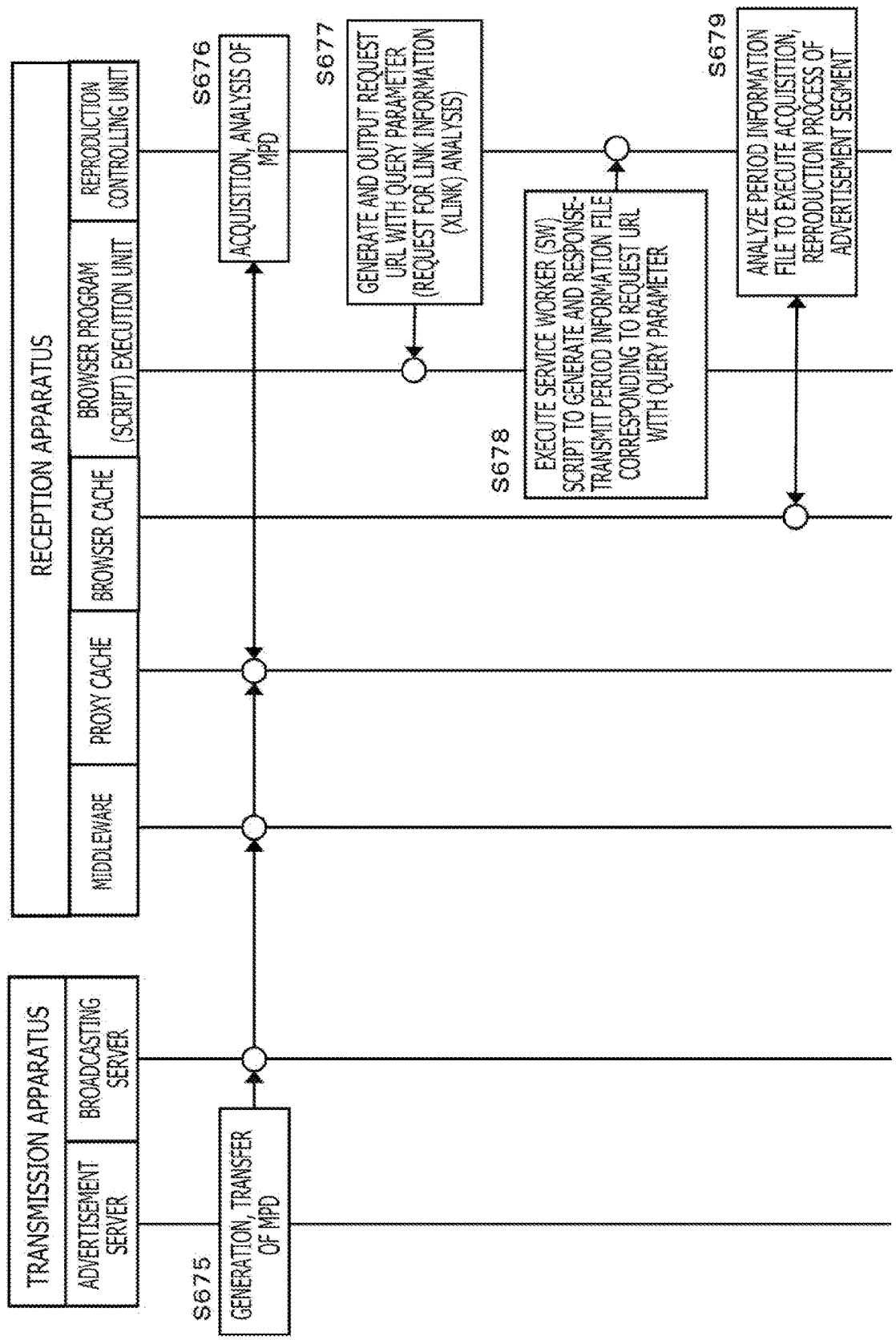
F I G. 49

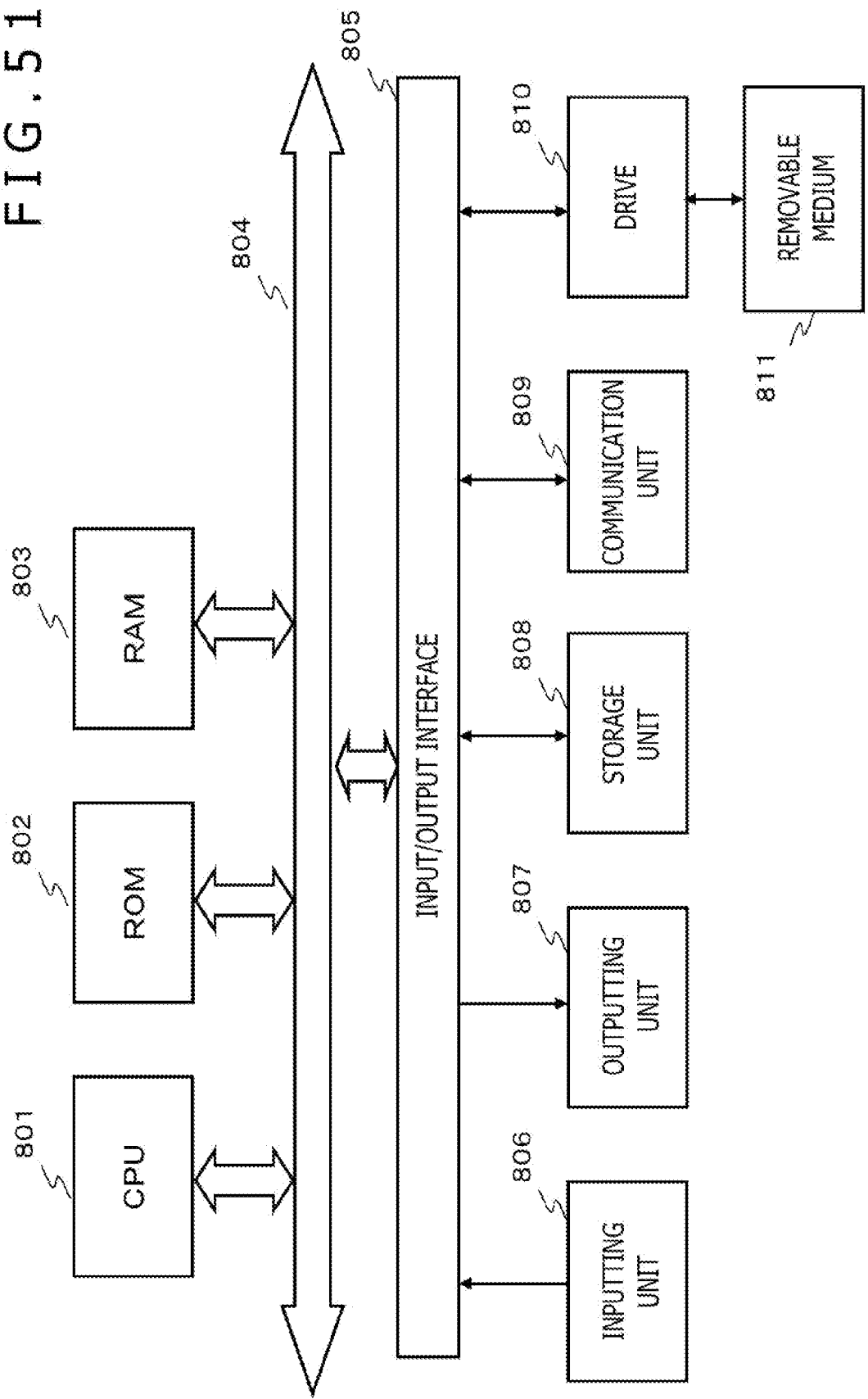

RECEPTION APPARATUS, TRANSMISSION APPARATUS, AND DATA PROCESSING METHOD

CROSS-REFERENCE TO RELATED APPLICATIONS

This application is a continuation of U.S. Ser. No. 17/092,047, filed on Nov. 6, 2020, which is a continuation of U.S. Ser. No. 15/557,945, filed on Sep. 13, 2017, which is incorporated by reference. U.S. Ser. No. 15/557,945 is a National Stage of PCT/JP2016/062984, filed on Apr. 26, 2016, and claims the benefit of priority under 35 U.S.C. § 119 of Japanese Application No. 2015-116302, filed Jun. 9, 2015.

TECHNICAL FIELD

The present disclosure relates to a reception apparatus, a transmission apparatus, and a data processing method. More particularly, the present disclosure relates to a reception apparatus and a transmission apparatus that execute reception or transmission of data, for example, through a broadcasting wave or a network and a data processing method corresponding to communication data.

BACKGROUND ART

OTT (Over The Top) is available as a data distribution method that makes it possible to distribute a content of image data, sound data and so forth irrespective of the service form of various telecommunication carriers. A distribution content by OTT is called OTT content, and a distribution service of image (video) data utilizing OTT is called OTT video or OTT-V (Over The Top Video).

As a data streaming distribution standard in accordance with OTT-V, a DASH (Dynamic Adaptive Streaming over HTTP) is available. DASH is a standard for adaptive (adaptive) streaming distribution that uses a streaming protocol based on the HTTP (HyperText Transfer Protocol).

In adaptive (adaptive) streaming, a content distribution server such as a broadcasting station creates segmented files of a movie content of a plurality of bit rates and a manifest file that describes attribute information or a URL (Uniform Resource Locator) of the segmented files and presents the created files to various clients, who become data distribution destinations, in order to make it possible for the clients to reproduce the content.

Each client will acquire the manifest file from a server, select an optimum bit rate content in accordance with the size of a display unit of an apparatus of the client itself or an available communication band, and receive and reproduce the selected content. Also it is possible to dynamically change the bit rate in response to a variation of the network band, and at the client side, it is possible to switchably receive an optimum content in response to a situation at any time and movie content reproduction that reduces occurrences of video interruption is implemented. It is to be noted that adaptive (adaptive) streaming is described, for example, in PTL 1 (JP 2011-087103A).

Development and standardization of unidirectional communication by a broadcasting wave or the like and bidirectional communication through a network such as the Internet from a transmission apparatus such as a broadcasting station or some other content server to a reception apparatus such as a television set, a PC (Personal Computer) or a portable terminal as well as a system for transferring a content of a broadcasting program of the like using unidirectional communication are proceeding actively at present.

It is to be noted that, as a prior art document that discloses a technology for implementing data distribution through a broadcasting wave or a network, for example, PTL 2 (JP 2014-057227A) is available.

As a standard relating to a data distribution system through a broadcasting wave and a network, standardization of ATSC (Advanced Television System Committee) 3.0 is proceeding at present.

According to ATSC3.0, a configuration is examined wherein middleware that executes a reception process and so forth of ATSC3.0 broadcasting is mounted on a broadcasting distribution device (tuner-incorporating device) in which an ATSC3.0 compliant physical layer (ATSC-PHY) is incorporated such that it is made possible to receive signaling data including control information and so forth of ATSC broadcasting and perform various controls in accordance with the signaling data.

In particular, a configuration is examined that makes it possible to implement, by control by signaling data, an outputting process of a broadcasting content utilizing an application program utilized in the Internet or the like, namely, a client application, as it is or a data process utilizing various applications provided by a broadcasting wave or the like.

For example, an ATSC3.0 compliant physical layer (ATSC-PHY) and ATSC3.0 broadcasting reception middleware are incorporated in a server (a server for exclusive use, or a PC, a TV (Television), a tablet, a smartphone or the like) that receives a broadcasting service installed in a home or at a hot spot.

Such servers transfer, after they receive an ATSC3.0 broadcasting service once, broadcasting reception data to a user apparatus (a PC, a TV, a tablet, a smartphone or the like) through a network (a home network, a LAN (Local Area Network)/WiFi (Wireless Fidelity) at a hot spot or the like).

The user apparatus to which the broadcasting reception data transferred from a server is inputted is permitted to utilize an application (for example, an ATSC3.0 DASH client application) that operates on a reproduction controlling unit or an application controlling unit of the user apparatus to execute reproduction of a broadcasting content or various applications distributed by broadcasting.

Further, 3GPP (Third Generation Partnership Project) that is an international standard specification formation group and DASH-IF that is a normalization organization of the MPEG (Moving Picture Expert Group)-DASH standard that is a standard for an adaptive (adaptive) streaming technology are proceeding with normalization for a distribution, reproduction configuration of an advertisement content.

In particular, standardization of a configuration and so forth for dynamically changing advertisements to be outputted to individual reception apparatus is proceeding, for example, in response to a viewing user of the reception apparatus side.

However, the present situation is that the configuration for implementing this configuration has not been materialized as yet.

CITATION LIST

Patent Literature

[PTL 1]
JP 2011-087103A
[PTL 2]
JP 2014-057227A

SUMMARY

Technical Problem

The present disclosure has been made in view of such a problem as described above, for example, and it is an object of the present disclosure to provide a reception apparatus for receiving and reproducing a broadcasting program or the like, which implements selective outputting of a user-corresponding content such as an advertisement or the like according to a user, and a transmission apparatus, and a data processing method.

Solution to Problem

A first aspect of the present disclosure resides in a reception apparatus, including a communication unit configured to receive signaling data having a user information setting region, and a data processing unit configured to set user information to the user information setting region and apply the generated user information-set data to acquire a control information file of the user information-corresponding content, and apply description data of the acquired control information file to acquire the user information-corresponding content.

Further, a second aspect of the present disclosure resides in a transmission apparatus, including a communication unit configured to transmit signaling data having a user information setting region, a control information file capable of being accessed or generated applying user information-set data generated by setting user information to the user information setting region in a reception apparatus, and a user information-corresponding content capable of being acquired or regenerated based on description data of the control information file.

A third aspect of the present disclosure resides in a data processing method executed by a reception apparatus, including receiving, by a communication unit, signaling data having a user information setting region, setting, by a data processing unit, user information to the user information setting region and applying the generated user information-set data to acquire a control information file of the user information-corresponding content, and applying, by the data processing unit, description data of the acquired control information file to execute an acquisition process of the user information-corresponding content.

Furthermore, a fourth aspect of the present disclosure resides in a data processing method executed by a transmission apparatus, including transmitting signaling data having a user information setting region, a control information file capable of being accessed or generated applying user information-set data generated by setting user information to the user information-set region in a reception apparatus, and a user information-corresponding content capable of being acquired or reproduced based on description data of the control information file.

The above and other objects, features and advantages of the present disclosure will become more apparent from the more detailed description based on the embodiments of the present disclosure hereinafter described and the attached drawings. It is to be noted that the term system herein is a logical aggregation configuration of a plurality of apparatus and is not limited to a system in which component apparatus are accommodated in the same housing.

Advantageous Effects of Invention

With the configuration of the embodiment of the present disclosure, an apparatus and a method by which a content such as an advertisement corresponding to a user at the reception apparatus side can be selectively outputted to the reception apparatus are implemented.

In particular, the transmission apparatus transmits signaling data (MPD) having a user information setting region, a control information file capable of being accessed or generated applying user information-set data generated by a process for the MPD, and a user information-corresponding advertisement capable of being acquired and reproduced on the basis of description data of the control information file. The reception apparatus sets user information to the user information setting region of the MPD, applies the generated user information-set data to acquire a control information file of a user information-corresponding advertisement, applies the description data of the acquired control information file to acquire the user information-corresponding advertisement, and outputs the user information-corresponding advertisement.

By the present configuration, an apparatus and a method by which a content such as an advertisement corresponding to a user at the reception apparatus side can be selectively outputted to the reception apparatus are implemented.

It is to be noted that the advantageous effects described herein are illustrative and not restrictive to the last and there may be additional effects.

BRIEF DESCRIPTION OF DRAWINGS

FIG. 1 is a view illustrating an example of a configuration of a communication system that executes a process of the present disclosure.

FIG. 2 is a view illustrating transmission data of a transmission apparatus.

FIG. 5 is a view illustrating an example of a data output of a reception apparatus (client) 30.

FIG. 6 is a view illustrating an example of selection of an output advertisement utilizing various user information.

FIG. 21 is a view illustrating a processing sequence of a working example in which a URL with a query parameter, which is access information (URL) to a period information file, is provided to the reception apparatus.

FIG. 22 is a view depicting an example of a mapping table (correspondence table) between access information (URLs) to period information files and URLs with a query parameter.

FIG. 23 is a view depicting an example of XML data of a mapping table (correspondence table) between access information (URLs) to period information files and URLs with a query parameter.

FIG. 24 is a view depicting an example of a mapping table (correspondence table) between access information (URLs) to period information files and URLs with a query parameter.

FIG. 25 is a view depicting an example of XML data of a mapping table (correspondence table) between access information (URLs) to period information files and URLs with a query parameter.

FIG. 26 is a view illustrating a processing sequence of a working example in which a mapping table between access information (URLs) to period information files and URLs with a query parameter is provided to the reception apparatus.

FIG. 29 is a view illustrating an example of a processing sequence of the working example in which a URL with a query parameter is inputted to provide a script (program) for generating a period information file to the reception apparatus.

FIG. 31 is a view illustrating a particular example (use case) of a process that utilizes a service worker (SW).

FIG. 32 is a view illustrating an example of a process that utilizes a service worker (SW).

FIG. 33 is a view illustrating a processing sequence of a working example in which a process for storing a period information file into a cache unit (proxy cache) is executed utilizing a service worker (WS).

FIG. 34 is a view illustrating a processing sequence of the working example in which a process for storing a period information file into a cache unit (proxy cache) is executed utilizing a service worker (WS).

FIG. 35 is a view illustrating a processing sequence of a working example in which a period information file is generated utilizing a service worker (SW).

FIG. 37 is a view illustrating an example of a configuration of an MPD.

FIG. 38 is a view illustrating an example of a configuration of advertisement-corresponding period information in the MPD.

FIG. 39 is a view depicting an example of a mapping table (correspondence table) between access information (URLs) to period information files and PDI (Preference Demographic Interest) instances.

FIG. 40 is a view depicting another example of the mapping table (correspondence table) between access information (URLs) to period information files and PDI instances.

FIG. 41 is a view depicting a further example of the mapping table (correspondence table) between access information (URLs) to period information files and PDI instances.

FIG. 45 is a view illustrating a processing sequence of the working example in which a script (program) for inputting a URL with a query parameter to generate a period information file is provided to the reception apparatus.

FIG. 46 is a view illustrating a processing sequence of a working example in which a process for storing a period information file into a cache unit (proxy cache) utilizing a service worker (SW) is executed.

FIG. 47 is a view illustrating a processing sequence of the working example in which the process for storing a period information file into a cache unit (proxy cache) utilizing a service worker (SW) is executed.

FIG. 49 is a view illustrating a processing sequence of the working example in which a period information file is generated utilizing a service worker (SW).

FIG. 51 is a view illustrating an example of a hardware configuration of the transmission apparatus and the reception apparatus that are communication apparatus.

DESCRIPTION OF EMBODIMENT

Figure 3:
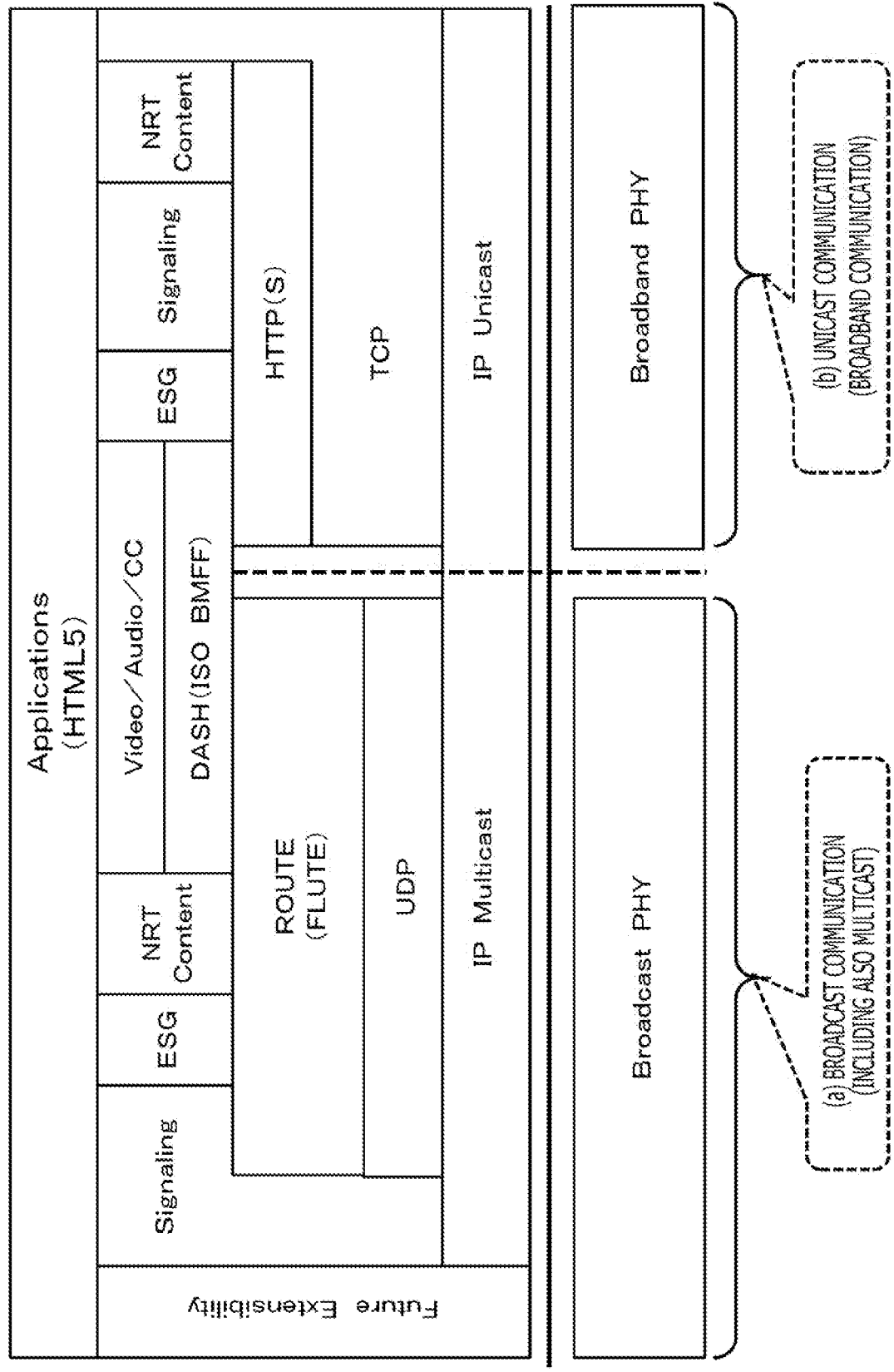
FIG. 3 is a view depicting an example of a protocol stacks relating to the transmission apparatus and a reception apparatus.

In the following, details of a reception apparatus, a transmission apparatus, and a data processing method of the present disclosure are described with reference to the drawings. It is to be noted that the description is given in the following order.

1. Example of configuration of communication system
2. Data communication protocol FLUTE, and ROUTE
3. Example of communication process executed by transmission apparatus and reception apparatus
4. Example of data output from reception apparatus
5. Example of configuration and example of process of reception apparatus
6. Signaling data in unit of period (Period) utilizing MPD
7. Example of particular configuration for executing advertisement providing process according to user information
8. Particular working examples of providing and utilization processes of period information file for outputting selected content corresponding to user information to reception apparatus
    8-1. (Working example 1) Working example wherein URL with query parameter, which serves as access information (URL) to period information file, is provided to reception apparatus
    8-2. (Working example 2) Working example wherein mapping table of access information (URL) to period information file and URL with query parameter (or query parameter) is provided to reception apparatus
    8-3. (Working example 3) Working example wherein script (program) for generating period information file with URL with query parameter inputted is provided to reception apparatus
    8-4. (Working example 4) Working example wherein period information file is stored into cache unit (proxy cache) utilizing service worker (SW)
    8-5. (Working example 5) Working example wherein period information file is generated utilizing service worker (SW) with URL with query parameter inputted
    8-6. (Working example 6) Working example wherein question-answer type metadata (PDI) is utilized
        8-6-1. (Working example 6-1) Working example wherein mapping table between access information (URLs) to period information files and PDI instances is provided to reception apparatus
        8-6-2. (Working example 6-2) Working example wherein PDI table is utilized in configuration in which script (program) for inputting URL with query parameter to generate period information file is provided to reception apparatus
        8-6-3. (Working example 6-3) Working example wherein PDI table is utilized in configuration in which period information file is stored into cache unit (proxy cache) utilizing service worker (SW)
        8-6-4. (Working example 6-4) Working example wherein PDI table is utilized in configuration in which period information file is generated utilizing service worker (SW) with URL with query parameter inputted
9. Example of configuration of transmission apparatus and reception apparatus
10. Summary of configuration of present disclosure

1. Example of Configuration of Communication System

First, an example of a configuration of a communication system that executes the process of the present disclosure is described with reference to FIG. 1. As depicted in FIG. 1, the communication system 10 includes a transmission apparatus 20 that is a communication apparatus that transmits a content of image data, sound data or the like, and a reception apparatus 30 that is a communication apparatus that receives a content transmitted from the transmission apparatus 20.

The transmission apparatus 20 is an apparatus at the side from which various contents (broadcasting programs, advertisements and other data) such as, for example, a broadcasting server (broadcasting station) 21 that principally transmits TV programs and so forth, an advertisement server 22 that principally transmits advertisement data, a data distribution server 23 that transmits various data or the like.

Meanwhile, the reception apparatus 30 is a client apparatus of a general user aid is configured, for example, from a television set 31, a PC 32, a portable terminal 33 or the like.

It is to be noted that, in FIG. 1, while the broadcasting server (broadcasting station) 21, advertisement server 22 and data distribution server 23 are depicted separately from each other each as an example of the transmission apparatus 20, a different configuration may be applicable wherein one server transmits all of broadcasting programs, advertisement and other data.

Data communication between the transmission apparatus 20 and the reception apparatus 30 is performed as communication that utilizes at least one or both of bidirectional communication or unidirectional communication through a network such as the Internet and unidirectional communication by a broadcasting wave or the like.

Content communication from the transmission apparatus 20 to the reception apparatus 30 is executed, for example, in compliance with the MPEG-DASH standard that is a standard of the adaptive (adaptive) streaming technology. The MPEG-DASH standard includes the following two standards:

(a) standard relating to a manifest file (MPD: Media Presentation Description) for describing metadata that is management information for a movie or sound file; and
(b) standard relating to a file format (segment format) for movie content transmission.

Content distribution from the transmission apparatus 20 to the reception apparatus 30 is executed in compliance with the MPEG-DASH standard described above.

The transmission apparatus 20 encodes content data and generates a data file including the encoded data and metadata of the encoded data. The encoding process is performed, for example, in accordance with the MP4 file format prescribed by MPEG. It is to be noted that, where the transmission apparatus 20 generates a data file of the MP4 format, a file of encoded data is called "mdat" and metadata is called "moon," "moof" or the like.

Contents to be provided from the transmission apparatus 20 to the reception apparatus 30 are, for example, music data, video data of a movie, a television program, a video, a photograph, a document, a picture, a chart and so forth or various data of a game or software.

Transmission data of the transmission apparatus 20 is described with reference to FIG. 2.

The transmission apparatus 20 that executes data transmission in compliance with the MPEG-DASH standard performs transmission of data of a plurality of different types when roughly divided as following as depicted in FIG. 2:
(a) signaling data 50;
(b) AV (Audio and Visual) segment 60; and
(c) other data (ESG (Electronic Service Guide), NRT (Non-Real Time) content and so forth) 70.

The AV segment 60 is configured from image (video) or sound (audio) data reproduced by the reception apparatus, namely, from a program content or the like provided, for example, from a broadcasting station. For example, the AV segment 60 is configured from MP4 encoded data (mdat) or metadata (moov, moof) described hereinabove. It is to be noted that an AV segment is also called DASH segment.

Meanwhile, the signaling data 50 is configured from various kinds of control information such as program schedule information such as a program guide, address information necessitated in program acquisition (URL (Uniform Resource Locator) or the like), information necessitated for a reproduction process of a content, for example, guide information configured from codec information (encoding method or the like), application controlling information and so forth.

It is necessary for the reception apparatus 30 to receive the signaling data 50 in prior to reception of an AV segment 60 in which a program content that becomes a reproduction target is placed.

The signaling data 50 is transmitted, for example, as data of the extensible markup language (XML) format from the transmission apparatus 20.

The signaling data is repetitively transmitted at any time. For example, the signaling data is transmitted repetitively and frequently, after every 100 msec. This is because it is made possible for a reception apparatus (client) to acquire signaling data immediately at any time.

A client (reception apparatus) can at any time execute a process necessary for reception and reproduction of a program content such as acquisition of a necessary accessing address to the program content or a codec setting process without delay on the basis of receivable signaling data.

The other data 70 includes, for example, an ESG (Electronic Service Guide), an NRT content and so forth. The ESG is an electronic service guide (Electronic Service Guide) and is guide information such as, for example, a program guide.

The NRT content is a content of the non-real time type.

The NRT content includes, for example, various application files executed on a browser of the reception apparatus 30 that is a client, a data file of videos, still pictures or the like and so forth.

The following data depicted in FIG. 2, namely,
(a) signaling data 50;
(b) AV segment 60; and
(c) other data (ESG, NRT content and so forth) 70 are transmitted, for example, in accordance with the data communication protocol: FLUTE (File Delivery over Uni-directional Transport).

2. Data Communication Protocol FLUTE, and ROUTE

The data communication protocol: FLUTE (File Delivery over Uni-directional Transport) is a protocol for performing session management of a content to be transmitted by multicast transmission.

A file generated, for example, by the server side that is a transmission apparatus is transmitted to a client that is a reception apparatus in accordance with the FLUTE protocol.

The reception apparatus (client) 30 accumulates a URL and a version of a reception file and the file in an associated relationship with each other, for example, into a storage unit (client cache).

A file that has the same URL but has a different version is considered such that the substance thereof is in an updated state. Although the FLUTE protocol performs only unidirectional file transfer control and does not have a selective filtering function of a file by a client, if the client side performs selection of a file, which is transfer-controlled in accordance with the FLUTE, utilizing metadata linked to the file, then it is possible to implement selective filtering and configure, update and manage a local cache that reflects the taste of the user.

It is to be noted that it is possible for metadata not only to be incorporated in an extending fashion into the FLUTE protocol but also to be described separately by a protocol of ESG (Electronic Service Guide) or the like.

It is to be noted that FLUTE is initially specified as a file transfer protocol for multicast transmission. FLUTE is configured from a combination of an FDT (File Delivery Table) and a multicast protocol for a scalable file object called ALC (Asynchronous Layered Coding), particularly an LCT (Layered Coding Transport) or an FEC (Forward Error Correction) component that is a building block.

Although the conventional FLUTE is developed so as to be utilized principally for file transfer of the asynchronous type, it is currently expanded in order that it can be applied readily also to broadcast live streaming by ATSC (Advanced Television System Committee) that is a standardization group relating to a data distribution system through a broadcasting wave and a network. The expanded specification of FLUTE is called ROUTE (Real-Time Object Delivery over Unidirectional Transport).

As a standard whose standardization is currently proceeded as one of standards relating to a data distribution system through a broadcasting wave and a network, ATSC (Advanced Television System Committee) 3.0 is available. This ATSC3.0 adopts ROUTE in place of the conventional FLUTE protocol and prescribes a stack configuration adopted for transmission of signaling data, an ESG, an asynchronous file, a synchronous stream or the like.

3. Example of Communication Process Executed by Transmission Apparatus and Reception Apparatus Now, an example of a communication process executed by the transmission apparatus and the reception apparatus is described.

FIG. 3 is a view depicting an example of a protocol stack of the transmission apparatus and the reception apparatus.

The example depicted in FIG. 3 has two protocol stacks for performing the following two processes for communication data:
(a) broadcast (including also multicast) communication (for example, broadcasting type data distribution); and
(b) unicast (broadband) communication (for example, P2P (Peer to Peer) communication of the hypertext transfer protocol (HTTP) type).

The left side in FIG. 3 depicts the protocol stack corresponding to (a) the broadcast communication (for example, broadcasting type data distribution).

The right side in FIG. 3 depicts the protocol stack corresponding to (b) the unicast (broadband) communication (for example, P2P communication of the HTTP type).

The protocol stack corresponding to (a) the broadcast communication (for example, broadcasting type data distribution) depicted at the left side in FIG. 3 has the following layers in order from the lower layer:
(1) broadcast physical layer (Broadcast PHY);
(2) IP (Internet Protocol) multicast layer (IP Multicast);
(3) UDP (User Datagram Protocol) layer;
(4) ROUTE (=extended FLUTE) layer;

(5) ESG, NRT content, DASH (ISO BMFF (Base Media File Format)) and Video/Audio/CC; and
(6) application layer (Applications HTML (HyperText Markup Language) 5)).

It is to be noted that, as an upper layer to (2) the IP multicast layer (IP Multicast), a signaling (Signaling) layer is set.

The signaling layer is a layer applied to transmission and reception of signaling data 50 described hereinabove with reference to FIG. 2. The signaling data includes program schedule information such as a program table, address information necessary for program acquisition (URL or the like), information necessary for a reproduction process of a content, guide information configured, for example, from codec information (encoding method or the like), control information and so forth.

The signaling data is data including access information to an AV segment to be received and reproduced by the reception apparatus (client), guide information necessary for a process after reception such as a decoding process and control information, and is data that is repetitively transmitted at any time from the transmission apparatus.

As the signaling data, various types are available according to information. In particular, for example, a USD (user service description (User Service Description)) that is signaling data of a unit of a service is available.

In the USD, various kinds of control information are included. As representative control information, an MPD (media presentation description (Media Presentation Description)) that is a signaling data having a manifest file in which various guide information corresponding to contents (AV segments) and control information are stored is available.

The various kinds of signaling data are data necessitated by the reception apparatus (client) for a reception, reproduction process and a control process of an AV segment or an application (application program) transmitted from the transmission apparatus, and are set, for example, as individual files (metafiles) by category and transmitted from the transmission apparatus.

It is to be noted that, as an upper layer to (1) the broadcast physical layer (Broadcast PHY), a utilization permission layer (Future Extensibility) of a new protocol in the future is set.
(1) The Broadcast physical layer (Broadcast PHY) is a physical layer configured from, for example, a communication controlling unit that controls a communication unit of a broadcasting system for executing broadcast communication.
(2) The IP multicast layer (IP Multicast) is a layer that executes a data transmission and reception process in accordance with IP multicast.
(3) The UDP layer is a generation and analysis process layer for a UDP packet.
(4) The ROUTE layer is a layer for performing storage or extraction of transfer data in accordance with the ROUTE protocol that is the extended type FLUTE protocol. ROUTE is a multicast protocol for a scalable file object called ALC similarly to FLUTE, and particularly is configured from a combination of LCT or FEC components that are building blocks of the same.

Figure 4:
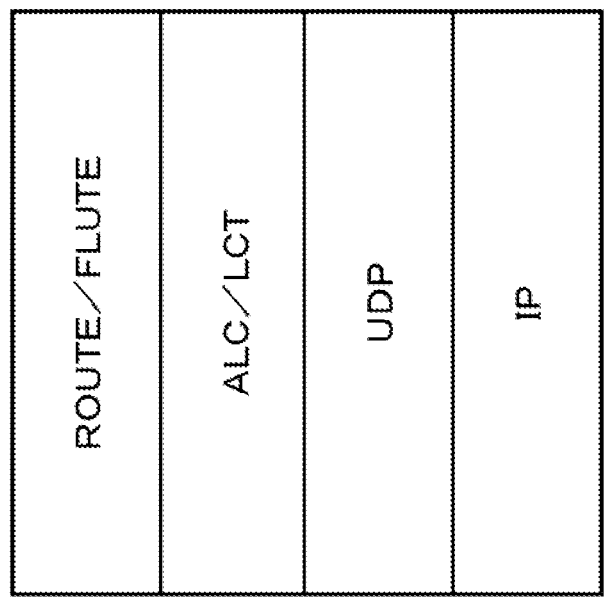
FIG. 4 is a view depicting a protocol stack relating to ROUTE and FLUTE.

FIG. 4 depicts a protocol stack relating to ROUTE and FLUTE.
(5) The ESG, NRT content, DASH (ISO BMFF) and Video/Audio/CC are data transferred in accordance with the ROUTE protocol.

A broadcast type distribution service compliant with the DASH standard is called MBMS (Multimedia Broadcast Multicast Service). As a method for efficiently implementing this MBMS by LTE (Long Term Evolution), an eMBMS (evolved Multimedia Broadcast Multicast Service) is available.

The MBMS and the eMBMS are broadcast type distribution services and are a service wherein same data, for example, a cinema content or the like is distributed all at once by a common bearer to a plurality of user terminals (UE) that are reception apparatus positioned within a specific area. By broadcast distribution compliant with the MBMS or the eMBMS, the same content can be provided simultaneously to a large number of smartphones or PCs or reception apparatus such as television sets positioned in the distribution service providing area.

The MBMS and the eMBMS prescribe a process for downloading a file, which complies with the 3GPP file format (ISO-BMFF file, MP4 file), in accordance with the transfer protocol ROUTE or FLUTE.

The data described hereinabove with reference to FIG. 2, namely, most of
(a) signaling data 50,
(b) an AV segment 60, and
(c) other data (ESG, NRT content and so forth) 70 are transmitted in accordance with the ROUTE protocol or the FLUTE protocol.
(5) ESG, NRT content, DASH (ISO BMFF) and Video/Audio/CC are data transferred in accordance with the ROUTE protocol.

The ESG is an electronic service guide (Electronic Service Guide) and is guide information such as, for example, a program guide.

The NRT content is a non-real time type content. As described hereinabove, the NRT content includes various application files executed, for example, on a browser of the reception apparatus that is a client, and data files of videos, still pictures and so forth. Video/Audio/CC are actual data that become a reproduction target such as videos and audios that are distributed in accordance with the DASH standard.
(6) The application layer (Applications (HTML5)) is an application layer that executes generation or analysis of data to be transferred in accordance with the ROUTE protocol, outputting control of various data and so forth, and performs data generation, analysis, outputting process and so forth to which, for example, HTML5 is applied.

On the other hand, the protocol stack corresponding to (b) the unicast (broadband) communication (for example, P2P communication of the HTTP type) depicted at the right side in FIG. 3 has the following layers in order from the lower layer:
(1) broadcast physical layer (Broadcast PHY);
(2) IP unicast layer (IP Unicast);
(3) TCP (Transmission Control Protocol) layer;
(4) HTTP layer;
(5) ESG, Signaling, NRT content, DASH (ISO BMFF) and Video/Audio/CC; and
(6) application layer (Applications (HTML5)).
(1) The Broadband physical layer (Broadband PHY) is a physical layer configured from a communication controlling unit such as, for example, a device driver that controls a communication unit of a network card or the like that executes broadband communication.
(2) The IP unicast layer (IP Unicast) is a layer that executes an IP unicast transmission and reception process.

(3) The HTTP layer is a generation and analysis process layer for an HTTP packet.

The upper layers have a configuration similar to that of the stack configuration for (a) the broadcast communication (for example, broadcasting type data distribution) at the left side in FIG. 3.

It is to be noted that the transmission apparatus (server) 20 and the reception apparatus (client) 30 perform processes in accordance with at least one of the two communication protocol stacks for (a) broadcast communication (for example, broadcasting type data distribution), and (b) unicast (broadband) communication (for example, P2P communication of the HTTP type) of the two processing systems of FIG. 3.

In the protocol stack depicted in FIG. 3, an attribute of a file group to be multicast transferred in accordance with ROUTE (FLUTE) (including a URL that is an identifier of each file) not only can be described in a control file of ROUTE (FLUTE) but also can be described in signaling (Signaling) data that describes a file transfer session. Also it is possible to describe a further detailed attribute of the file transfer session by an ESG (that can be applied also to a presentation use to an end user).

As described hereinabove, standardization of ATSC (Advanced Television System Committee) 3.0 as one of standards relating to a data distribution system through a broadcasting wave and a network is proceeding. In standardization of the IP-based transport stack by ATSC3.0, a method of transferring a file based on the file format of MPEG-DASH (ISO-BMFF file, MP4 file) by ROUTE (Real-Time Object Delivery over Unidirectional Transport) protocol extended from FLUTE (File Delivery over Unidirectional Transport) has been proposed and is set as a standard candidate type.

By applying the ROUTE protocol, it is possible to transfer a fragmented MP4 (fragmented MP4) file sequence of the DASH standard and an MPD (Media Presentation Description) that is a control information (signaling data) storage metafile of the DASH standard as well as USBD (User Service Bundle Description)/USD that is signaling data for broadcasting distribution, S-TSID (Service based Transport Session Description) and so forth.

As described hereinabove, the ROUTE protocol is a protocol based on FLUTE. A metadata file that describes transfer controlling parameters in FLUTE is called FDT (File Delivery Table), and a metadata file that describes transfer controlling parameters in ROUTE is called S-TSID (Service based Transport Session Description). The S-TSID is a superset of the FDT and includes an FDT.

The USBD/USD, S-TSID, MPD and so forth proposed as signaling data of the ATSC3.0 service layer (SLS: Service Layer Signaling) are all transferred by a ROUTE session.

4. Example of Data Output from Reception Apparatus

Now, an example of a data output from the reception apparatus (client) 30 that receives data from the transmission apparatus 20 such as the broadcasting server 21, the advertisement server 22 or the like and outputs the data is described.

FIG. 5 is a view depicting an example of a data output from the reception apparatus (client) 30.

To the reception apparatus 30, for example, a cinema, a news or some other broadcasting program (main content) and an advertisement are outputted alternately in accordance with a timeline (time axis (t)) depicted at a lower portion in FIG. 5.

Where program starting time of a certain channel selected by a user is represented by t0, a broadcasting program and an advertisement are outputted alternately in accordance with time transition as described below:

time t0 to t1: advertisement;
time t1 to t2: broadcasting program;
time t2 to t3: advertisement;
time t3 to t4: broadcasting program;
time t4 to t5: advertisement; and
time t5 to: broadcasting program.

Here, an advertisement outputted from the reception apparatus 30 is an advertisement selected in response to a viewing user at the reception apparatus 30 side from among many advertisement contents.

An advertisement optimum to the user is selected and outputted on the basis of user (viewer) information set in the reception apparatus 30.

The user information is various information such as, an age, a sex, an address, a hobby, a taste and so forth of the user (viewer).

As the user information, information registered in advance in the storage unit of the reception apparatus is used.

Alternatively, the reception apparatus 30 may be configured such that it causes the user (viewer) to input its user information at a point of time at which a program starts such that it uses the input information.

Variable modes are available for a setting and utilization form of user information. For example, a configuration that causes user information to be set and used in a unit of a program and various setting and usage configurations such as a setting in a unit of a channel or a common setting for all channels are possible. Such user information is stored into a storage unit of the reception apparatus and is utilized as occasion demands.

A particular configuration for advertisement selection utilizing user information is hereinafter described.

An example of selection of an output advertisement utilizing various user information is described with reference to FIG. 6.

FIG. 6 depicts the following three particular examples:

(A) example of advertisement setting by age;
(B) example of advertisement setting by residence; and
(C) example of advertisement setting by age and by residence.

As (A) the example of advertisement setting by age, the following example is depicted.

For the age (age) of the user (viewer)=equal to or older than 20 years old→an advertisement of alcoholic beverages (alcoholic beverages) is selectively outputted. For the age (age)=equal to or younger than 15 years old→an advertisement of toys is selectively outputted. This example is an example in which the user is caused to execute registration of the age of the user as user information registered at the reception apparatus 30 side and, on the basis of the registered user information (viewer age), an advertisement suitable for the user age is outputted to the reception apparatus 30 used by the user.

As (B) the example of advertisement setting by residence, the following example is depicted.

For the address (Location) of the user (viewer)=Alaska→an advertisement of heating equipment is selectively outputted.

For the address (Location) of the user (viewer)=Hawaii→an advertisement of air conditioners is selectively outputted.

This example is an example in which the user is caused to execute registration of the address of the user as the user information registered at the reception apparatus 30 side and, on the basis of the registered user information (viewer address), an advertisement suitable for the address of the user is outputted to the reception apparatus 30 utilized by the user.

For (C) the example of advertisement setting by age and by residence, the following example is depicted.

Where the two conditions that
the age (age) of the user (viewer)=equal to or older than 18 years old and
the address (Location) of the user (viewer)=New York are satisfied, an advertisement of restaurants in New York is selectively outputted.

Where the two conditions that
the age (age) of the user (viewer)=equal to or younger than 15 years old and
the address (Location) of the user (viewer)=California are satisfied, an advertisement of toy stores in California is selectively outputted.

This example is an example in which the user is caused to execute registration of the age and the address of the user as the user information registered at the reception apparatus 30 side and, on the basis of the registered user information (viewer age and address), an advertisement suitable for the age and the address of the user is outputted to the reception apparatus 30 used by the user.

In this manner, in the process of the present disclosure, a configuration is implemented which selectively outputs an advertisement that is decided to be optimum to the user (viewer), namely, to have a high advertisement effect, in response to various user information set at the reception apparatus 30 side.

A particular process is hereinafter described.

5. Example of Configuration and Example of Process of Reception Apparatus

Now, an example of a configuration and an example of a process of the reception apparatus 30 are described with reference to FIG. 7 and so forth.

Figure 7:
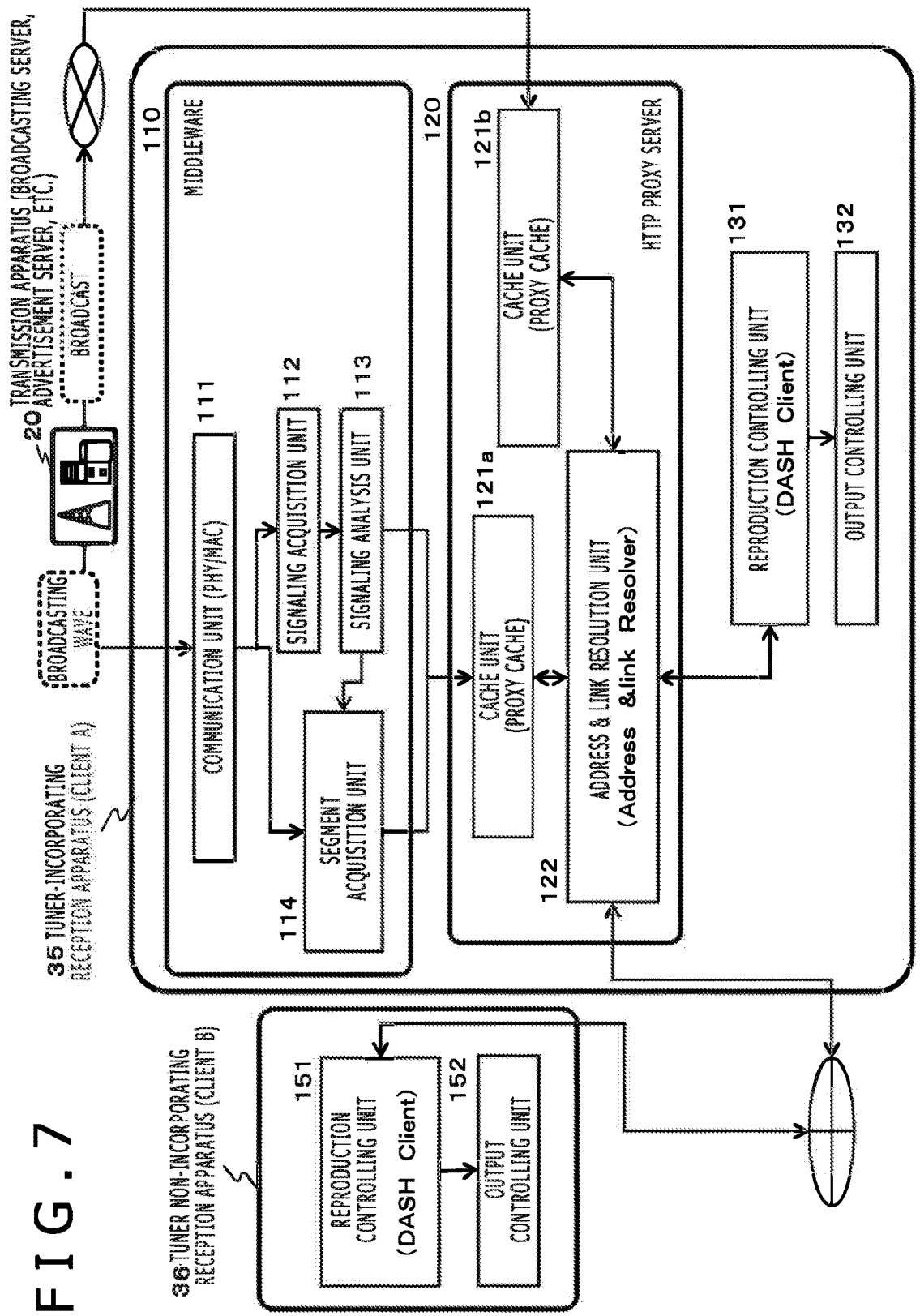
FIG. 7 is a view illustrating an example of a configuration of the reception apparatus.

It is to be noted that, in FIG. 7, as examples of the reception apparatus, a tuner-incorporating reception apparatus (client A) 35 and a tuner non-incorporating reception apparatus (client B) 36 are depicted.

The tuner-incorporating reception apparatus (client A) 35 is a reception apparatus that includes middleware 110 for receiving transmission data from the transmission apparatus 20 such as a broadcasting server or an advertisement server, and a proxy server 120 for executing an analysis and accumulation process of reception data.

Meanwhile, the tuner non-incorporating reception apparatus (client B) 36 is a reception apparatus that includes none of the middleware 110 for receiving transmission data from the transmission apparatus 20 and the proxy server 120 for executing an analysis and accumulation process of reception data.

The tuner non-incorporating reception apparatus (client B) 36 is connected to the tuner-incorporating reception apparatus (client A) 35 by a network such as, for example, the Ethernet (registered trademark) or Wi-Fi and executes communication with the tuner-incorporating reception apparatus (client A) 35.

The tuner non-incorporating reception apparatus (client B) 36 receives data received from the transmission apparatus 20 such as a broadcasting server or an advertisement server by the tuner-incorporating reception apparatus (client A) 35 through the tuner-incorporating reception apparatus (client A) 35 and executes content reproduction.

The transmission apparatus 20 such as a broadcasting server of an advertisement server transmits AV segments, signaling data and other data configured from a broadcasting content or the like by broadcast transmission through a broadcasting wave or a network.

As depicted in FIG. 7, the tuner-incorporating reception apparatus 35 includes middleware 110, an HTTP proxy server 120, a reproduction controlling unit (DASH client) 131 and an output controlling unit 132.

The middleware 110 receives and analyzes provision data from the transmission apparatus 20.

The middleware 110 includes a communication unit (PHY/MAC) 111, a signaling acquisition unit 112 that acquires signaling data, a signaling analysis unit 113 that analyzes the signaling data, and a segment acquisition unit 114 that acquires the signaling data and program content data of videos, audios and so forth as well as a data file of an NRT content such as an application or the like.

Data received by the middleware 110 is stored into a cache unit (proxy cache) 121a of the proxy server 120. The proxy server 120 further stores data acquired from the transmission apparatus 20 through a network into another cache unit (proxy cache) 121b.

The proxy server 120 inputs a data request from the reproduction controlling unit 131 into an address & link resolution unit (Address & Xlink Resolver) 122, acquires requested data from the cache units (proxy caches) 121a and 121b or the outside and provides the data.

The reproduction controlling unit (DASH client) 131 executes reproduction control of a content transmitted in accordance with the DASH (MPEG-DASH) standard.

As described hereinabove, the MPEG-DASH standard includes the following two standards:
  (a) standard relating to a manifest file (MPD: Media Presentation Description) for describing metadata that is management information for a movie or sound file; and
  (b) standard relating to a file format (segment format) for movie content transmission.

Content distribution from the transmission apparatus 20 to the tuner-incorporating reception apparatus 35 is executed in accordance with the MPEG-DASH standard described above.

A content is transmitted as segments that are divisional data of a predetermined unit, for example, in accordance with the MP4 file format prescribed by MPEG, and the reproduction controlling unit (DASH client) 131 executes a process for referring to a manifest file (MPD) to acquire a segment in which a reproduction target content is stored and so forth.

The output controlling unit 132 extracts an encoded content from a segment acquired by the reproduction controlling unit and decodes the encoded content, and then outputs the decoded content to an outputting unit such as a display unit.

It is to be noted that the reproduction controlling unit (DASH client) 131 functions also as a signaling data processing unit (SLS Signaling Parser & Viewer).

The reproduction controlling unit (DASH client) 131 executes a process based on signaling data transmitted from the transmission apparatus 20 (broadcasting server 21, advertisement server 22 or the like).

As described hereinabove with reference to FIG. 2, the signaling data 50 is configured from program schedule information such as a program table, address information necessitated for acquisition of a program (URL (Uniform Resource Locator) or the like), guide information configured from information necessary for a reproduction process of a content or the like, for example, codec information (encoding method or the like), various control information such as application controlling information and so forth.

The reproduction controlling unit (DASH client) 131 acquires signaling data (SLS: Service Layer Signaling) and executes a process based on the acquired signaling data.

For example, the reproduction controlling unit (DASH client) 131 performs a process for providing address information (URL) necessitated for program schedule information such as a program guide or program acquisition or codec information (encoding method or the like) to the reproduction controlling unit 131, displaying of signaling data, for example, a displaying process of a program guide and so forth.

It is to be noted that there is the possibility that signaling data such as a program schedule (program guide), address information, codec information and so forth may be updated at any time, and it is necessary for the reception apparatus to perform a process utilizing the latest signaling data.

Further, the tuner non-incorporating reception apparatus (client B) 36 depicted in FIG. 7 is connected to the tuner-incorporating reception apparatus (client A) 35 by a network such as, for example, the Ethernet (registered trademark) or Wi-Fi and executes communication with the tuner-incorporating reception apparatus (client A) 35.

The tuner non-incorporating reception apparatus (client B) 36 receives data of a content or the like received from the transmission apparatus 20 such as the broadcasting server 21 or the advertisement server 22 by the tuner-incorporating reception apparatus (client A) 35 through the tuner-incorporating reception apparatus (client A) 35 and executes content reproduction.

The tuner non-incorporating reception apparatus (client B) 36 depicted in FIG. 7 includes a reproduction controlling unit (DASH Client) 151, and an output controlling unit 152 as components thereof.

The components and functions are similar to those of the reproduction controlling unit (DASH client) 131 and the output controlling unit 132 described hereinabove in connection with the tuner-incorporating reception apparatus (client A) 35.

Figure 8:
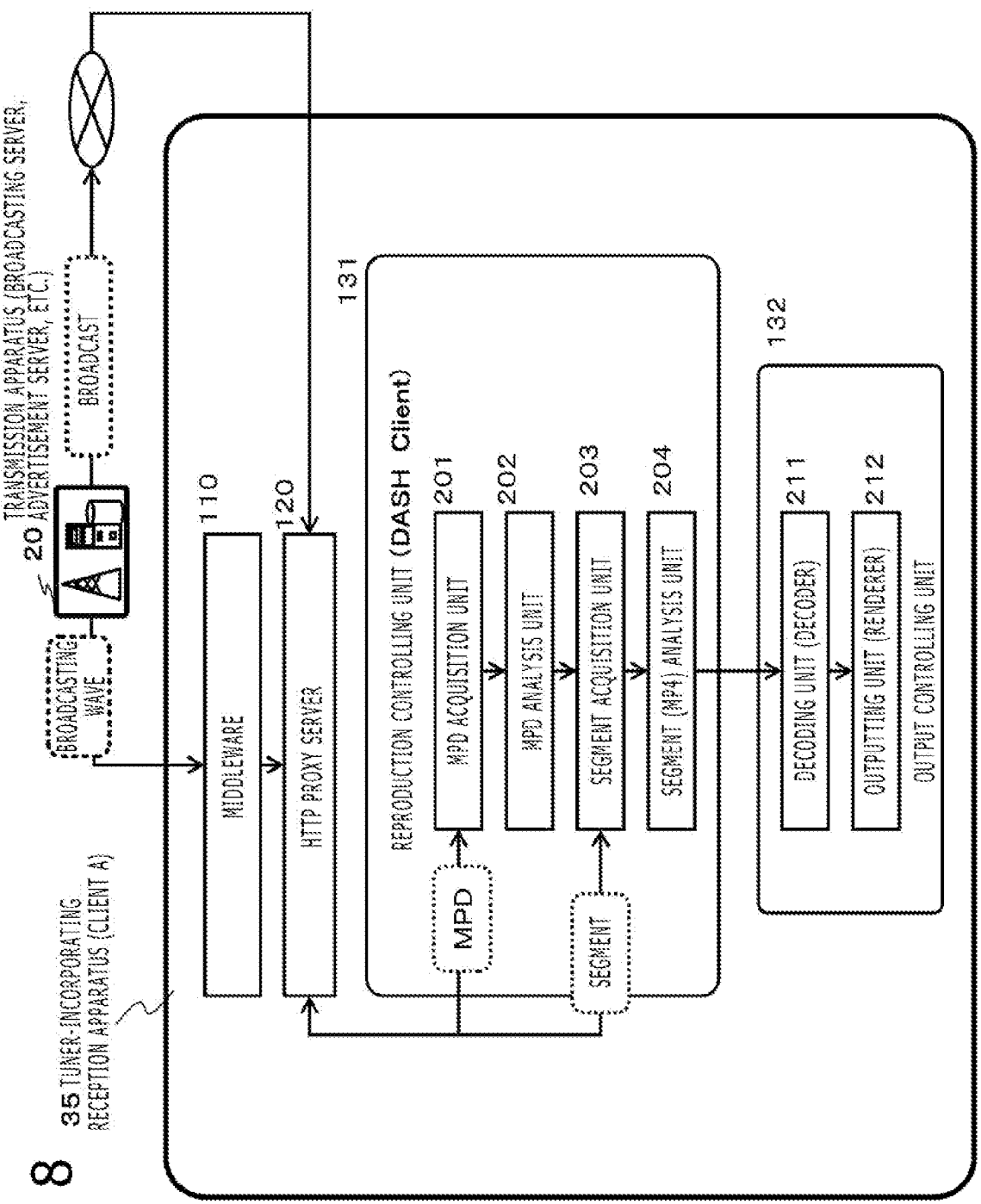
FIG. 8 is a view illustrating an example of a configuration of the reception apparatus.

FIG. 8 is a view depicting a detailed configuration of the reproduction controlling unit (DASH client) 131, and the output controlling unit 132 the tuner-incorporating reception apparatus (client A) 35 has.

The reproduction controlling unit (DASH client) 131 of the tuner-incorporating reception apparatus (client A) 35 includes an MPD acquisition unit 201, an MPD analysis unit 202, and a segment acquisition unit 203 and a segment (MP4) analysis unit 204.

The reproduction controlling unit (DASH client) 131 executes reproduction control of a content transmitted in accordance with the DASH (MPEG-DASH) standard as described hereinabove.

The MPD acquisition unit 201 acquires a manifest file (MPD: Media Presentation Description) that is a management information description file of a video or audio file.

The MPD is provided from the transmission apparatus 20 such as the broadcasting server 21 or the advertisement server 22 and is acquired, after it is stored into the proxy server 120, by the reproduction controlling unit 131.

The MPD analysis unit 202 analyzes the description substance of the MPD acquired by the MPD acquisition unit 201 and provides information and so forth that are necessary for acquisition of a segment corresponding to reproduction target data to the segment acquisition unit.

The segment acquisition unit 203 performs acquisition of a segment corresponding to reproduction target data in accordance with an MPD analysis result of the MPD analysis unit 202.

A segment is predetermined unit data set in accordance with a file format (segment format) for content transmission configured from AV data.

The segment analysis unit 204 acquires encoded image data, encoded sound data and so forth from the segment acquired by the segment acquisition unit 203 and outputs the acquired data to a decoding unit (decoder) 211 of the output controlling unit 132.

The output controlling unit 132 of the tuner-incorporating reception apparatus (client A) 35 includes the decoding unit (decoder) 211 and an outputting unit (renderer) 212.

The decoding unit (decoder) 211 executes a decoding process (decode) of encoded image data and encoded audio data provided from the segment analysis unit 204.

The outputting unit 212 outputs the decoded image data and sound data to an outputting unit (display and speaker).

The reproduction controlling units (DASH Client) 131 and 151 of the tuner-incorporating reception apparatus (client A) 35 and the tuner non-incorporating reception apparatus (client B) 36 are execution units of an ATSC3.0 client application (3.0 DASH Client).

The ATSC3.0 client application is executed on a browser incorporated in an ATSC3.0 broadcast reception client device. Alternatively, the ATSC3.0 client application not only is executed as a browser application but also is sometimes executed as a native application.

The ATSC3.0 client application executed by the reproduction controlling units (DASH Client) 131 and 151 is configured from an ATSC3.0 DASH client application (3.0 DASH client), an ATSC3.0 stream accompanying client application (3.0 Application) and so forth.

The ATSC3.0 client application of the reproduction controlling units (DASH Client) 131 and 151 and the output controlling units 132 and 152 execute a process for data received by the middleware (Client Local ATSC Middleware) 110 or data received by the proxy server (Client Local HTTP Proxy Server) 120 through a network.

The ATSC3.0 client application of the reproduction controlling units (DASH Client) 131 and 151 and the output controlling units 132 and 152 receive, as an input thereto, a DASH-MPD file and a DASH segment (segment) file acquired by the middleware 110 or the proxy server 120 and other general application files as well as an SLS (Service level Signaling) file in which signaling data is stored and performs rendering of a stream and control of an application.

If this model is viewed from the ATSC3.0 client application executed by the reproduction controlling units (DASH Client) 131 and 151 or an application executed by a signaling data processing unit 160, then since the applications access to an external world through the proxy server 120 without fail, the model need not be conscious of distinction of whether the file group is being acquired through a broadcast or through a network (network transparency is provided), and therefore it is possible to enhance the portability of the application.

Accordingly, there is no necessity to incorporate an application specializing the same for broadcasting, and the application can be incorporated without determining which one of a broadcast and the Internet is to be used.

If the ATSC3.0 client application executed by the reproduction controlling units (DASH Client) 131 and 151 requests acquisition of a DASH-MPD file or a DASH segment (segment) file and other general application files as well as a signaling data file (HTTP request), then in the proxy server 120 receiving this, the address & link resolution unit (Address & Xlink Resolver) 122 performs decision of whether the files are to be acquired through the broadcasting reception stack or through a network.

The information that becomes a material for the decision is provided as an analysis result of signaling data. The reproduction controlling units (DASH Client) 131 and 151 issue an acquisition request for USBD/USD, S-TSID or the like that is signaling meta of ATSC3.0 to the signaling acquisition unit (SLS Signaling Retriever) 112.

The signaling acquisition unit (SLS Signaling Retriever) 112 extracts signaling meta carried by an SLS LCT packet broadcasted and received through the communication unit (ATSC tuner: ATSC3.0 PHY/MAC) 111.

Further, the signaling analysis unit (SLS Signaling Parser) 113 extracts signaling meta from a URL included in an acquisition request for a segment or an application resource and resolves broadcasting distribution address information for acquiring a file that becomes a target. If it is found that broadcasting distribution is to be performed (has been performed), then the signaling analysis unit 113 acquires, on the basis of the broadcasting distribution address information, an LCT packet in which a desired file is stored from the broadcasting stream and deployed in the cache units (Proxy Cache) 121a and 121b. The proxy server 120 returns the file (as a response of HTTP) to the reproduction controlling unit 131. If a URL included in the acquisition request for an application part is not found in the signaling meta, then the proxy server 120 acquires the file through an ordinary net stack.

6. Signaling Data in Unit of Period (Period) Utilizing MPD

As described hereinabove with reference to FIG. 2 and so forth, the transmission apparatus 20 provides signaling data 50 configured from various control information to the reception apparatus 30.

As described hereinabove, signaling data have various types according to information. In particular, signaling data include, for example, a USD (user service description (User Service Description)) that is signaling data in a unit of a service such as a program.

The USD includes various types of control information. As representative control information, an MPD [media presentation description (Media Presentation Description)] that is signaling data including a manifest file in which guide information and control information corresponding to a content (AV segment) are available.

The MPD (Media Presentation Description) that is one of the signaling data prescribed in the DASH standard can provide various control data, for example, in a unit of a period (Period), which is a time interval when a broadcasting time period of a certain program is subdivided, to the reception apparatus (client) 30.

Figure 9:
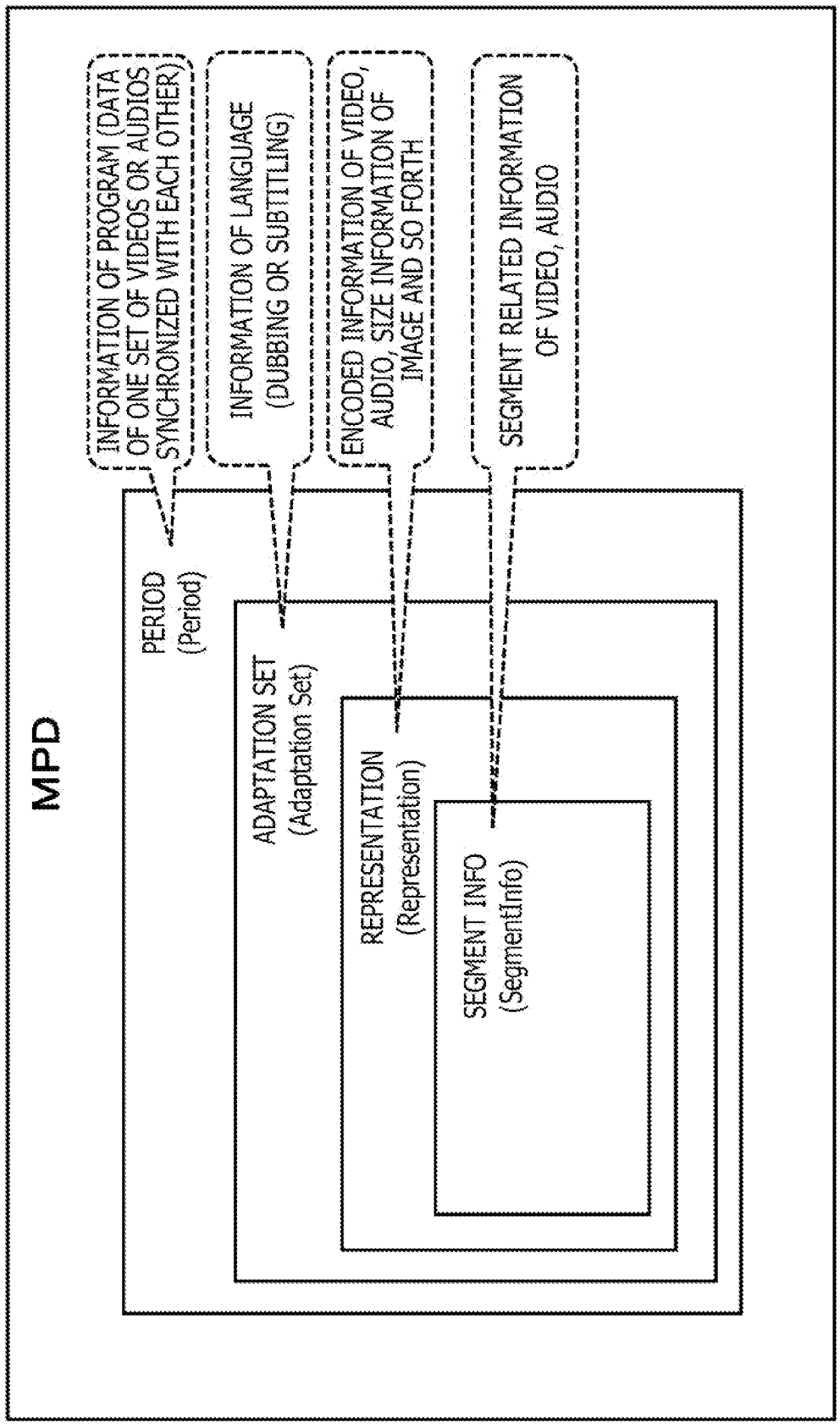
FIG. 9 is a view illustrating an example of a configuration of an MPD.

FIG. 9 is a view depicting an example of a format of the MPD.

The MPD can describe, for each stream of an image or sound, information of an attribute and so forth or control information in units of various prescribed ranges described below:

(1) period (Period) that prescribes an interval on a time axis;
(2) adaptation (Adaptation) that prescribes a data type and so forth of an image, sound or the like;
(3) representation (Representation) that prescribes a type of an image, a type of sound or the like; and
(4) segment info (SegmentInfo) that serves as an information recording region of a unit of a segment (AV segment) of an image or sound.

Figure 10:
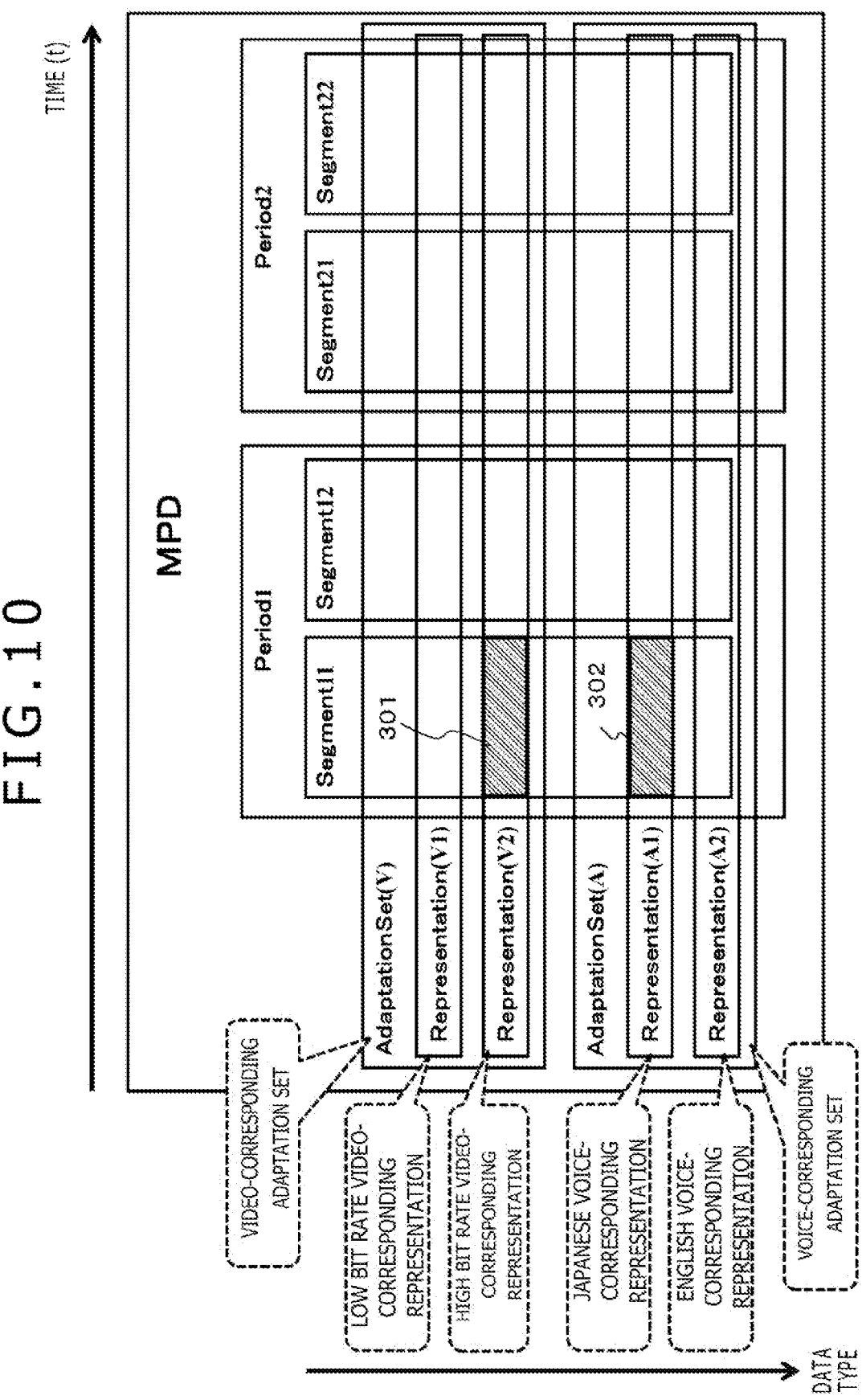
FIG. 10 is a view illustrating an example of a configuration of the MPD.

FIG. 10 is a view depicting information corresponding to an AV segment recorded in the MPD (control information, management information, attribute information and so forth) in a deployed form in a time series.

It is assumed that the time passes from the left to the right. This time axis corresponds to a reproduction time period, for example, of the AV content in the reception apparatus.

Various information corresponding to an AV segment is recorded in the MPD. It is to be noted that the MPD is part of signaling data and is transmitted, for example, prior to an AV segment.

The MPD allows recording of information in units of data given below as described hereinabove with reference to FIG. 9:

(1) period (Period) that prescribes an interval on a time axis;
(2) adaptation (Adaptation) that prescribes a data type and so forth of an image, sound or the like;
(3) representation (Representation) that prescribes a type of an image, a type of sound or the like; and
(4) segment info (SegmentInfo) that serves as an information recording region of a unit of a segment (AV segment) of an image or sound.

FIG. 10 is a view depicting the data regions described above in a deployed form on the time axis and by data type.

FIG. 10 depicts the following two adaptations (Adaptation):

(V) adaptation V (Adaptation (V)) that is an image-corresponding information recording region; and
(A) adaptation A (Adaptation (A)) that is a sound-corresponding information recording region.

(V) The adaptation V (Adaptation (V)) that is an image-corresponding information recording region has the following two representations (Representation) as information recording regions in a unit of a stream having different attributes from each other:

(V1) representation (V1) (Representation (V1)) that is an information recording region corresponding to a low bit rate image; and
(V2) representation (V2) (Representation (V2)) that is an information recording region corresponding to a high bit rate image.

Similarly, (A) the adaptation A (Adaptation (A)) that is a sound-corresponding information recording region has the following two representations (Representation) as information recording regions in a unit of a stream having different attributes from each other:

(A1) representation (A1) (Representation (A1)) that is an information recording region corresponding to a Japanese language voice; and
(A2) representation (A2) (Representation (A2)) that is an information recording region corresponding to an English language voice.

Further, each representation (Representation) has a configuration that allows recording of information in a unit of a period and a segment corresponding to the reproduction time axis.

For example, a reception apparatus (client) that selects and reproduces a high bit rate image and a Japanese language voice selects and acquires, upon reproduction of a segment (11) of a period 1, information relating to a high bit rate image and a Japanese language voice that are a target of reproduction from the MPD.

The recorded information of the MPD that is a target of selection is information of segment regions 301 and 302 depicted in FIG. 10.

In this manner, the reception apparatus selects and refers only to information corresponding to data (segment), which is made a target of reproduction by the own apparatus, from the MPD transmitted as signaling data from the transmission apparatus.

In this manner, the MPD allows recording of segment-corresponding information by data type in a unit of a time period.

As described hereinabove with reference to FIG. 5, when a content outputting process for outputting a broadcasting program and an advertisement alternately is to be performed, the transmission apparatus can control a content (broadcasting program and advertisement) in a unit of a time period for the reception apparatus by utilizing the MPD in which control information in a unit of a predetermined time period (period) described hereinabove is recorded. In particular, the process for providing an advertisement corresponding to a user described hereinabove with reference to FIG. 5 can be implemented.

Figure 11:
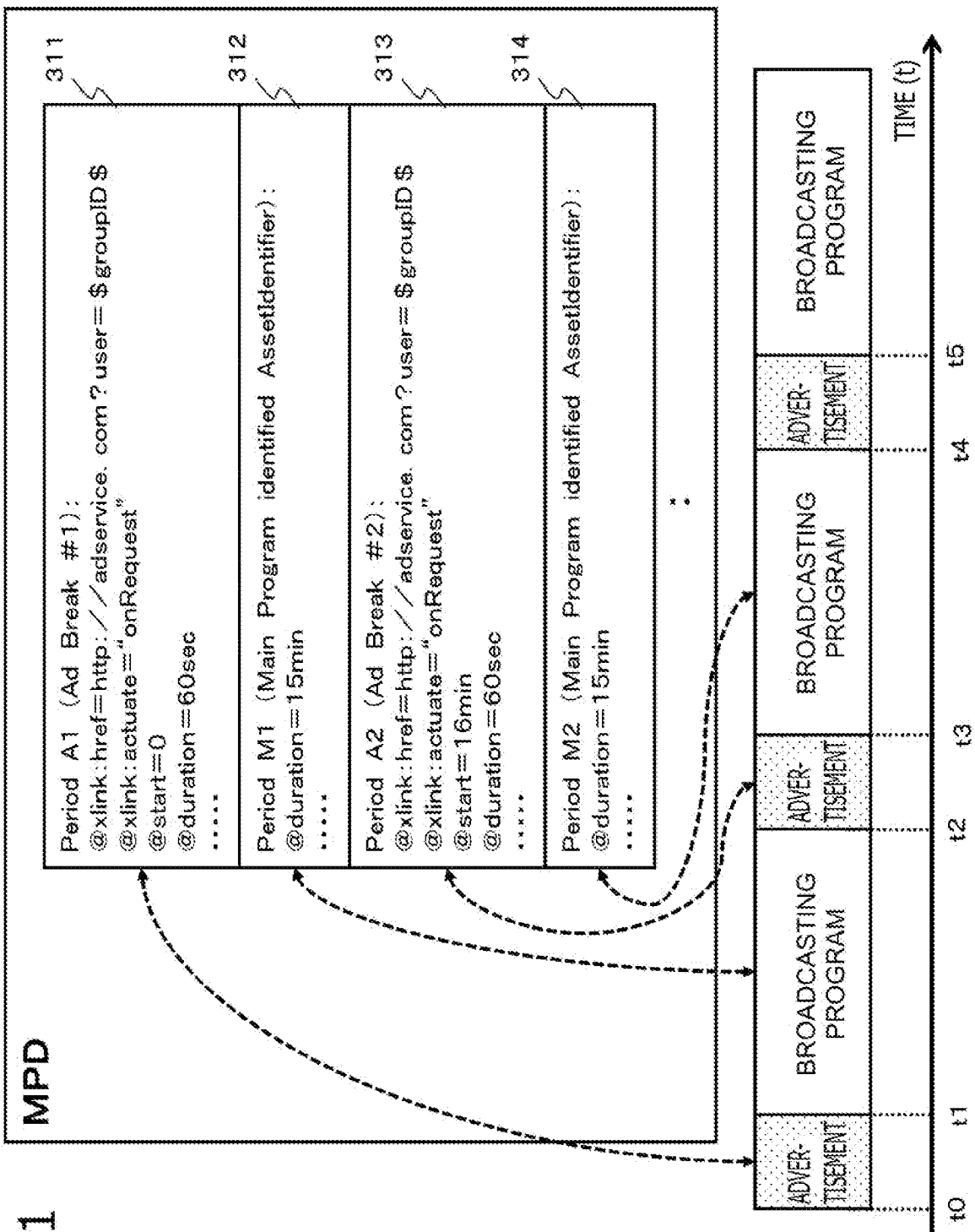
FIG. 11 is a view illustrating an example of a configuration of the MPD.

FIG. 11 is a view depicting an example of a configuration of the MPD that is control information describing data (signaling data) corresponding to a content outputting process for outputting a broadcasting program and an advertisement alternately described hereinabove with reference to FIG. 5.

The MPD is divided into period information 311 to 314 of a unit of an advertisement and a broadcasting program corresponding to an output content within an interval of a predetermined period of time.

The period information 311 is control information (signaling data) corresponding to an advertisement outputted from the reception apparatus within a time period t0 to t1.

The period information 312 is control information (signaling data) corresponding to a broadcasting program outputted from the reception apparatus within a time period t1 to t2.

The period information 313 is control information (signaling data) corresponding to an advertisement outputted from the reception apparatus within a time period t2 to t3.

The period information 314 is control information (signaling data) corresponding to a broadcasting program outputted from the reception apparatus within a time period t3 to t4.

The period information has recorded therein information necessitated to acquire data (content) to be outputted to the reception apparatus such as access information (URL) to a broadcasting program or an advertisement and so forth transmitted from the transmission apparatus and various types of information necessitated by the reception apparatus to acquire and output a content such as a decoding method (codec) and so forth.

The transmission apparatus transmits the MPD depicted in FIG. 11 to the reception apparatus before time t0. The reception apparatus refers to the MPD to acquire an advertisement or a broadcasting program through a broadcasting wave or a network, performs decoding processing and so forth using a designated codec and outputs a result of the process to a display unit, a speaker or the like.

Figure 12:
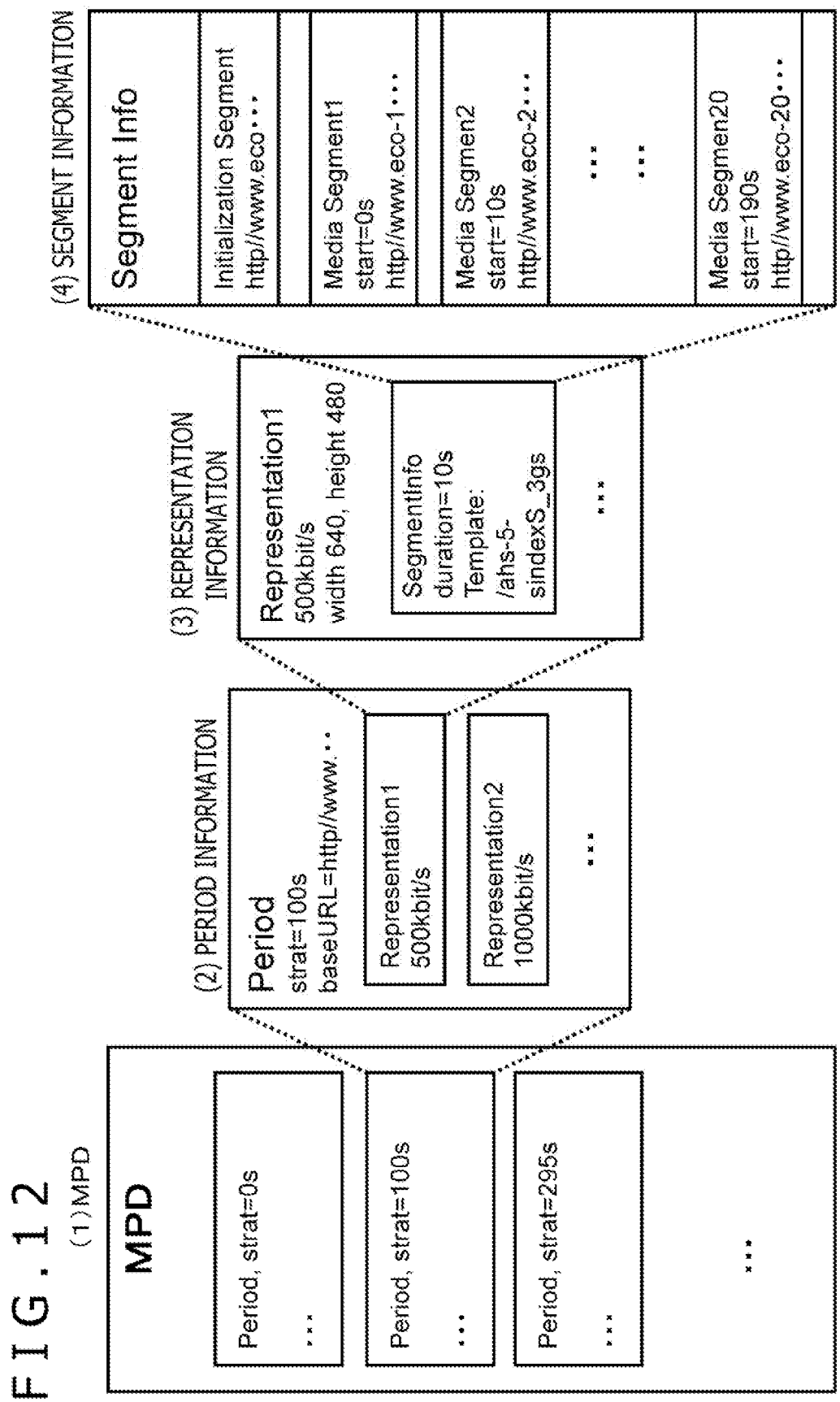
FIG. 12 is a view illustrating an example of a utilization sequence of the MPD.

FIG. 12 is a view illustrating a procedure of an analysis process (parse) of an MPD executed by the reception apparatus.

FIG. 12 depicts figures of the followings:
(1) MPD;
(2) period information;
(3) representation information; and
(4) segment information.

The reception apparatus (client) that receives an AV content and executes a reproduction process of the AV segment acquires the MPD included in signaling data received in advance before reception of the AV segment and acquires information corresponding to data to be reproduced by the own apparatus from the MPD.

First, the reception apparatus selects (2) the period information that records information of a specific period (time interval) corresponding to an AV segment reproduction time period from (1) the MPD depicted in FIG. 10.

Further, the reception apparatus selects (3) the presentation information corresponding to the type of the data to be reproduced by the own apparatus (client) and further selects (4) the segment information corresponding to the reproduction target segment.

By referring to the data recorded in (4) the segment information, acquisition of an AV segment that becomes a reproduction target and acquisition of various information necessary for reproduction of the AV segment can be performed.

7. Example of Particular Configuration for Executing Advertisement Providing Process According to User Information Now, an example of a particular configuration for executing an advertisement provision process according to user information is described.

A configuration of one period information 311 in the MPD depicted in FIG. 11 is described with reference to FIG. 13.

As can be recognized from FIG. 11, the period information 311 is period information that is control information corresponding to an advertisement outputted from the reception apparatus within the period of time t0 to t1.

Figure 13:
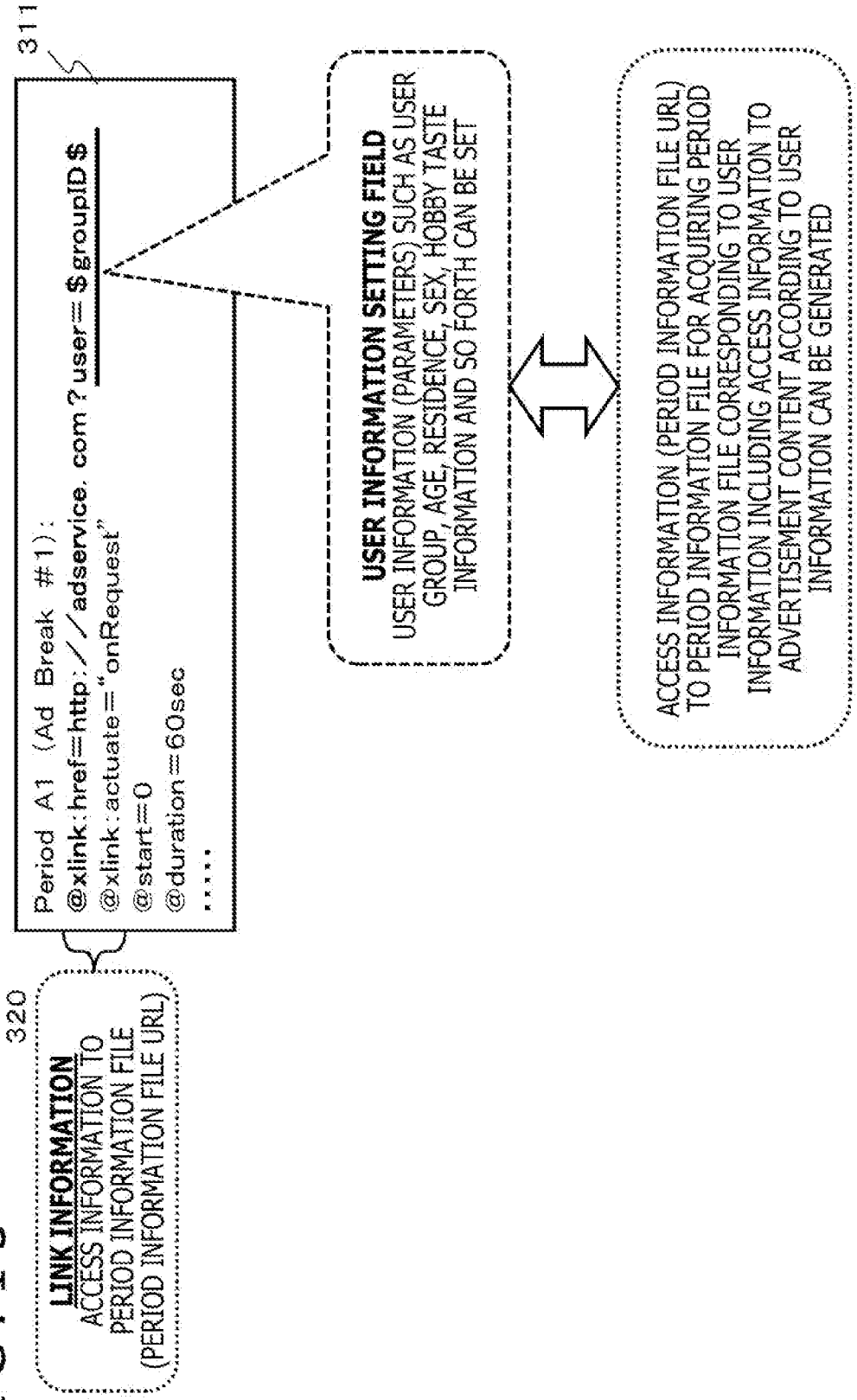
FIG. 13 is a view illustrating an example of a configuration of advertisement-corresponding period information in the MPD.

As depicted in FIG. 13, the period information 311 corresponding to an advertisement has the following description data.

Period A1 (Ad Break #1):
@xlink:href=http://adservice.com?user=$groupID$
@xlink:actuate="onRequest"
@start=0
@duration=60 sec
. . .

The period information 311 corresponding to an advertisement omits description of particular data of
the adaptation,
the representation, and
the segment info
described hereinabove with reference to FIGS. 10 and 12 but has recorded therein link information (Xlink) as access information for acquiring period information having particular description of them.

The reception apparatus sets user information (parameter) to a user information setting field (user=$groupID$)

included in the link information (Xlink) in the period information 311 corresponding to an advertisement depicted in FIG. 13.

Data (data to which user information is set already) setting the user information (parameter) to the user information setting field (user=$groupID$) thereof becomes access information (URL) or configuration data of the URL of the period information file corresponding to advertisement data corresponding to the user.

In particular, in the period information corresponding to an advertisement in the MPD depicted in FIGS. 11 and 13, access information (segment URL) to a segment file in which advertisement data is placed is not recorded.

By setting user information (parameter) to the user information setting field included in the link information (Xlink) in the period information corresponding to an advertisement in the MPD depicted in FIGS. 11 and 13, access information (URL) for acquiring a true period information file in which access information for acquiring advertisement data (segment file) corresponding to a user is recorded is completed. Alternatively, data for specifying access information (URL) for acquiring a true period information file is completed.

A data configuration of the period information 311 corresponding to an advertisement depicted in FIG. 13 is described.

"Period A1 (Ad Break #1)" is an identifier recording region for period information and indicates that the period information is period information relating to an advertisement (Ad) of the identifier (A1).

"@xlink:href=http://adservice.com? user=$groupID$"
This information recording field is a link (Xlink) information recording field.

It is to be noted that "@xlink:href=http:" indicates that the field is a setting field for a URL to be referred to.

In the present configuration, particularly the information recording field is a field that has recorded therein access information (URL) for acquiring a period information file having a description of particular data of the original period information, namely, the following data:
adaptation;
representation; and
segment info
described hereinabove with reference to FIGS. 10 and 12.

However, the access information (URL) for acquiring a true period information file corresponding to advertisement data selected in accordance with user information only after user information (parameter) is set to the user information setting field (user=$groupID$) is completed.

In the user information setting field, for example, an age, a sex, an address, a hobby, a taste and so forth of a viewer (user) can be set.

As an example of setting of an age, for example, such setting as "age=10-19" is possible. This setting indicates that the age of the user is within the range of 10 to 19 years old.

As an example of setting of an address, for example, such setting as "location=LA" is possible. This setting indicates that the user lives in Los Angeles (LA).

By setting such user information to the user information setting field (user=$groupID$), access information (URL) to a true period information file including all control information (adaptation, representation, segment info and so forth) relating to advertisement data corresponding to a user can be completed.

"@xlink:actuate="onRequest""
Also this information recording field is a component of the link (Xlink) information recording field.

It is to be noted that "@xlink:actuate=" indicates that this field is a field that prescribes an acquisition timing of data accessed depending upon the URL indicated by the "@xlink:href=."

In the case of the present configuration, this field is a field that prescribes an acquisition timing of a period information file that can be acquired utilizing the parameter setting URL described hereinabove.

As the setting of the acquisition timing, two types of
(a) actuate="onRequest," and
(b) actuate="onLoad"
can be set.

(a) actuate="onRequest"
This setting indicates that the acquisition timing of a period information file that can be acquired utilizing the parameter setting URL described hereinabove is any time before an advertisement starting timing (in the example of FIG. 11, time t0).

(b) actuate="onLoad"
This setting indicates that this is a setting for requesting to perform acquisition of a period information file that can be acquired utilizing the parameter setting URL described hereinabove immediately after acquisition of the MPD depicted in FIG. 11.

"@start=0"
This information recording field is a field in which an output starting timing of data (advertisement content) corresponding to period information is recorded. This information indicates that an advertisement is started at start (starting time)=0 (corresponding to time t0 in the example of FIG. 11).

@duration=60 sec"
This information recording field is a field in which an output duration of data (advertisement content) corresponding to period information is recorded.

duration (duration)=60 sec indicates that this is an advertisement for 60 seconds.

As described with reference to FIG. 11 or 13, the configuration of the present disclosure is configured such that a user information setting field is provided in period information corresponding to an advertisement output time interval set to an MPD such that a provision advertisement can be changed dynamically in response to the user information set in each reception apparatus (client).

An MPD distributed to the reception apparatus (client) (distributed, for example, by service signaling) can describe access information (URL) to a period information file with user information set to the position of MPD/Period/@xlink:href.

This URL can be recognized as access information (URL) to a specific period information file, for example, by the link resolution unit (Xlink Resolver) 122 of the proxy server 120 of the reception apparatus.

The URL is encoded, for example, in such a form as http://a.com?user=$groupID$, and the reception apparatus (client) inserts, for example, a value of a group ID (groupID) as the user information for specifying an end user into a parameter part of groupID.

For example, http://a.com?user=classA.

This user information setting URL is issued as an http request to the link resolution unit (XLink Resolver) on the HTTP server, incorporated in a remote http server or a client device.

The link resolution unit (Xlink Resolver) returns a period information file, which is generated for a user of classA and includes a URL or the like of an advertisement segment distributed by the ROUTE protocol (in the case where a unidirectional multicast network (including a broadcast of a terrestrial wave) is passed) or the HTTP (in the case where a bidirectional network is passed), to the reproduction controlling unit of the reception apparatus.

The reproduction controlling unit of the reception apparatus performs an acquisition process of an advertisement segment using the advertisement segment URL recorded in the period information file and reproduces an advertisement.

A processing sequence when such period information 311 corresponding to advertisement data as depicted in FIG. 13 is applied such that the reception apparatus side acquires and outputs (reproduces) the advertisement data is described with reference to a flow chart depicted in FIG. 14.

Figure 14:
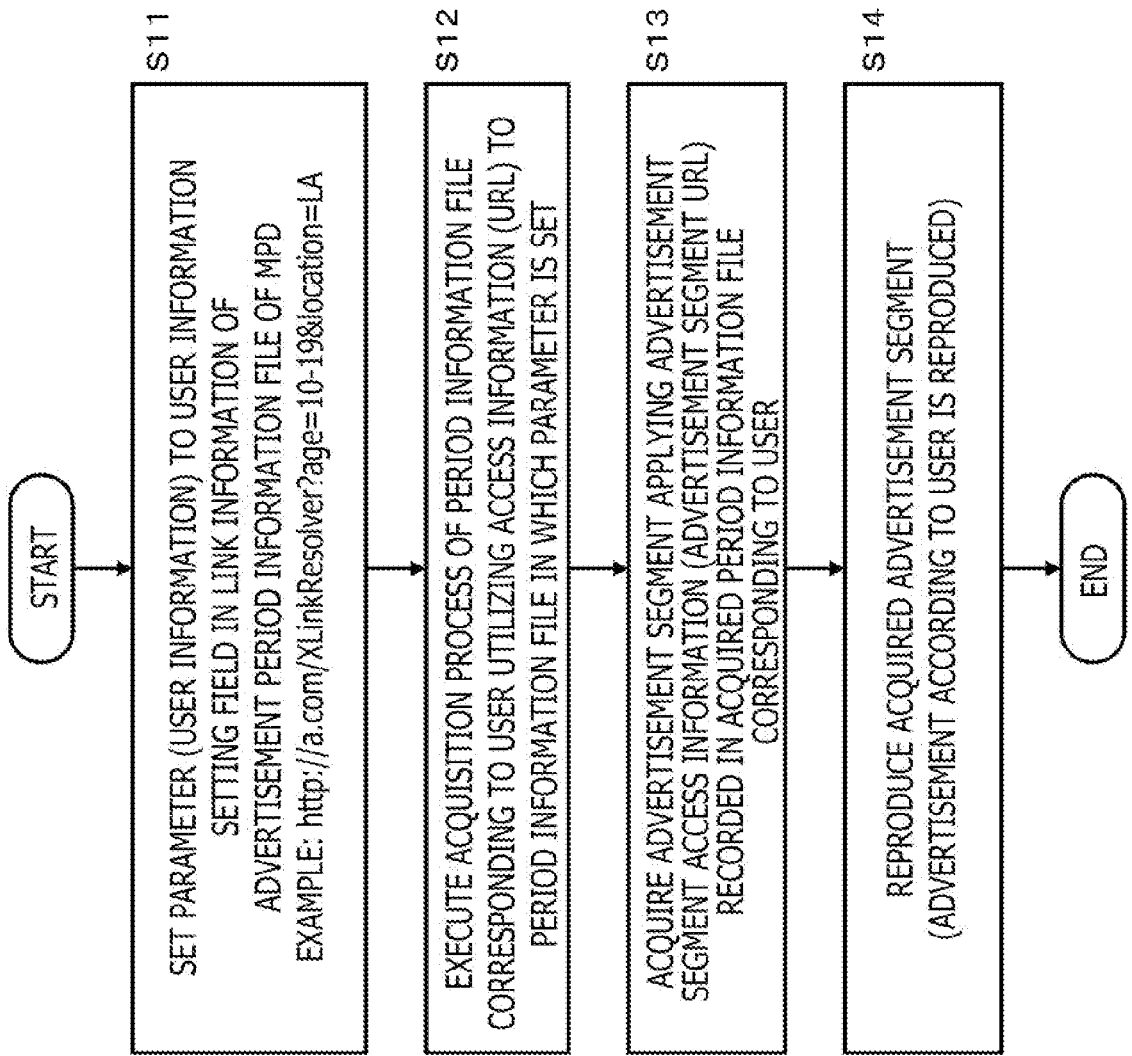
FIG. 14 is a view illustrating a processing sequence that utilizes advertisement-corresponding period information of the MPD.

The flow chart depicted in FIG. 14 is a flow chart illustrating a processing sequence executed by the reception apparatus that acquires an MPD in which information in a unit of a period illustrated, for example, in FIG. 11 or 13 is recorded.

In the following, processes at steps are successively described.

(Step S11)

First, the reception apparatus selects, as signaling data corresponding to a program of a control target, period information corresponding to an advertisement (Ad) from an MPD received already before starting of the program, for example, an MPD including the period information 311 to 314 depicted in FIG. 11.

Further, the reception apparatus sets a parameter (user information) to the "user information setting field" set in the link information (Xlink) in the period information corresponding to the selected advertisement (Ad).

By this parameter setting, access information (URL) to the period information file in which control information corresponding to an advertisement content optimum to a user is recorded is completed.

For example, such a parameter setting URL as given below is generated.

Example of parameter setting URL:
http://a.com/XlinkResolver?age=10-19&location=LA.
The URL example above is a URL to which
the age (age)=10 to 19 years old and
the address or residence (Location)=LA (Los Angeles)
are set as the user information.

Depending upon this parameter setting URL, period information corresponding to a user in which access information (segment URL) or the like to an advertisement content optimum to a user (viewer) who lives in Los Angeles and is 10 to 19 years old is recorded can be acquired.

(Step S12)

Then, the reception apparatus executes, at step S12, an acquisition process of a period information file corresponding to a user utilizing the access information (URL) to the period information file to which the parameter is set.

Period information files corresponding to various users and different from each other can be acquired at any time, for example, through a broadcasting wave or a network. The period information file is part of the signaling data 50 described hereinabove with reference to FIG. 2 and is transmitted at any time through a broadcasting wave or a network from the transmission apparatus 20. The reception apparatus 30 specifies the period information file to be acquired depending upon the URL generated at step S11 and having the parameter set already and acquires one period information file corresponding to the user.

(Step S13)

Then at step S13, the reception apparatus applies the advertisement segment access information (advertisement segment URL) recorded in the acquired period information file corresponding to the user to acquire an advertisement segment.

The acquired period information file corresponding to the user has recorded therein the information described hereinabove with reference to FIGS. 9 and 12, namely,
the adaptation information,
the representation information, and
the segment info information
and has stored therein all information necessary for acquisition and reproduction of advertisement data corresponding to the user.

The reception apparatus applies the advertisement segment access information (advertisement segment URL) recorded in the acquired period information file corresponding to the user to acquire an advertisement segment.

(Step S14)

Finally at step S14, the reception apparatus, which is a user apparatus, outputs (reproduces) the acquired advertisement segment. It is to be noted that outputting time and so forth are recorded in the acquired period information file.

By the processes described above, to the reception apparatus, an advertisement optimum to the user (viewer) is outputted.

If
the age (age)=10 to 19 years old, and
the address or residence (Location)=LA (Los Angeles)
are set as the parameters described hereinabove as a parameter setting example at step S11, namely, as the user information,
at step S14, an advertisement whose main target is a viewer (user) who lives in Los Angeles and is 10 to 19 years old is selected and outputted.

Now, an example of period information 311b corresponding to an advertisement different from the period information 311 corresponding to an advertisement depicted in FIG. 13 is described with reference to FIG. 15.

The period information 311 corresponding to an advertisement depicted in FIG. 13 omits description of particular data of
the adaptation,
the representation, and
the segment info
described hereinabove with reference to FIGS. 10 and 12 but has recorded therein link information (Xlink) as access information for acquiring period information having particular description of them.

The reception apparatus sets user information (parameter) to the user information setting field (user=$groupID$) in the access information (URL) included in the link information (Xlink) in the period information 311 corresponding to an advertisement depicted in FIG. 13 and acquires a period information file in which control information relating to advertisement data corresponding to a user is recorded using the access information (URL) set in the user information (parameter).

However, if this configuration is adopted, then there is the possibility that, if a period information file cannot be acquired before advertisement outputting time applying the access information (URL) in which the user information (parameter) is set, then a situation in which a user-corresponding advertisement cannot be outputted may occur.

Figure 15:
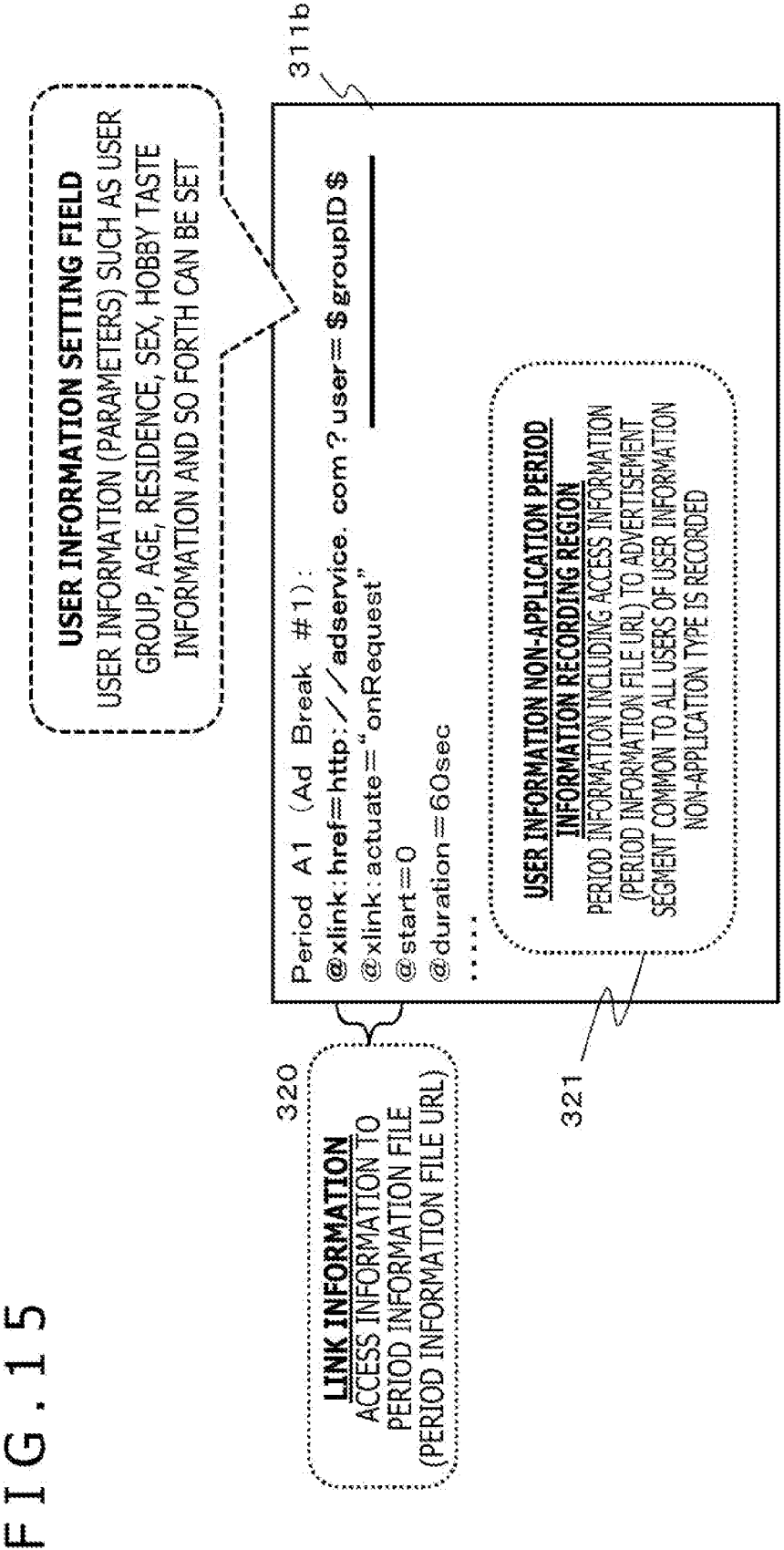
FIG. 15 is a view illustrating an example of a configuration of advertisement-corresponding period information in the MPD.

The period information 311b depicted in FIG. 15 has a configuration that can prevent such a situation as just described.

The period information 311b depicted in FIG. 15 has a configuration that, in addition to link information 320 including the user information setting field, period information relating to an advertisement that can be provided commonly to many users without applying user information is recorded in advance therein.

In a user information non-application period information recording region 321 depicted in FIG. 15, period information relating to an advertisement that can be provided commonly to many users is recorded.

In particular, in the user information non-application period information recording region 321, a description of particular data of all of the period information relating to an advertisement that can be provided commonly to many users, namely, of the adaptation, representation, and segment info is included.

By applying such a configuration as described above, even when period information relating to an advertisement corresponding to a user cannot be acquired depending upon a user information (parameter) setting URL, the reception apparatus can apply the period information 311*b* to acquire an advertisement segment and output the advertisement segment.

Figure 16:
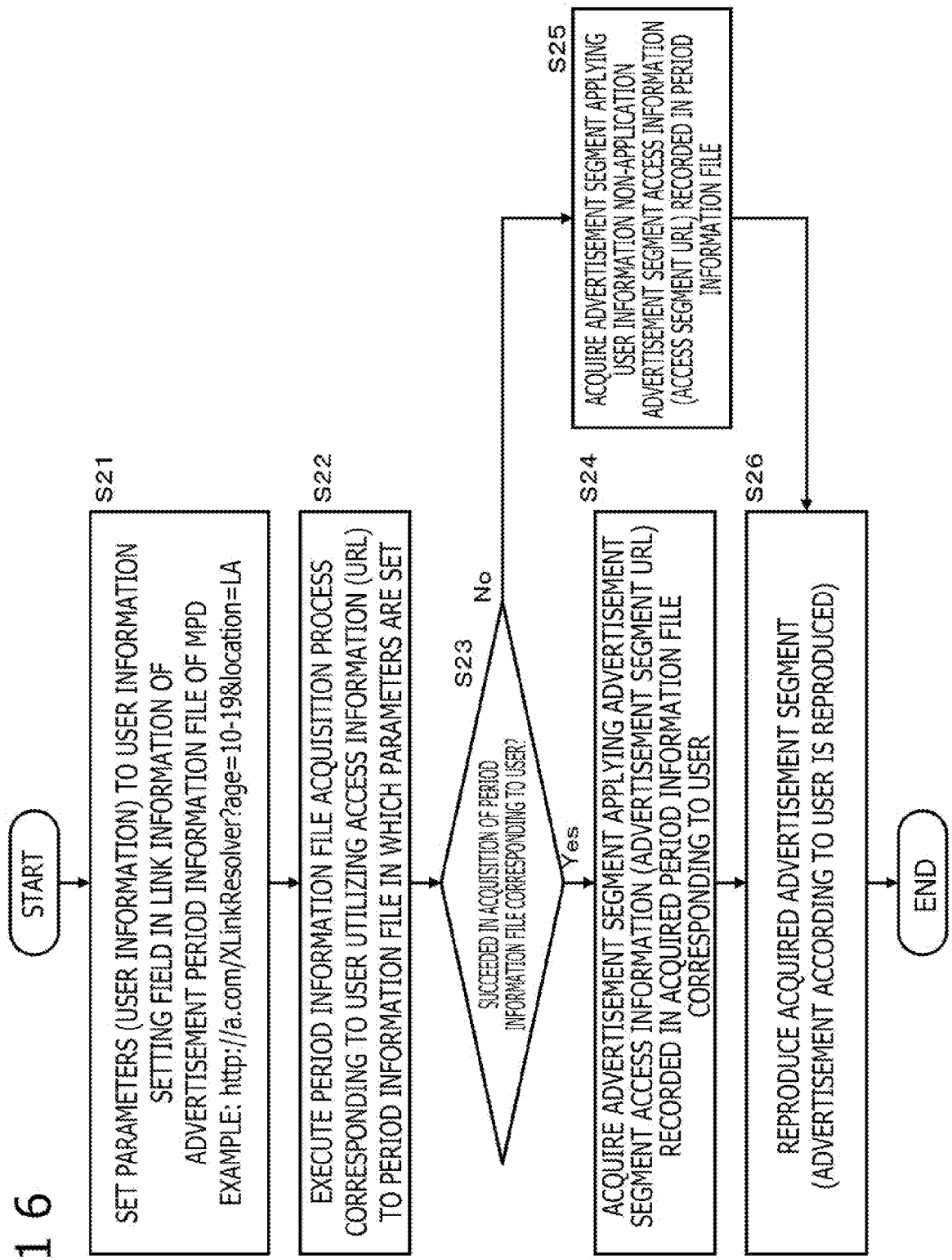
FIG. 16 is a view illustrating a processing sequence that utilizes the advertisement-corresponding period information of the MPD.

A processing sequence when the period information 311*b* having the user information non-application period information recording region 321 depicted in FIG. 15 is applied to acquire advertisement data and output (reproduce) the advertisement at the reception apparatus side is described with reference to a flow chart depicted in FIG. 16.

In the following, processes at individual steps are successively described.
(Steps S21 and S22)

Processes at steps S21 and S22 are similar to those at steps S11 and S12 described hereinabove with reference to the flow depicted in FIG. 14.

First, the reception apparatus selects, from within an MPD received already before starting of a program of a control target as signaling data corresponding to the program, for example, an MPD including the period information 311 to 314 depicted in FIG. 11, period information corresponding to the advertisement (Ad). Further, a parameter (user information) is set to the "user information setting field" set in the link information (Xlink) in the selected period information corresponding to an advertisement (Ad).

By this parameter setting, access information (URL) to the period information file in which control information corresponding to an advertisement content optimum to the user is recorded is completed.

For example, such a parameter setting URL as given just below is generated.
Example of parameter setting
URL:http://a.com/XLinkResolver?age=10-19&location=LA.

Then, at step S22, the reception apparatus executes an acquisition process of a period information file corresponding to the user utilizing the access information (URL) to the period information file in which the parameter is set.
(Step S23)

At step S23, the reception apparatus decides whether or not acquisition of a user-corresponding period information file results in success within a period of time prescribed in advance.

If the acquisition results in success, then the processing advances to step S24, but if the acquisition results in failure, then the processing advances to step S25.
(Step S24)

If it is confirmed at step S23 that the acquisition of a user-corresponding period information file results in success, then the reception apparatus acquires, at step S24, an advertisement segment applying the advertisement segment access information (advertisement segment URL) recorded in the acquired period information file corresponding to the user.
(Step S25)

On the other hand, if it is confirmed at step S23 that the acquisition of the user-corresponding period information file results in failure, then the reception apparatus reads, at step S25, user information non-application period information recorded in the period information (period information 311*b* depicted in FIG. 15) acquired already, and acquires an advertisement segment applying the advertisement segment access information (advertisement segment URL) recorded in the period information 311*b*.
(Step S26)

Finally at step S26, the reception apparatus, which is a user apparatus, outputs (reproduces) the acquired advertisement segment. It is to be noted that an outputting time period and so forth are recorded in the acquired period information file.

When the process at step S24 is executed, an advertisement corresponding to the user (viewer) information is outputted.

On the other hand, when the process at step S25 is executed, an advertisement that does not apply the user (viewer) information and is provided commonly to many users is outputted.

As described above with reference to FIGS. 13 to 16, the period information in which link information is recorded allows various settings, and a process according to the recorded information is executed by the reception apparatus.

Figure 17:
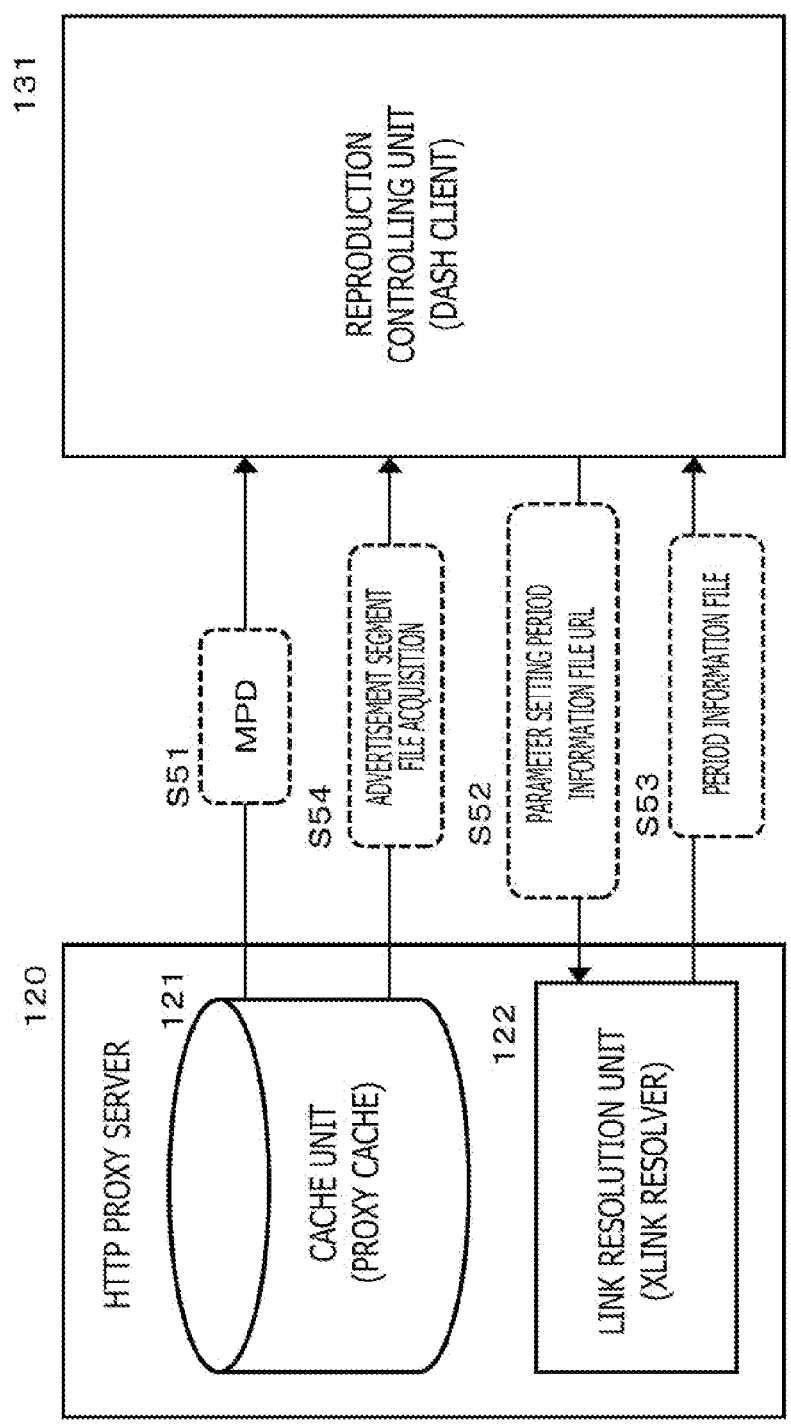
FIG. 17 is a view illustrating a processing sequence that utilizes the advertisement-corresponding period information of the MPD.

FIG. 17 is a view illustrating a processing sequence by the reception apparatus 30.

In FIG. 17, a proxy server 120 and a reproduction controlling unit (DASH Client) 131 of the reception apparatus 30 are depicted.

The proxy server 120 acquires various data transmitted from the transmission apparatus 20 through a broadcasting wave or a network in advance and stores the data into a cache unit (proxy cache) 121.

The reproduction controlling unit 131 first acquires, at step S51, an MPD including signaling data (control information) corresponding to a viewing target program from the proxy server 120.

For example, the MPD depicted in FIG. 11 is acquired.

Then, the reproduction controlling unit 131 sets user information (parameter) to the access information (URL) including the user information setting field recorded in the acquired MPD.

At step S52, the reproduction controlling unit 131 outputs the user information (parameter) setting URL to the link resolution unit (Xlink Resolver) 122 of the proxy server 120.

The link resolution unit (Xlink Resolver) 122 of the proxy server 120 analyzes the user information (parameter) setting URL to acquire a period information file corresponding to the URL from the cache unit 121 and outputs the period information file to the reproduction controlling unit 131 at step S53.

The reproduction controlling unit 131 applies the advertisement segment URL recorded in the acquired period information file to acquire and output an advertisement segment from the proxy server 120 at step S54.

By such a sequence as described above, an advertisement corresponding to the user is selectively outputted.

It is to be noted that, if data requested from the reproduction controlling unit 131 is not stored in the cache unit 121 of the proxy server 120, then the proxy server 120 executes a data acquisition process through a broadcasting wave or a network.

8. Particular Working Examples of Providing and Utilization Processes of Period Information File for Outputting Selected Content Corresponding to User Information to Reception Apparatus In the following, particular working examples of provision and utilization processes of a period information file for outputting a selected content corresponding to user information to a reception apparatus are described.

A plurality of working examples below are successively described.

(Working example 1) Working example wherein a URL with a query parameter, which serves as access information (URL) to a period information file is provided to a reception apparatus (Working example 2) Working example wherein a mapping table of access information (URL) to a period information file and a URL with a query parameter (or query parameter) is provided to a reception apparatus (Working example 3) Working example wherein a script (program) for generating a period information file with a URL with a query parameter inputted is provided to a reception apparatus (Working example 4) Working example wherein a period information file is placed into a cache unit (proxy cache) utilizing a service worker (SW)

(Working example 5) Working example wherein a period information file is generated utilizing a service worker (SW) with a URL with a query parameter inputted (Working example 6) Working example wherein question-answer type metadata (PDI) is utilized (Working example 6-1) Working example wherein a mapping table of access information (URL) to a period information file and a PDI instance is provided to a reception apparatus (Working example 6-2) Working example wherein a PDI table is utilized in a configuration in which a script (program) for generating a period information file with a URL with a query parameter inputted is provided to a reception apparatus (Working example 6-3) Working example wherein a PDI table is utilized in a configuration in which a period information file is stored into a cache unit (proxy cache) utilizing a service worker (SW)

(Working example 6-4) Working example wherein a PDI table is utilized in a configuration in which a period information file is generated utilizing a service worker (SW) with a URL with a query parameter inputted.

In the following, details of the working examples are successively described.

8-1. (Working Example 1) Working Example Wherein URL with Query Parameter, which Serves as Access Information (URL) to Period Information File, is Provided to Reception Apparatus First, as the working example 1, a working example is described wherein a URL with a query parameter, which serves as access information (URL) to a period information file is provided to the reception apparatus.

The query parameter is a parameter that becomes an answer to a predetermined query (question).

The query (question) is a question regarding user information such as, for example, age (age)?

Location (residence)?

The query parameter is an answer to this and is age=35, and

Location=LA

The URL with a query parameter is a URL to which user information (query parameter) wherein predetermined user information (query parameter) is recorded in advance in the user information setting field of an advertisement-corresponding period information file in an MPD described hereinabove with reference to FIG. 11, FIG. 13 or the like is set already.

The URL with a query parameter can be utilized as access information (URL) to one period information file determined by a set query parameter (user information).

The query parameter is, for example, such parameters (user information) as described below.

(1) age=10 to 19

(2) age=10 to 19, Location=LA (3) age=20 to 50,

. . .

In the user information setting field of the period information file of the MPD described hereinabove with reference to FIG. 11, FIG. 13 and so forth, various query parameters (user information) can be set.

The transmission apparatus prepares, as access information to a plurality of period information files corresponding to a plurality of advertisements prepared in response to various user information in advance, a plurality of URLs with a query parameter, and provides the plurality of URLs with a query parameter as signaling data to the reception apparatus.

Figure 18:
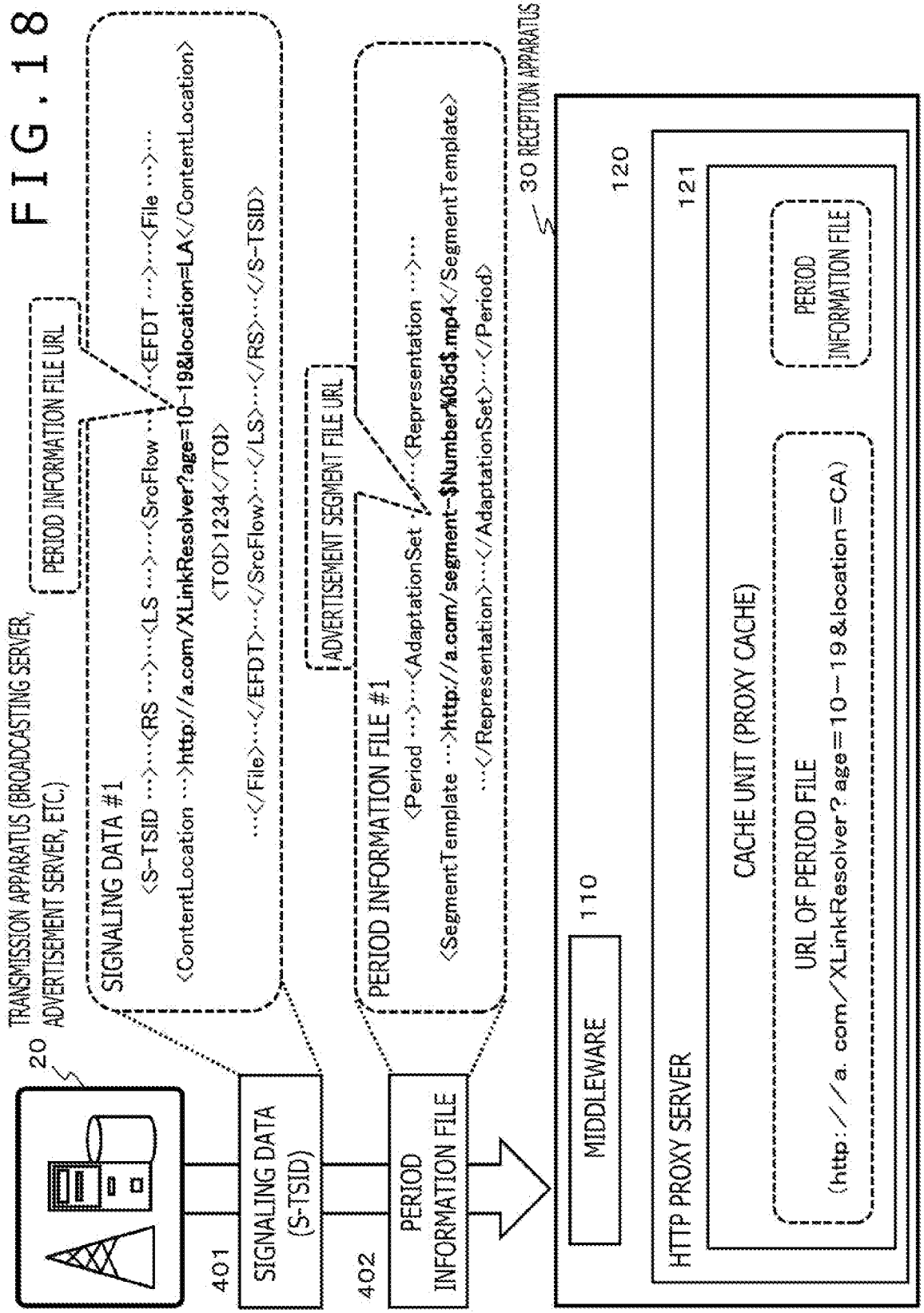
FIG. 18 is a view illustrating an example of a providing process of signaling data or a period information file including a URL with a query parameter.

Signaling data #1 depicted in FIG. 18 is one piece of signaling data including a URL in which one query parameter (age=10, Location=LA) is set from among the plurality of URLs with a query parameter to be provided to the reception apparatus.

The transmission apparatus 20 multicast transmits, in addition to the signaling data #1 depicted in FIG. 18, a large number of URLs having a large number of query parameters (user information) set therein as signaling data.

In the working example 1, a URL with a query parameter that is access information (URL) to a period information file is stored in signaling data, which is metadata compliant with the ROUTE protocol, and provided to the reception apparatus 30.

In the present working example 1, as the signaling data, S-TSID (Service based Transport Session Description) is used.

A URL with a query parameter is stored into the content location (ContentLocation) element or the header of the S-TSID and provided to the reception apparatus.

Further, the transmission apparatus 20 multicast (broadcasting) distributes also a period information file (Period file) including a description of access information (segment URL) to an advertisement segment (AdSegment) in which advertisement data corresponding to a query parameter (user information) is stored to the reception apparatus (client) by the ROUTE protocol. The transmission apparatus transmits a large number of period information files individually corresponding to various advertisement contents in response to an age or an address of a user.

As an example of a transmission process of signaling data (S-TSID) in which URL with a large number of different query parameters is recorded and a period information file, examples of a process where two different data transfer modes given below, namely, (a) file mode, and
(b) entity mode
prescribed by the ROUTE protocol are described.

The file mode is a mode in which a data transfer process in a unit of a file is executed. The entity mode is a mode that permits data transfer in a unit of an entity including a plurality of files.

First, an example of a process in which signaling data (S-TSID) in which a URL with a large number of different query parameters is recorded and a large number of period information files are provided to the reception apparatus by utilizing the file mode is described with reference to FIG. 18 and so forth.

FIG. 18 depicts a transmission apparatus 20 and a reception apparatus 30.

The transmission apparatus 20 multicast transmits signaling data 401 and a period information file 402 in accordance with the file mode of the ROUTE protocol. The reception apparatus 30 receives the data at the middleware 110 having a communication unit and stores the data into the cache unit (proxy cache) 121 of the proxy server 120.

The signaling data 401 is data including a URL having a query parameter recorded in the user information setting field thereof.

The period information file 402 is a period information file including access information (advertisement segment file URL) to various advertisement contents according to an age or an address of a user.

For the signaling data 401, for example, the S-TSID (Service based Transport Session Description) prescribed in the ROUTE protocol is utilized. The URL having the user information (query parameter) recorded therein is recorded into the content location (ContentLocation) element, which is one data element of the S-TSID and is transmitted.

As depicted in FIG. 18, one URL in which a specific query parameter (user information), which becomes access information (URL) to the period information file, is set is stored into the S-TSID/RS/LS/SrcFlow/EFDT/File/ContentLocation element of S-TSID that is the signaling data 401 and is multicast (broadcasting) distributed to the reception apparatus 30.

The reproduction controlling unit 131 of the reception apparatus 30 sets user information (parameters), for example, age=10 to 19, and
Location=LA
to the user information setting field (query parameter) in the advertisement corresponding period information in the MPD described hereinabove, for example, with reference to FIGS. 11 and 13 to complete the URL, and outputs the URL to the link resolution unit 122 of the proxy server 120.

The link resolution unit 122 compares a URL inputted from the reproduction controlling unit 131 and a URL recorded in signaling data 140 and having a query parameter (user information) set therein already. The link resolution unit 122 selects signaling data (S-TSID) in which the URL having the query parameter (user information) set therein already and coincident with the URL inputted from the reproduction controlling unit 131 is recorded, acquires one period information file on the basis of the URL recorded in the selected signaling data (S-TSID) and having a query parameter (user information) set therein already, and outputs the period information file to the reproduction controlling unit 131.

For example, on the basis of the signaling data #1 depicted in FIG. 18, the period information file #1 depicted in FIG. 18 is selected and provided to the reproduction controlling unit 131.

The period information file #1 depicted in FIG. 18 becomes a period information file in which access information to an advertisement content optimum to a user of 10 to 19 years old living in LA, limited by the user information as a query parameter recorded in the signaling data #1 depicted in FIG. 18, namely, by age=10 to 19, and
Location=LA
is recorded.

It is necessary that the signaling data depicted in FIG. 18 and the period information file correspond in a one-by-one corresponding relationship to each other. This correspondence relationship is described with reference to FIG. 19.

Figure 19:
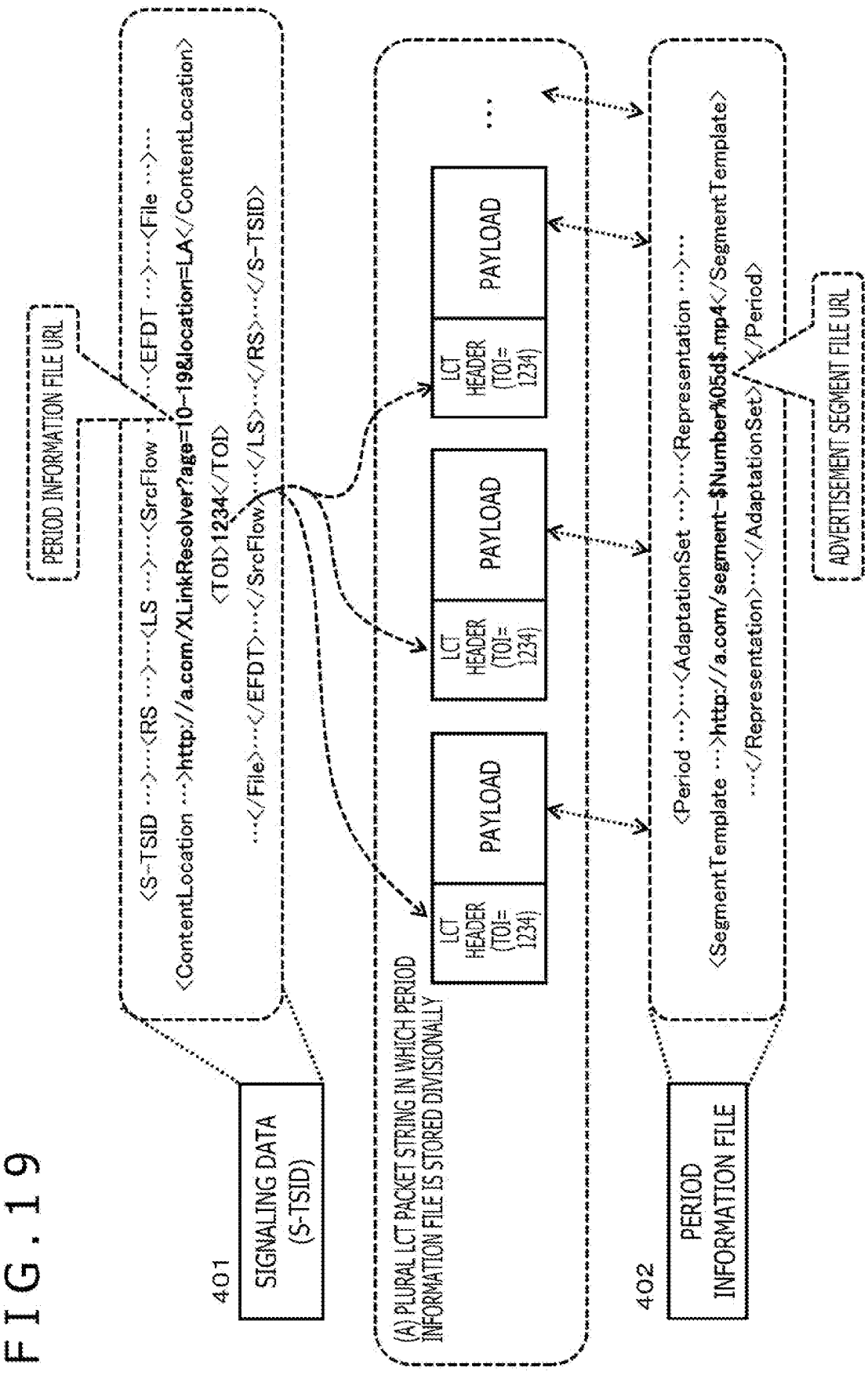
FIG. 19 is a view illustrating an example of setting of a correspondence relationship between a URL with a query parameter and a period information file.

As depicted in FIG. 19, the period information file is stored divisionally in a plurality of LCT packets.

In the packet header of each LCT packet, a TOI (Transport Object Identifier) that is an identifier that makes data of the payload identifiable is recorded.

Meanwhile, the signaling data (S-TSID) in which a URL having a query parameter (user information) set therein already is recorded has TOI recording fields (<TOI> . . . </TOI>) provided therein.

In the example depicted in FIG. 19, TOI recording fields are set as <TOI>1234</TOI>.

The link resolution unit 122 of the proxy server 120 of the reception apparatus 30 acquires, for the signaling data (S-TSID) in which the URL having the query parameter (user information) set therein already is recorded, data of the TOI recording fields (<TOI> . . . </TOI>) (in the present example, 1234).

The link resolution unit 122 can select an LCT packet, in which the acquired TOI value=1234 is set to the header, to select an LCT packet group in which one period information file is placed.

Now, an example of a process of providing a URL with a large number of different query parameters and a large number of period information files to the reception apparatus utilizing the entity mode in which a plurality of files can be transmitted collectively is described with reference to FIG. 20.

Figure 20:
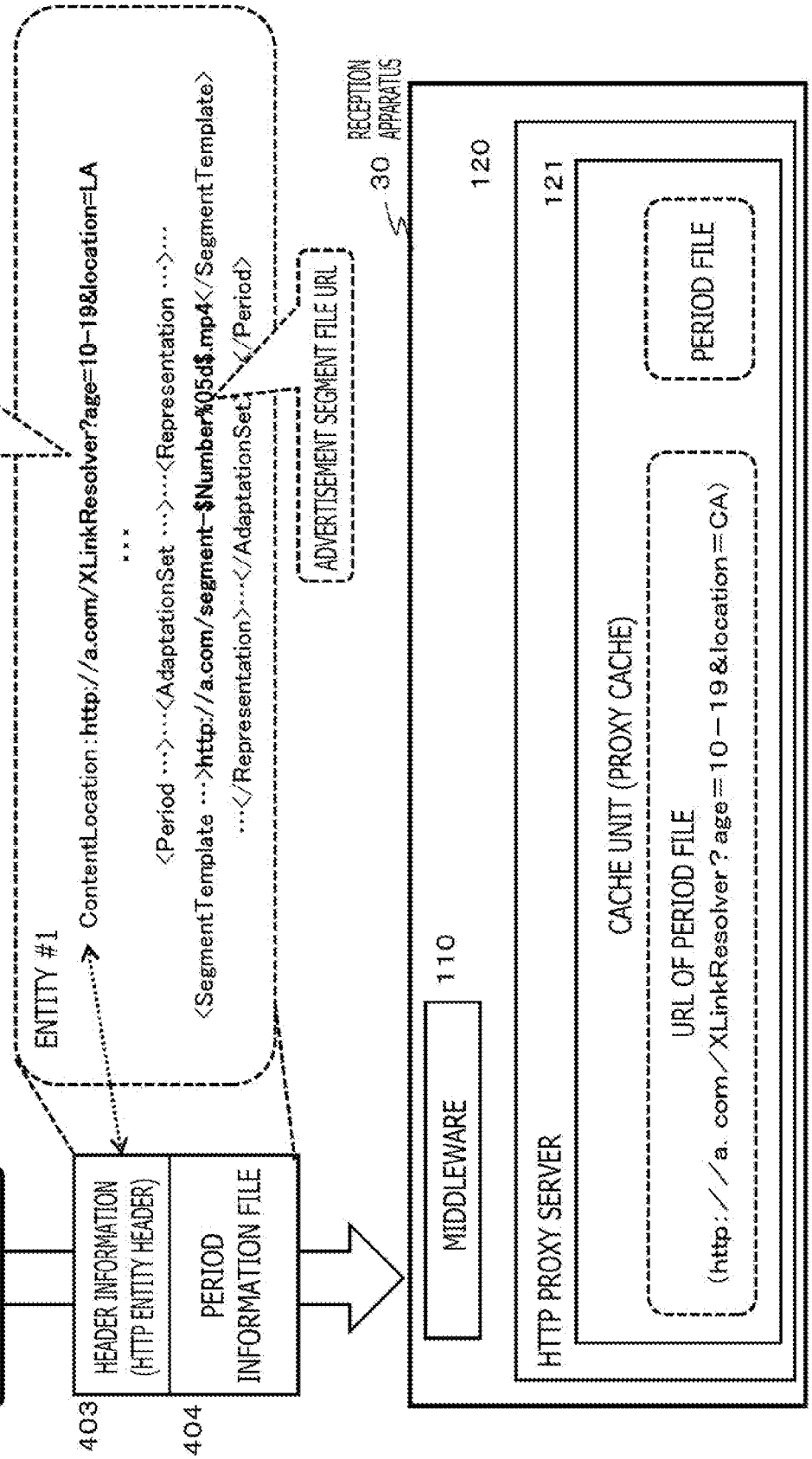
FIG. 20 is a view illustrating an example of a provision process of signaling data or a period information file including a URL with a query parameter.

FIG. 20 depicts a transmission apparatus 20 and a reception apparatus 30 similarly to FIG. 18 described hereinabove.

The transmission apparatus 20 multicast transmits an entity configured from header information (HTTP-Entity Header) 403 and a period information file 404 in accordance with the entity mode of the ROUTE protocol. The reception apparatus 30 receives the data by the middleware 110 including a communication unit and stores the data into the cache unit (proxy cache) 121 of the proxy server 120.

In the case of the entity mode, one URL in which a specific query parameter (user information) is set to a content location (Content-Location) recording position in the header information (HTTP-Entity Header) 403 to be added to the top of the file is placed.

Further, the period information file 404 that is accessed in accordance with the URL to which the specific query parameter (user information) is set is set next to the header information 403 to generate one entity and multicast (broadcasting) distributes the entity to the reception apparatus 30.

The entity #1 depicted in FIG. 20 is one of a plurality of entities to be provided to the reception apparatus. The entity #1 is one entity including the URL to which one query parameter (age=10, Location=LA) is set and period information to be accessed with the URL.

The transmission apparatus 20 multicast transmits, in addition to the entity #1 depicted in FIG. 20, a large number of entities configured from a combination of a URL having a large number of different query parameters (user information) set therein and period information accessed with the URL.

In the example depicted in FIG. 20, a URL having a query parameter (user information) set therein and period information accessed with the URL are integrated as one entity.

The reproduction controlling unit 131 of the reception apparatus sets user information (parameter), for example, age=10 to 19, and Location=LA to the user information setting field (query parameter) in the advertisement-corresponding period information in the MPD described hereinabove, for example, with reference to FIGS. 11 and 13 to complete the URL and outputs the URL to the link resolution unit 122 of the proxy server 120.

The link resolution unit 122 compares the URL inputted from the reproduction controlling unit 131 and the URL recorded in the entity and having the query parameter (user information) set therein already with each other. The link resolution unit 122 selects an entity in which the URL having the query parameter (user information) set therein already and coincident with the URL inputted from the reproduction controlling unit 131 is recorded and acquires one period information file recorded together with the selected entity and then outputs the period information file to the reproduction controlling unit 131.

in which the URL having the query parameter (user information) set therein already and coincident with the URL inputted from the reproduction controlling unit 131 is recorded Now, a processing sequence of the working example 1, namely, the working example in which a URL with a query parameter that becomes access information (URL) to the period information file is provided to the reception apparatus is described with reference to a sequence diagram depicted in FIG. 21.

In FIG. 21, the following apparatus and components are depicted from the left:

(a) an advertisement server that is a component of the transmission apparatus;

(b) a broadcasting server that is a component of the transmission apparatus;

(c) middleware that is a component of the reception apparatus;

(d) a proxy server that is a component of the reception apparatus; and (e) a reproduction controlling unit that is a component of the reception apparatus.

In the following, processes at steps depicted in FIG. 21 are successively described.

(Step S101)

At step S101, the advertising server generates and transfers an advertisement segment file in which an advertisement content is stored. The advertisement server performs multicast transmission setting the reception apparatus as a transmission target through a broadcasting wave or a network.

It is to be noted that the advertisement transmitted from the advertisement server includes different advertisement contents corresponding to various users. In particular, the advertisement server transmits an advertisement segment file in which various advertisement contents according to users for being provided to users having various ages and having various residences are stored. It is to be noted that the transmission process of the advertisement segment file may be set such that it is continuously and repetitively executed.

(Step S102)

At step S102, the advertisement server generates and transmits period information files in which control information necessitated by the reception apparatus to acquire, decode and output (reproduce) advertisement contents such as access information (advertisement segment URLs) for various individual advertisement contents transmitted at step S101 is recorded.

The period information files that are generated and transmitted by the advertisement server are period information files that are different in number corresponding to types of the advertisement segments generated and transmitted at step S101.

A plurality of period information files are multicast transmitted through a broadcasting wave or a network. It is to be noted that also the period information files may be configured such that they are continuously and repetitively transmitted.

(Step S103)

Further, at step S103, the advertisement server executes a transmission process of an MPD.

The MPD to be transmitted here is the MPD described hereinabove, for example, with reference to FIG. 11. In particular, an incomplete URL is recorded which includes period information corresponding to an advertisement and in which link information (Xlink), namely, a user information setting field, is provided in the period information corresponding to an advertisement.

In the reception apparatus, a URL for acquisition of one user-corresponding period information file in which access information to a specific advertisement content or the like is recorded by setting predetermined user information (parameter) to the user information setting field can be generated.

(Step S104)

At step S104, a process of the reproduction controlling unit of the reception apparatus is performed.

The reproduction controlling unit of the reception apparatus acquires the MPD transmitted from the transmission apparatus and executes analysis (parse) of the acquired MPD.

It is to be noted that the MPD is received by the middleware of the reception apparatus, stored into the cache unit of the proxy server and then is acquired from the cache unit by the reproduction controlling unit.

The MPD is the MPD described hereinabove with reference to FIG. 11. In particular, the MPD includes period information corresponding to an advertisement, and in the period information corresponding to an advertisement, the incomplete URL in which the user information setting field is provided is recorded.

(Step S105)

At step S105, the reproduction controlling unit of the reception apparatus acquires the URL having the link information (Xlink) recorded in the period information corresponding to an advertisement of the MPD acquired at step S104, namely, having the user information setting field, and sets user information (parameter) to the user information setting field.

For example, such user information as
age=10 to 19, and
Location=LA
is set.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs the URL (period information file access information) in which the user information (parameter) is set to the user information setting field to the proxy server to request for analysis (link resolution) of the link information (Xlink).

The requesting process is executed, for example, as an HTTP-GET request.

(Step S106)

The proxy server of the reception apparatus executes a process in accordance with the link resolution request from the reproduction controlling unit at step S106. In particular, the link resolution unit of the proxy server acquires a period information file, which is accessed based on the URL (period information file access information) in which the user information (parameter) is set to the user information setting field, from the cache unit (proxy cache) and outputs the period information file to the reproduction controlling unit.

This outputting process is executed, for example, as an HTTP-response.

This period information file is a period information file selected in response to the user information (parameter) set by the reproduction controlling unit at step S105, and is a period information file in which access information (advertisement segment URL) of an optimum advertisement content to be provided to a specific user selected based on the set user information (age, Location and so forth) and so forth are recorded.

(Step S107)

Finally at step S107, the reproduction controlling unit of the reception apparatus reads out and analyzes the recorded information of the period information file acquired from the proxy server.

The reproduction controlling unit acquires an advertisement segment file in which an advertisement content is stored utilizing the access information (advertisement segment URL) of the advertisement content included in the recorded information of the period information file, and outputs the advertisement segment file through an outputting unit such as the display unit or the speaker of the reception apparatus.

It is to be noted that a decoding mode for the advertisement content and control information such as an outputting time period are recorded in the period information file, and the reproduction controlling unit executes a process in accordance with the information recorded in the period information file to execute an outputting process of the advertisement content.

Here, the advertisement content outputted to the reception apparatus is an advertisement selected in response to the user information set by the reproduction controlling unit at step S105, and is an advertisement corresponding to a user whose main target is a user selected based on characteristics of a user (viewer), namely, based on an age, a residence and so forth of the user.

8-2. (Working Example 2) Working Example Wherein Mapping Table of Access Information (URL) to Period Information File and URL with Query Parameter (or Query Parameter) is Provided to Reception Apparatus Now, as a working example 2, a working example is described which provides a mapping table (correspondence table) between access information (URL) to a period information file and a URL with a query parameter (or a query parameter) is provided to a reception apparatus.

An example of a mapping table (correspondence table) between access information (URL) to a period information file and a URL with a query parameter is depicted in FIG. 22.

In FIG. 22,
access information (URL) to the following two period information files, namely,
(A) URL-1=http://a.com/period-1.xml, and
(B) URL-2=http://a.com/period-2.xml
are depicted.

Further, a URL with a query parameter associated with each pieces of the access information (URL-1 and URL-2) to the two period information files is depicted.

As a URL with a query parameter associated with the period information file access information (URL-1) given by
(A) URL-1=http://a.com/period-1.xml,
the following two URLs are available:
(a1) http://a.com/xlinkResolver?age=child&Location=CA; and
(a2) http://a.com/xlinkResolver?age=child&Location=NY.

In (a1), the following parameters are set as the user information:
age=child; and
Location=CA.

Meanwhile, in (a2), the following parameters are set as the user information:
age=child; and
Location=NY.

In particular, if one of
a child (child) residing in California (CA), and
a child (child) residing in New York (N.Y.)
is set as the user information, then a period information file to be acquired in accordance with the period information file access information (URL-1) given by
(A) URL-1=http://a.com/period-1.xml
is selected, and a content acquired on the basis of advertisement content access information (advertisement segment URL) recorded in the selected period information file is provided to and outputted from the reception apparatus.

This advertisement is an advertisement for children targeting a child (child) residing in California (CA) and a child (child) residing in New York as the main target.

Meanwhile, the following three URLs with a query parameter are associated with the period information file access information (URL-2) given by
(B) URL-2=http://a.com/period-2.xml:
(b1) http://a.com/xlinkResolver?age=adult&Location=MA;
(b2) http://a.com/xlinkResolver?age=adult&Location=MS; and
(b3) http://a.com/xlinkResolver?age=adult&Location=MD.

In (b1), the following parameters are set as the user information:

age=adult; and

Location=MA.

Meanwhile, in (b2), the following parameters are set as the user information:

age=adult; and

Location=MS.

Further, in (b3), the following parameters are set as the user information:

age=adult; and

Location=MD.

In particular, if one of an adult (adult) residing in Massachusetts (MA), an adult (adult) residing in Mississippi (MS), and an adult (adult) residing in Maryland (MD), is set as the user information, then a period information file to be acquired in accordance with the period information file access information (URL-2) given by (B) URL-2=http://a.com/period-2.xml is selected, and a content acquired on the basis of advertisement content access information (advertisement segment URL) recorded in the selected period information file is provided to and outputted from the reception apparatus.

This advertisement is an advertisement for adults targeting an adult (adult) residing in Massachusetts (MA), Mississippi (MS) or Maryland (MD) as the main target.

It is to be noted that the mapping table provided from the transmission apparatus 20 to the reception apparatus 30 is actually transmitted, for example, as XML data depicted in FIG. 23. In particular, for example, XML data [period resolution table (PeriodResolvingTable)] indicated below is provided from the transmission apparatus 20 to the reception apparatus 30.

```
<PeriodResolvingTable>
    <PeriodToXLink id=1>
        <PeriodFileURL>http://a.com/period-
1.xml</PeriodFileURL>
<XLinkURL>http://a.com/xlinkResolver?age=child&location=CA</XLinkURL>
<XLinkURL>http://a.com/xlinkResolver?age=child&location=NY</XLinkURL>
    </PeriodToXLink>
    <PeriodToXLink id=2>
        <PeriodFileURL>http://a.com/period-
2.xml</PeriodFileURL>
<XLinkURL>http://a.com/xlinkResolver?age=adult&location=MA</XLinkURL>
<XLinkURL>http://a.com/xlinkResolver?age=adult&location=MS</XLinkURL>
<XLinkURL>http://a.com/xlinkResolver?age=adult&location=MD</XLinkURL>
    </PeriodToXLink>
</PeriodResolvingTable>
```

The XML data described above is transmitted as data that describes the substance of the mapping table (correspondence table) depicted in FIG. 22. The XML data is transmitted as service layer signaling data (Service Layer Signaling) to the reception apparatus (client) side similarly to XML data that describes other control information, and is updated and managed by the reception apparatus side.

It is to be noted that the mapping table has a version identifier set thereto, and if the mapping table is updated, then the version identifier is changed, and when the reception apparatus detects that the mapping table is updated, it executes a data updating process of replacing the mapping table stored in the cache unit with new data.

Although FIG. 22 depicts the mapping table (correspondence table) between access information (URLs) to period information files and URLs with a query parameter, also it is possible to use a configuration that utilizes a mapping table that uses only parameters that become user information without using URLs with a query parameter.

In particular, this is a configuration that utilizes a mapping table (correspondence table) between access information (URLs) to period information files and query parameters.

An example of the mapping table (correspondence table) between access information (URLs) to period information files and query parameters is depicted in FIG. 24.

FIG. 24 depicts access information (URL) to the following two period information files, namely (A) URL-1=http://a.com/period-1.xml, and (B) URL-2=http://a.com/period-2.xml.

Further, query parameters associated with the access information (URL-1 and URL-2) to the two period information files are depicted.

As a query parameter associated with the period information file access information (URL-1) given by (A) URL-1=http://a.com/period-1.xml, the following two parameters are available:

(a1) part 1 of a value of a parameter (example, groupId or the like) designated by MPD/Period/@xlink:href (example: groupId=123); and (a2) part 2 of a value of a parameter (example, groupId or the like) designated by MPD/Period/@xlink:href (example: groupId=456).

In (a1), the following parameter is set as the user information:

groupID=123.

Meanwhile, in (a2), the following parameter is set as the user information:

groupID=456.

In particular, if groupID=123 or 456 is set as the user information, then a period information file to be acquired in accordance with the period information file access information (URL-1) given by (A) URL-1=http://a.com/period-1.xml is selected, and a content acquired depending upon advertisement content access information (advertisement segment URL) recorded in the selected period information file is provided to and outputted from the reception apparatus.

This advertisement is an advertisement targeting the user groups 123 and 456 prescribed in accordance with some reference in advance as the main target.

As a query parameter associated with the period information file access information (URL-2) given by (B) URL-2=http://a.com/period-2.xml, the following three parameters are available:

(b1) part 3 of a value of a parameter (example, groupId or the like) designated by MPD/Period/@xlink:href (example: groupId=789);

(b2) part 4 of a value of a parameter (example, groupId or the like) designated by MPD/Period/@xlink:href (example: groupId=135); and (b3) part 5 of a value of a parameter (example, groupId or the like) designated by MPD/Period/@xlink:href (example: groupId=246).

In particular, if one of
groupId=789, 135 or 246
is set as the user information, then a period information file to be acquired in accordance with the period information file access information (URL-1) given by (B) URL-2=http://a.com/period-2.xml
is selected, and a content acquired depending upon advertisement content access information (advertisement segment URL) recorded in the selected period information file is provided to and outputted from the reception apparatus.

This advertisement is an advertisement targeting the user groups 789, 135 and 246 prescribed in accordance with some reference in advance as the main target.

It is to be noted that the mapping table provided from the transmission apparatus 20 to the reception apparatus 30 is actually transmitted as, for example, XML data depicted in FIG. 25. In particular, XML data [period resolution table (PeriodResolvingTable)] indicated below, for example, is provided from the transmission apparatus 20 to the reception apparatus 30.

```
<PeriodResolvingTable>
    <PeriodToXLink id=1>
        <PeriodFileURL>http://a.com/period-1.xml</PeriodFileURL>
        <ParameterNameValuePair> groupId='123'
        </ParameterNameValuePair>
        <ParameterNameValuePair>
groupId='456'</ParameterNameValuePair>
    </PeriodToXLink>
    <PeriodToXLink id=2>
        <PeriodFileURL>http://a.com/period-2.xml</PeriodFileURL>
        <ParameterNameValuePair>
groupId='789'</ParameterNameValuePair>
        <ParameterNameValuePair>
groupId='135'</ParameterNameValuePair>
        <ParameterNameValuePair> groupId='246'
        </ParameterNameValuePair>
    </PeriodToXLink>
</PeriodResolvingTable>
```

The XML data described above is transmitted as data that describes the substance of the mapping table (correspondence table) depicted in FIG. 24. The XML data is transmitted as service layer signaling data (Service Layer Signaling) to the reception apparatus (client) side similarly to XML data that describes other control information, and is updated and managed by the reception apparatus side.

It is to be noted that the mapping table has a version identifier set thereto, and if the mapping table is updated, then the version identifier is changed. Then, when the reception apparatus detects that the mapping table is updated, it executes a data updating process of replacing the mapping table stored in the cache unit with new data.

Figure 27:
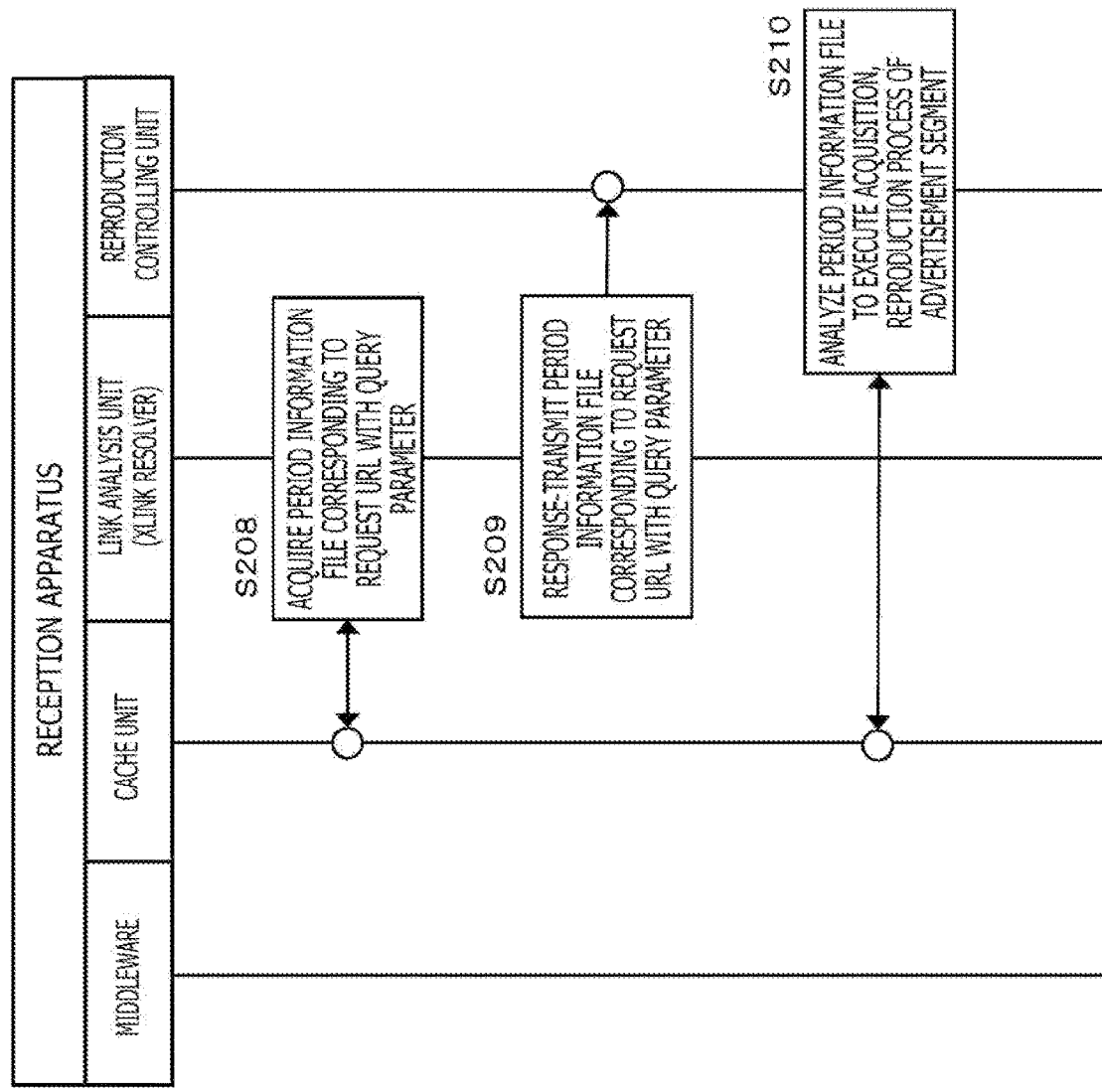
FIG. 27 is a view illustrating a processing sequence of a working example in which a mapping table between access information (URLs) to period information files and URLs with a query parameter is provided to the reception apparatus.

Now, a processing sequence of the present working example 2, namely, a working example in which a mapping table between access information (URLs) to period information files and URLs with a query parameter, is provided to the reception apparatus is described with reference to sequence diagrams depicted in FIGS. 26, 27 and so forth. In FIGS. 26 and 27, the following apparatus and components are depicted from the left:

(a) an advertisement server that is a component of the transmission apparatus;
(b) a broadcasting server that is a component of the transmission apparatus;
(c) middleware that is a component of the reception apparatus;
(d) a cache unit (proxy cache) of a proxy server that is a component of the reception apparatus;
(e) a link resolution unit (XlinkResolver) of the proxy server that is a component of the reception apparatus; and
(f) a reproduction controlling unit that is a component of the reception apparatus.

In the following, processes at steps depicted in FIGS. 26 and 27 are successively described.

(Step S201)

At step S201, the advertisement server generates and transfers an advertisement segment file in which advertisement contents are stored. The advertisement server performs multicast transmission setting a reception apparatus as a transmission target through a broadcasting wave or a network.

It is to be noted that an advertisement transmitted from the advertisement server includes different advertisement contents corresponding to various users. In particular, the advertisement server transmits an advertisement segment file in which various advertisement contents according to users for being provided to different users who have various ages and various residences are stored. It is to be noted that the transmission process of an advertisement segment file may be set so as to be continuously and repetitively executed.

(Step S202)

At step S202, the advertisement server generates and transmits a period information file in which control information necessary for the reception apparatus to acquire, decode and output (reproduce) an advertisement content such as access information (advertisement segment URL) to each of the various advertisement contents transmitted at step S201 is recorded.

The period information files generated and transmitted by the advertisement server are different period information files corresponding to the number of types of advertisement segments generated and transmitted at step S201.

The plurality of different period information files are multicast transmitted through a broadcasting wave or a network.

It is to be noted that also the period information files may be set so as to be continuously and repetitively transmitted.

(Step S203)

Further at step S203, the advertisement server executes a transmission process of an MPD.

The MPD transmitted here is, for example, the MPD described hereinabove with reference to FIG. 11. In particular, an incomplete URL that includes period information corresponding to an advertisement and in which link information (Xlink), namely, a user information setting field, is provided in the period information corresponding to an advertisement, is recorded in the MPD.

If predetermined user information (parameter) is set to the user information setting field by the reception apparatus, then a URL for acquiring one user-corresponding period information file in which access information to a specific advertisement content or the like is recorded can be generated.

(Step S204)

At step S204, a process by the reproduction controlling process of the reproduction controlling unit of the reception apparatus is performed.

The reproduction controlling unit of the reception apparatus acquires the MPD transmitted from the transmission apparatus and executes analysis (parse) of the acquired MPD.

It is to be noted that the MPD is received by the middleware of the reception apparatus and stored into the cache unit of the proxy server, and the reproduction controlling unit acquires the MPD from the cache unit. The MPD is the MPD described hereinabove with reference to FIG. 11. In particular, the MPD includes period information corresponding to an advertisement, and the incomplete URL in which the user information setting field is provided is recorded in the period information corresponding to an advertisement.

(Step S205)

At step S205, the reproduction controlling unit of the reception apparatus acquires the URL having the link information (Xlink) recorded in the period information corresponding to an advertisement of the MPD acquired at step S204, namely, the user information setting field, and sets user information (parameter) to the user information setting field.

For example, such information as age=10 to 19, and

Location=LA is set.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs the URL (period information file access information) in which the user information (parameter) is set to the user information setting field or the user information (parameter) to the proxy server to request for analysis (link resolution) of the link information (Xlink).

The requesting process is executed, for example, as an HTTP-GET request.

(Step S206)

The process at step S206 is a process of the advertisement server.

The advertisement server generates and transmits a correspondence table (mapping table) between period information files and URLs with a query parameter or a correspondence table (mapping table) between period information files and query parameters.

The mapping table is the mapping table described hereinabove with reference to FIG. 22 or 24. However, actual transmission data is, for example, XML data described hereinabove with reference to FIG. 23 or 25. The mapping table can be transmitted periodically at any time or transmitted after updated. The mapping table has a version identifier set thereto, and the reception apparatus performs a process for caching updated data at any time by version management.

(Steps S207 to S209)

At steps S207 to S209, the proxy server of the reception apparatus executes processes in accordance with the link resolution request (S205) from the reproduction controlling unit.

In particular, the link resolution unit (XLinkResolver) of the proxy server acquires a period information file, which is accessed on the basis of a URL (period information file access information) in which user information (parameter) is set to the user information setting field, from the cache unit (proxy cache) and outputs the period information file to the reproduction controlling unit.

This outputting process is executed, for example, as an HTTP-response.

The link resolution unit (XLinkResolver) of the proxy server selectively acquires one period information file from the cache unit (proxy cache) utilizing the mapping table received from the advertisement server at step S206 and outputs the period information file to the reproduction controlling unit.

The link resolution unit (XLinkResolver) of the proxy server first extracts, from the mapping table, a URL or a parameter that coincides with the URL inputted from the reproduction controlling unit of the reception apparatus, namely, the URL (period information file access information) in which user information (parameter) is set to the user information setting field of the advertisement-corresponding period information of the MPD, or with the user information (parameter).

Then, the link resolution unit (XLinkResolver) of the proxy server selects the coincident URL with a query parameter or the URL of the period information file associated with the parameter in the mapping table, acquires one period information file by applying the URL and outputs the period information file to the reproduction controlling unit.

This period information file is the period information file selected in response to the user information (parameter) set by the reproduction controlling unit at step S205 and is the period information file in which access information (advertisement segment URL) of an optimum advertisement content to be provided to a specific user selected on the basis of the set user information (age, Location or the like) or the like is recorded.

(Step S210)

Finally at step S210, the reproduction controlling unit of the reception apparatus reads out the recorded information of the period information file acquired from the proxy server and analyzes the recorded information. The reproduction controlling unit acquires an advertisement segment file in which an advertisement content is stored utilizing the access information (advertisement segment URL) to the advertisement content included in the recorded information of the period information file, and outputs the advertisement segment file through the outputting unit such as the display unit or the speaker of the reception apparatus.

It is to be noted that the control information of the decoding mode, outputting time period and so forth of an advertisement content is recorded in the period information file, and the reproduction controlling unit executes a process in accordance with information recorded in the period information file to execute an outputting process of the advertisement content.

Here, the advertisement content outputted to the reception apparatus is the advertisement selected in response to the user information set by the reproduction controlling unit at step S205 and is an advertisement corresponding to a user targeting users selected in response to characteristics of users (viewers), for example, to an age, residence or the like of users, as the main target.

8-3. (Working Example 3) Working Example Wherein Script (Program) for Generating Period Information File with URL with Query Parameter Inputted is Provided to Reception Apparatus Now, as a working example 3, a working example is described in which a script (program) for inputting a URL with a query parameter to generate a period information file is provided to the reception apparatus.

The present working example 3 is a working example in which the reception apparatus 30 utilizes a script (program) received from the transmission apparatus 20 to input a URL with a query parameter generated by the reproduction controlling unit to generate a period information file.

Figure 28:
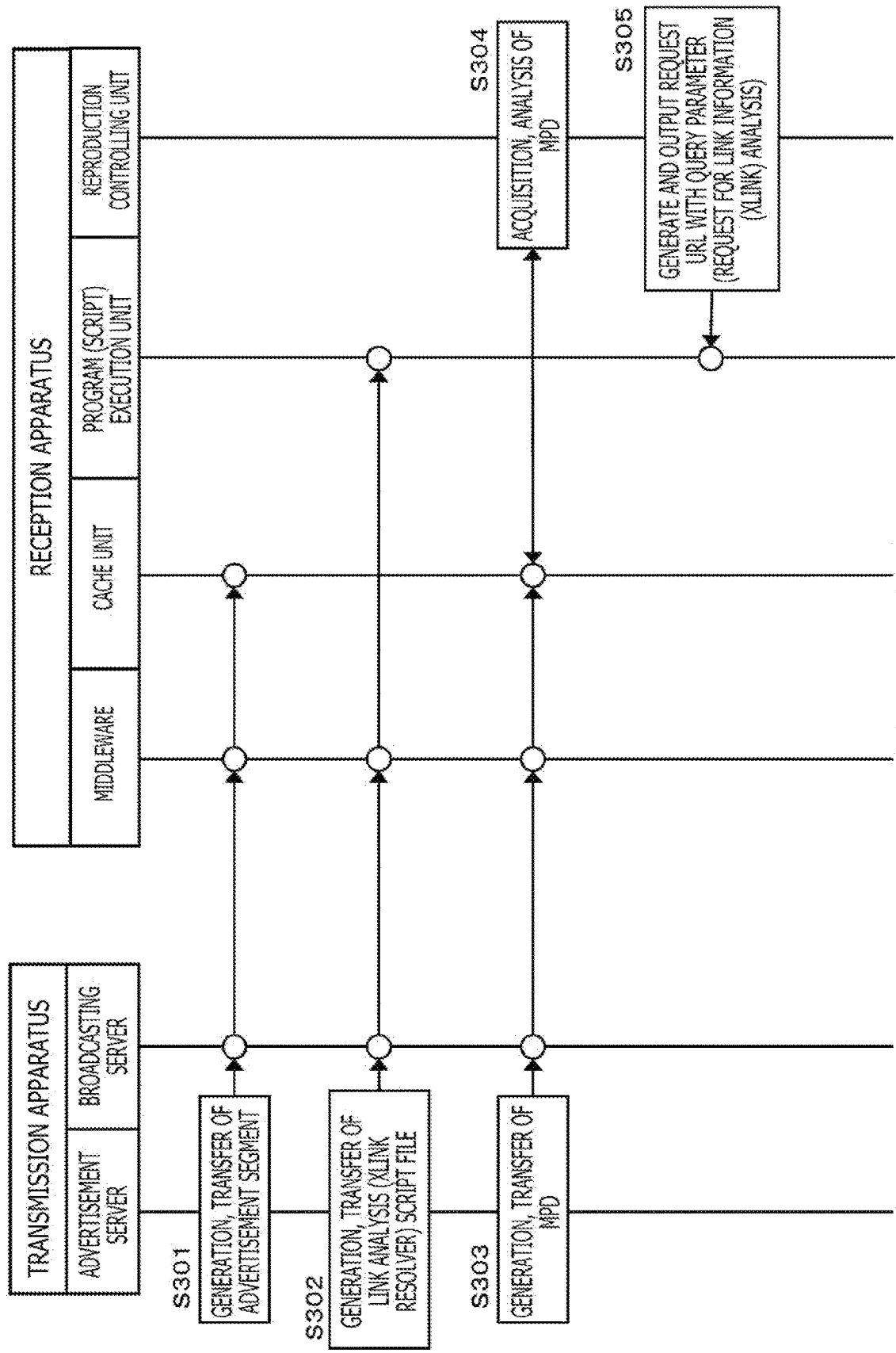
FIG. 28 is a view illustrating an example of a processing sequence of a working example in which a URL with a query parameter is inputted to provide a script (program) for generating a period information file to the reception apparatus.

A processing sequence of the present working example 3, namely, the working example that provides a script (program) for inputting a URL with a query parameter to generate a period information file to the reception apparatus is described with reference to sequence diagrams depicted in FIGS. 28, 29 and so forth. In FIGS. 28 and 29, the following apparatus and components are depicted from the left:
- (a) an advertisement server that is a component of the transmission apparatus;
- (b) a broadcasting server that is a component of the transmission apparatus;
- (c) middleware that is a component of the reception apparatus;
- (d) a cache unit (proxy cache) of a proxy server that is a component of the reception apparatus;
- (e) a program (script) execution unit that is a component of the reception apparatus; and
- (f) a reproduction controlling unit that is a component of the reception apparatus.

It is to be noted that "(e) the program (script) execution unit that is a component of the reception apparatus" may be configured in the proxy server 120 in the reception apparatus or may be configured in the reproduction controlling unit 131 or else may be set as an independent data processing unit.

In the following, processes at steps depicted in FIGS. 28 and 29 are successively described.

(Step S301)

At step S301, the advertisement server generates and transfers an advertisement segment file in which advertisement contents are stored. The advertisement server performs multicast transmission setting a reception apparatus as a transmission target through a broadcasting wave or a network.

It is to be noted that an advertisement transmitted from the advertisement server includes different advertisement contents corresponding to various users. In particular, the advertisement server transmits an advertisement segment file in which various advertisement contents according to users for being provided to different users who have various ages and various residences are stored. It is to be noted that the transmission process of an advertisement segment file may be set so as to be continuously and repetitively executed.

(Step S302)

At step S302, the advertisement server generates and transmits a script file that is a data processing program to the reception apparatus.

This script is a script that inputs a URL with a query parameter generated utilizing an MPD by the reproduction controlling unit of the reception apparatus to generate a period information file.

In other words, the script is a script for executing a link resolution (XlinkResolver) process to generate a period information file.

This script executes a process for generating a period information file that records control information necessary for the reception apparatus to acquire, decode and output (reproduce) an advertisement content such as access information (advertisement segment URL) to each of the various advertisement contents transmitted at step S301 and so forth.

(Step S303)

Further, at step S303, the advertisement server executes a transmission process of an MPD.

The MPD transmitted here is, for example, the MPD described hereinabove with reference to FIG. 11. In particular, an incomplete URL that includes period information corresponding to an advertisement and in which link information (Xlink), namely, a user information setting field, is provided in the period information corresponding to an advertisement, is recorded in the MPD.

If predetermined user information (parameter) is set to the user information setting field by the reception apparatus, then a URL for acquiring one user-corresponding period information file in which access information to a specific advertisement content or the like is recorded can be generated.

(Step S304)

At step S304, a process by the reproduction controlling process of the reproduction controlling unit of the reception apparatus is performed.

The reproduction controlling unit of the reception apparatus acquires the MPD transmitted from the transmission apparatus and executes analysis (parse) of the acquired MPD.

It is to be noted that the MPD is received by the middleware of the reception apparatus and stored into the cache unit of the proxy server, and the reproduction controlling unit acquires the MPD from the cache unit.

The MPD is the MPD described hereinabove with reference to FIG. 11. In particular, the MPD includes period information corresponding to an advertisement, and an incomplete URL in which the user information setting field is provided is recorded in the period information corresponding to an advertisement.

(Step S305)

At step S305, the reproduction controlling unit of the reception apparatus acquires the URL having the link information (Xlink) recorded in the period information corresponding to an advertisement of the MPD acquired at step S304, namely, the user information setting field, and sets user information (parameter) to the user information setting field.

For example, such information as
age=10 to 19, and
Location=LA
is set.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs the URL (period information file access information) in which the user information (parameter) is set to the user information setting field to the program (script) execution unit to request for analysis (link resolution) of the link information (Xlink).

The requesting process is executed, for example, as an HTTP-GET request.

(Steps S306 and S307)

The processes at steps S306 and S307 are processes by the program (script) execution unit of the reception apparatus.

At step S306, the script received from the advertisement server at step S302 is activated.

In particular, the URL with a query parameter is inputted to activate the script for generating a period information file.

Further at step S307, the script is executed, and the URL with a query parameter, namely, the URL in which the user information (parameter) is set to the user information setting field inputted from the reproduction controlling unit at step S305, is analyzed and a period information file corresponding to the URL is generated and outputted to the reproduction controlling unit.

This outputting process is executed, for example, as an HTTP-response.

This period information file is the period information file according to the user information (parameter) set by the reproduction controlling unit at step S305 and is the period information file in which access information (advertisement segment URL) to an advertisement content optimum to be provided to a specific user selected on the basis of the set user information (age, Location and so forth) or the like is recorded.

(Step S308)

Finally at step S308, the reproduction controlling unit of the reception apparatus reads out the recorded information of the period information file acquired from the program (script) execution unit and analyzes the recorded information.

The reproduction controlling unit acquires the advertisement segment file in which the advertisement content is stored utilizing the access information (advertisement segment URL) to the advertisement content included in the recorded information of the period information file, and outputs the advertisement segment file through the outputting unit such as the display unit, speaker or the like of the reception apparatus.

It is to be noted that control information such as a decoding mode for the advertisement content and an outputting time period is recorded in the period information file, and the reproduction controlling unit executes a process in accordance with the information recorded in the period information file to execute an outputting process of the advertisement content.

Here, the advertisement content outputted to the reception apparatus is an advertisement selected in response to the user information set by the reproduction controlling unit at step S305, and is an advertisement corresponding to a user whose main target is a user selected based on characteristics of a user (viewer), namely, for example, based on an age, a residence and so forth of the user.

8-4. (Working Example 4) Working Example Wherein Period Information File is Stored into Cache Unit (Proxy Cache) Utilizing Service Worker (SW)

Now, as a working example 4, a working example is described in which a period information file is stored into a cache unit (proxy cache) utilizing a service worker (SW).

First, an outline of a service worker (SW: Service Worker) is described with reference to FIGS. 30 to 32. A service worker (SW) is provided from the transmission apparatus 20 such as a broadcasting server or an advertising server to the reception apparatus 30.

The service worker (SW) is a program for executing an acquisition process of an application (=application program) to be executed by the reception apparatus (client) 30, a data file utilized upon execution of the application and so forth, a storage process into the storage unit (cache), and an updating process, a deletion process and so forth. In particular, the service worker (SW) is configured, for example, from JavaScript (registered trademark).

The service worker (SW) is set, for example, corresponding to a broadcasting program (broadcasting content) provided by the transmission apparatus 20 and is provided as a control and management program for an application provided from the transmission apparatus 20 to the reception apparatus 30 to the reception apparatus 30.

The service worker (SW), the application and a data file, which is utilized upon execution of the application, are provided as NRT contents (non-real time contents) described hereinabove, for example, with reference to FIGS. 2 and 3 from the transmission apparatus 20 to the reception apparatus 30.

Alternatively, a data providing server different from the server that distributes a broadcasting program may be configured so as to provide the service worker (SW), application and data file, which is utilized upon execution of the application, to the reception apparatus 30.

The service worker (SW) executes a management (acquisition, holding, updating, deletion and so forth) process or the like of an application or the like for executing information display utilizing a browser that is the program that is utilized, for example, by the reception apparatus 30 to execute a browsing process for a Web page or the like.

A particular example (use case) of a process in which the service worker (SW) is utilized is described with reference to FIGS. 30 and 31.

Figure 30:
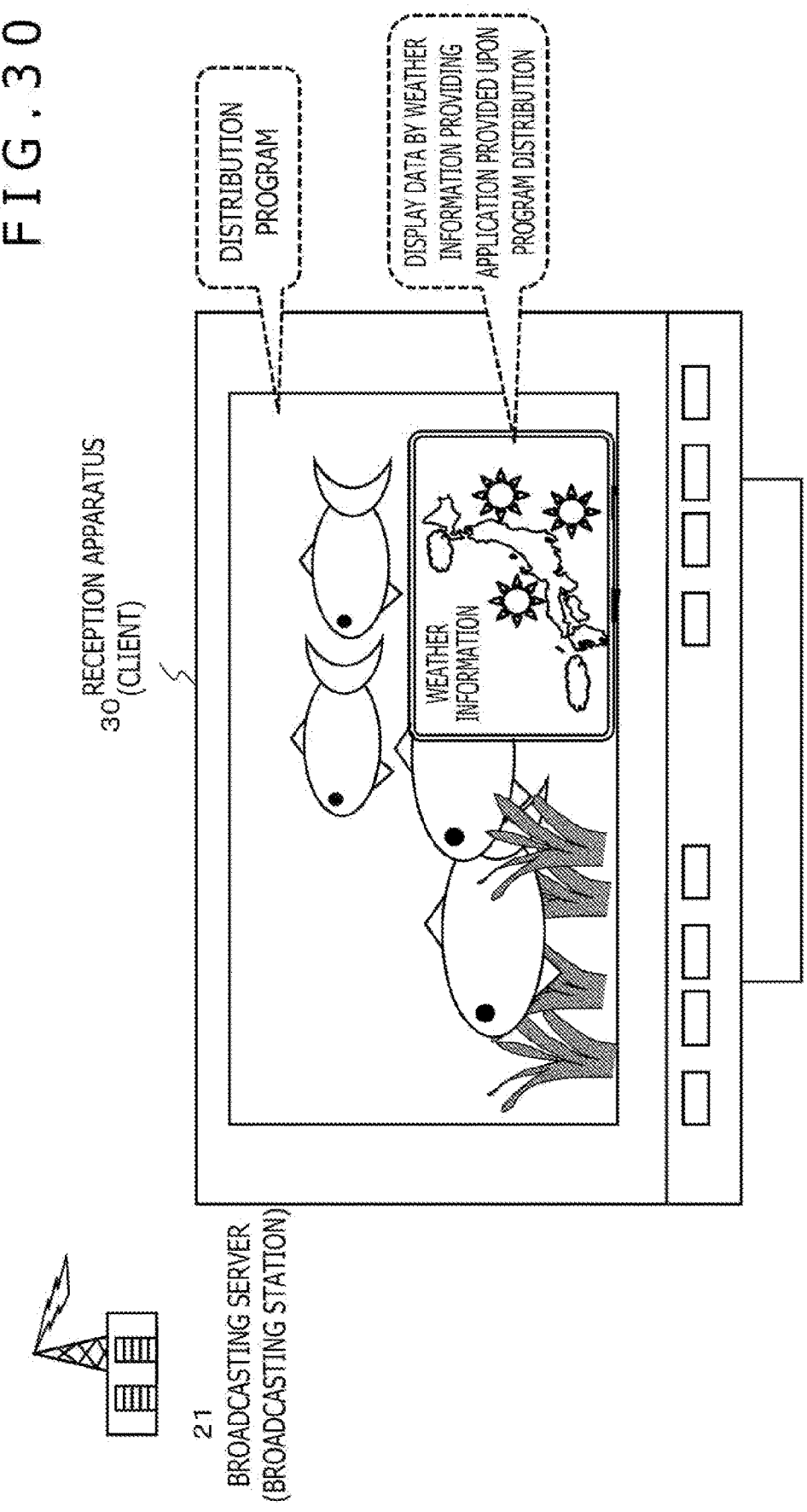
FIG. 30 is a view illustrating a particular example (use case) of a process that utilizes a service worker (SW).

FIG. 30 depicts a state in which the reception apparatus 30 receives a certain program content from the transmission apparatus 20 such as the broadcasting server 21 and displays the program content on the display unit of the reception apparatus 30.

The transmission apparatus 20 such as the broadcasting server 21 provides, together with program distribution, an application for displaying weather information and various data files to be utilized by the weather information displaying application, for example, a data file including various data of moving pictures, still pictures, sound and so forth, as an NRT content (non-real time content) to the reception apparatus 30.

In the following, such an application and a data file are each referred to as "resource."

The broadcasting server 21 further provides, as a resource management program for managing such "resources," a service worker (SW) as an NRT content (non-real time content) to the reception apparatus 30.

The reception apparatus 30 can perform display of weather information together with program display as depicted in FIG. 30 utilizing "resources," namely, an application and a data file, received from the transmission apparatus 20. According to the data distribution configuration so far, such data display that utilizes the application cannot be executed any more together with the end of the program by which the application is provided.

This is because, although such a resource as a weather information displaying application is set, within reception of a program, to a state in which it can be utilized by the reception apparatus 30, for example, to a state in which it is stored into a temporary storage cache and can be utilized, after the program comes to an end, or if the user switches the channel, such cache data are erased or are set to a state in which it cannot be accessed.

The service worker (SW) functions as a resource management program for making it possible to utilize such a program-corresponding application or data even after the end of the program, after switching of the channel, or in an offline state such as a non-reception state of a broadcast or a network non-connection state.

As depicted in FIG. 31, it becomes possible to utilize the weather information display application even after the end of the program by which this application is provided, after switching to a different channel, or in an offline state in which data reception is not executed. In other words, it is possible to display and browse the weather information on the display unit of the reception apparatus 30.

It is to be noted that the weather information display application program is a program that is displayed, for example, on a browser.

The weather information display application is stored into the storage unit (permanent cache) of the reception apparatus 30 under the control of the service worker (SW). For example, if a request (event) such as a display request by a user is received, then the weather information display application is read out from the storage unit (permanent cache) and displayed on the display unit under the control of the service worker (SW).

It is to be noted that the storage unit (permanent cache) for storing a resource such as an application is preferably formed as a nonvolatile memory from which storage data is not erased even if the power supply to the reception apparatus 30 is turned off.

By utilizing the service worker (SW) in this manner, it becomes possible to utilize various program-corresponding applications independently of display and non-display of a program.

It is to be noted that the service worker (SW) is set, for example, for each unit of a certain program-corresponding resource (application or application-related data) and is provided together with the resource or before or after resource transmission from the transmission apparatus 20 to the reception apparatus 30. Although it is possible to set the service worker (SW) so as to correspond to each program, also it is possible to set the service worker (SW) that can be utilized commonly for resources corresponding to specific channels including a plurality of programs.

The service worker (SW) and the resources (applications and application-related data) managed by the service worker (SW) are stored into the storage unit (permanent cache) of the reception apparatus 30.

FIG. 32 is a view depicting an example of a program that utilizes the service worker (SW).

FIG. 32 depicts an example of a sequence when the reception apparatus 30 acquires a Web page (for example, a weather information display page depicted in FIG. 30 or 31) as a resource from the transmission apparatus 20, stores the Web page into the storage unit (permanent cache) of the reception apparatus 30 and utilizes the Web page.

It is to be noted that the Web page is displayed utilizing a predetermined Web page displaying application and a resource configured from and display data.

In FIG. 32, a display processing unit 451, a service worker (SW) 452 and a cache (storage unit) 453 are depicted as components of a browser 450 in the reception apparatus.

At steps S351 and S352, a resource (Web page) acquisition process by a first time access process to the transmission apparatus 20 by the reception apparatus 30 is performed.

This is acquired from an NRT content transmitted, for example, from a broadcasting server.

After this acquisition process, a Web page 455 is displayed on the display unit of the reception apparatus 30 by the display processing unit 451. This display is a state in which the Web page 455 is displayed together with the program by which this Web page is provided and corresponds to the display state described hereinabove with reference to FIG. 3.

If, within this display period, for example, a registration (install) request for the resource (Web page) is issued as an instruction by the user, then the service worker (SW) 452 starts a registration (install) process of the resource (Web page) at step S353.

In particular, the service worker (SW) 452 passes the resource to the cache 453 to perform a process for storing the resource into the storage unit (permanent cache) as indicated by step S354.

Thereafter, after the program ends, or after the channel is switched, or else in an offline setting state, the user will perform a browsing request for the Web page at step S355.

The service worker (SW) 452 detects the input of the browsing request as a fetch event and acquires the resource (Web page) from the storage unit (permanent cache) at step S356 in response to the fetch event detection.

The display processing unit 451 displays the Web page 456 at step S357.

This Web page displaying process is a display state after the end of the program or after switching of the channel or else in the offline setting state, and corresponds to the display state described hereinabove with reference to FIG. 31.

By utilizing the service worker (SW) in this manner, it becomes possible to utilize programs of various applications and so forth independently of display or non-display of a program and perform such a process as to display, for example, a Web page set as display information attached to a program independently of the program at an arbitrary timing.

In this manner, the service worker (SW) performs resource management such as acquisition, storage, updating and deletion of resources configured, for example, from a Web page, an HTML page, an application or a program that includes JavaScript (registered trademark) or the like as a component, data utilized by the application or the like.

The storage unit (cache) into which a resource is stored is a storage unit (cache) for permanently retain storage data and retains, different from ordinary local/temporary caches, data even if an application is inoperative. A kind of proxy server is incorporated in a browser that is a Web page displaying program such that, image-wise, the proxy server can be accessed at any time when necessary to acquire and display a Web page.

It is to be noted that also the service worker (SW) itself is stored (installed) into the permanent cache. If the service worker (SW) is installed into the reception apparatus, then it becomes possible to variously control resources that are a management target of the service worker (SW).

For example, in response to an access request to a resource (fetch request to a resource), before a process by the browser side (acquisition of a resource from a local cache or a network) begins, a process of the service worker (SW) is started and provision of a resource from the permanent cache is performed. Further, since the service worker (SW) is provided in JavaScript (registered trademark), it is possible to incorporate various procedures, and flexible process description regarding cache control such as updating of part of resources of the permanent cache can be performed.

It is to be noted that also the service worker (SW) itself can be updated. Although the service worker (SW) is provided form the transmission apparatus 20, various information necessitated for an updating process such as update date information, access information to update data and so forth is recorded in header information (HTTP Cache-Control) of the service worker (SW) and an updating process is executed on the basis of the header information.

For example, if an expiration date comes on the basis of the expiration date set to the header, then the reception apparatus 30 executes an acquisition process of a service worker (SW) of a new version to perform an updating process of replacing the SW of the old version stored in the cache with the service worker (SW) of the new version.

The reception apparatus 30 can utilize the service worker (SW) to execute an application or a program such as, for example, such a weather information display application as described hereinabove with reference to FIG. 30 or 31, namely an application or a program that is a management target of the service worker (SW), at an arbitrary timing.

The present working example 4 is a working example that utilizes the service worker (SW) to execute a process for storing a period information file into the cache unit (proxy cache).

A processing sequence of the working example 4, namely, the working example in which the service worker (SW) is utilized to execute a process for storing a period information file into the cache unit (proxy cache), is described with reference to sequence diagrams depicted in FIGS. 33, 34 and so forth.

In FIGS. 33 and 34, the following apparatus and components are depicted from the left:
 (a) an advertisement server that is a component of the transmission apparatus;
 (b) a broadcasting server that is a component of the transmission apparatus;
 (c) middleware that is a component of the reception apparatus;
 (d) a cache unit (proxy cache) of a proxy server that is a component of the reception apparatus;
 (e) a browser cache that is a component of the reception apparatus;
 (f) a browser program (script) execution unit that is a component of the reception apparatus; and
 (g) a reproduction controlling unit that is a component of the reception apparatus.

It is to be noted that, among the components described above, (e) the browser cache that is a component of the reception apparatus and (f) the browser program (script) execution unit that is a component of the reception apparatus are the management cache and the execution unit of the service worker (SW) described above.

In the following, processes at steps depicted in FIGS. 33 and 34 are successively described.
(Step S401)

At step S401, the advertisement server generates and transfers an advertisement segment file in which advertisement contents are stored. The advertisement server performs multicast transmission setting a reception apparatus as a transmission target through a broadcasting wave or a network.

It is to be noted that an advertisement transmitted from the advertisement server includes different advertisement contents corresponding to various users. In particular, the advertisement server transmits an advertisement segment file in which various advertisement contents according to users for being provided to different users who have various ages and various residences are stored. It is to be noted that the transmission process of an advertisement segment file may be set so as to be continuously and repetitively executed.
(Step S402)

At step S402, the advertisement server generates and transmits a period information file in which control information necessary for the reception apparatus to acquire, decode and output (reproduce) an advertisement content such as access information (advertisement segment URL) to each of the various advertisement contents transmitted at step S401 and so forth is recorded.

The period information files generated and transmitted by the advertisement server are different period information files corresponding to the number of types of advertisement segments generated and transmitted at step S401.

The plurality of different period information files are multicast transmitted through a broadcasting wave or a network.

It is to be noted that also the period information files may be set so as to be continuously and repetitively transmitted.
(Step S403)

At step S403, the advertisement server generates and transmits a service worker (SW) script file, which is a data processing program, to the reception apparatus. The service worker (SW) script file is a script for executing a process for acquiring a period information file or an advertisement segment file stored in the proxy cache of the reception apparatus and storing the acquired file into a browser cache that is a management cache of the service worker (SW).
(Steps S404 to S406)

Processes at steps S404 to S406 are processes of the browser program (script) execution unit of the reception apparatus.

At step S404, the service worker (SW) script file received from the advertisement server at step S402 is activated.

In particular, the service worker (SW) script file for executing a process for acquiring a period information file or an advertisement segment file stored in the proxy cache of the reception apparatus and storing the acquired file into a browser cache that is a management cache of the service worker (SW) is activated.

Further, at steps S405 and S406, the service worker (SW) script is executed, and the period information file and the advertisement segment file stored in the proxy cache are acquired and stored into the browser cache that is a management cache of the service worker (SW).
(Step S407)

At step S407, the advertisement server executes a transmission process of an MPD.

The MPD to be transmitted here is the MPD described hereinabove, for example, with reference to FIG. 11. In particular, an incomplete URL is recorded which includes period information corresponding to an advertisement and in which link information (Xlink), namely, a user information setting field, is provided in the period information corresponding to an advertisement.

In the reception apparatus, a URL for acquisition of one user-corresponding period information file in which access information to a specific advertisement content or the like is recorded can be generated by setting predetermined user information (parameter) to the user information setting field.
(Step S408)

At step S408, a process of the reproduction controlling unit of the reception apparatus is performed.

The reproduction controlling unit of the reception apparatus acquires the MPD transmitted from the transmission apparatus and executes analysis (parse) of the acquired MPD.

It is to be noted that the MPD is received by the middleware of the reception apparatus, stored into the cache unit of the proxy server and then acquired from the cache unit by the reproduction controlling unit.

The MPD is the MPD described hereinabove with reference to FIG. 11. In particular, the MPD includes period information corresponding to an advertisement, and in the period information corresponding to an advertisement, the incomplete URL in which the user information setting field is provided is recorded.

(Step S409)

At step S409, the reproduction controlling unit of the reception apparatus acquires the URL having the link information (Xlink) recorded in the period information corresponding to an advertisement of the MPD acquired at step S408, namely, having the user information setting field, and sets user information (parameter) to the user information setting field.

For example, such user information as
age=10 to 19 and
Location=LA
is set.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs the URL (period information file access information) in which the user information (parameter) is set to the user information setting field to the program (script) execution unit to request for analysis (link resolution) of the link information (Xlink).

The requesting process is executed, for example, as an HTTP-GET request.

(Step S410)

A process at step S410 is a process of the browser cache of the reception apparatus.

The browser cache executes a response process to the HTTP-GET request inputted from the reproduction controlling unit.

In particular, the browser cache analyzes the URL in which the user information (parameter) is set to the user information setting field inputted from the reproduction controlling unit to acquire a period information file corresponding to the URL and outputs the period information file to the reproduction controlling unit. This outputting process is executed, for example, as an HTTP-response.

This period information file is a period information file according to the user information (parameter) set by the reproduction controlling unit at step S409, and is a period information file in which access information (advertisement segment URL) to an optimum advertisement content to be provided to a specific user selected based on the set user information (age, Location and so forth) and so forth are recorded.

(Step S411)

Finally at step S411, the reproduction controlling unit of the reception apparatus reads out and analyzes the recorded information of the period information file acquired from the browser cache.

The reproduction controlling unit acquires an advertisement segment file in which an advertisement content is stored utilizing the access information (advertisement segment URL) to the advertisement content included in the recorded information of the period information file, and outputs the advertisement segment file through an outputting unit such as the display unit or the speaker of the reception apparatus.

It is to be noted that a decoding mode for the advertisement content and control information such as an outputting time period are recorded in the period information file, and the reproduction controlling unit executes a process in accordance with the information recorded in the period information file to execute an outputting process of the advertisement content.

Here, the advertisement content outputted to the reception apparatus is an advertisement selected in response to the user information set by the reproduction controlling unit at step S409, and is an advertisement corresponding to a user whose main target is a user selected based on characteristics of a user (viewer), for example, based on an age, a residence and so forth of the user.

8-5. (Working Example 5) Working Example Wherein Period Information File is Generated Utilizing Service Worker (SW) with URL with Query Parameter Inputted Now, as a working example 5, a working example is described in which a URL with a query parameter is inputted to generate a period information file utilizing a service worker (SW).

The present working example 5 is a working example in which a process for utilizing a service worker (SW) to generate a period information file is executed.

The present working example 5 is a working example in which the reception apparatus 30 utilizes a service worker (SW) script received from the transmission apparatus 20 to input a URL with a query parameter generated by the reproduction controlling unit to generate a period information file.

A processing sequence of the working example 5, namely, the working example in which the service worker (SW) is utilized to generate a period information file, is described with reference to sequence diagrams depicted in FIGS. 35, 36 and so forth.

Figure 36:
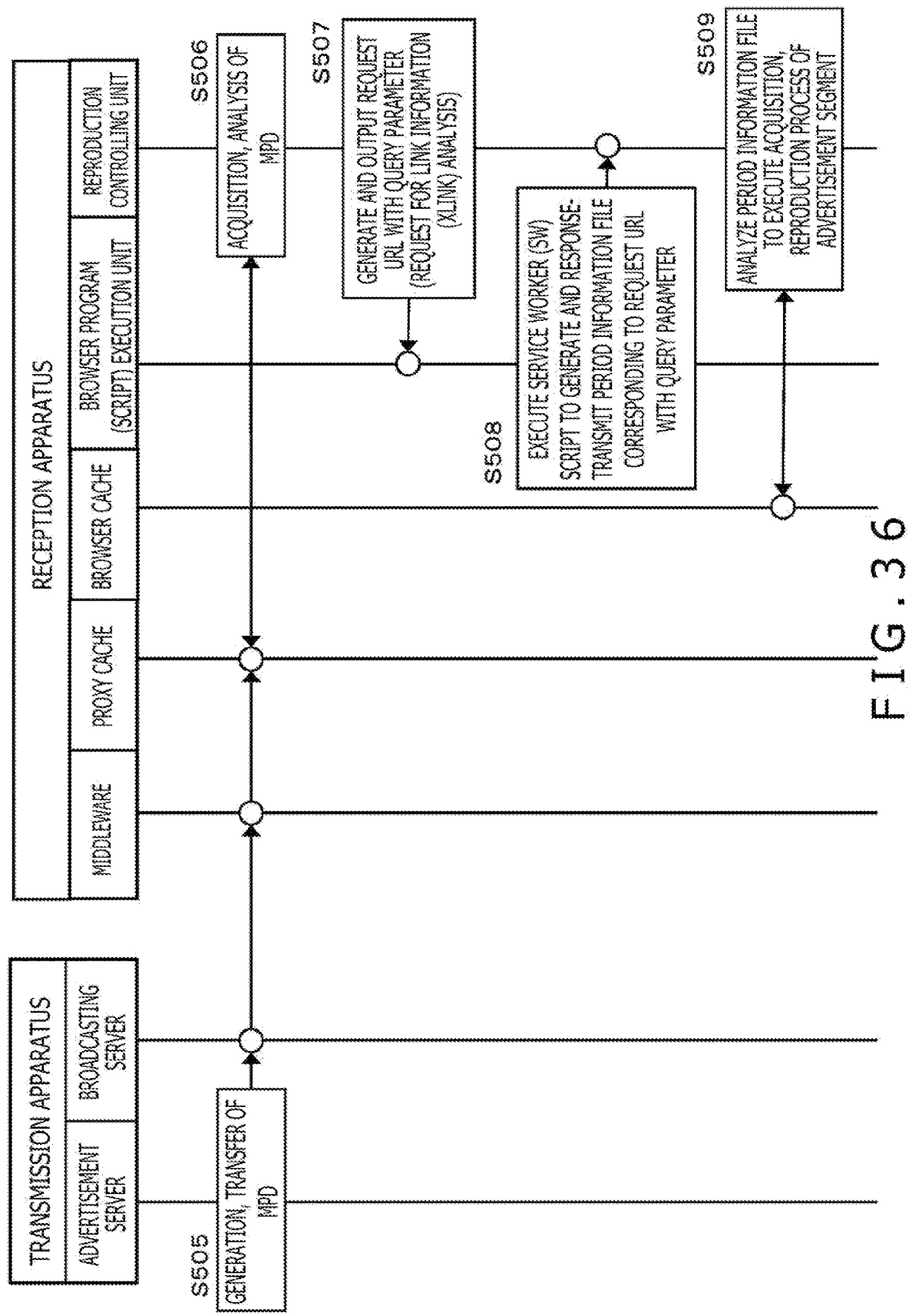
FIG. 36 is a view illustrating a processing sequence of the working example in which a period information file is generated utilizing a service worker (SW).

In FIGS. 35 and 36, the following apparatus and components are depicted from the left:
(a) an advertisement server that is a component of the transmission apparatus;
(b) a broadcasting server that is a component of the transmission apparatus;
(c) middleware that is a component of the reception apparatus;
(d) a cache unit (proxy cache) of a proxy server that is a component of the reception apparatus;
(e) a browser cache that is a component of the reception apparatus;
(f) a browser program (script) execution unit that is a component of the reception apparatus; and
(g) a reproduction controlling unit that is a component of the reception apparatus.

It is to be noted that, among the components described above, (e) the browser cache that is a component of the reception apparatus and (f) the browser program (script) execution unit that is a component of the reception apparatus are the management cache and the execution unit of the service worker (SW) described above.

In the following, processes at steps depicted in FIGS. 35 and 36 are successively described.

(Step S501)

At step S501, the advertisement server generates and transfers an advertisement segment file in which advertisement contents are stored. The advertisement server performs multicast transmission setting a reception apparatus as a transmission target through a broadcasting wave or a network.

It is to be noted that an advertisement transmitted from the advertisement server includes different advertisement contents corresponding to various users. In particular, the advertisement server transmits an advertisement segment file in which various advertisement contents according to users for being provided to different users who have various ages and various residences are stored. It is to be noted that the transmission process of an advertisement segment file may be set so as to be continuously and repetitively executed.
(Step S502)

At step S502, the advertisement server generates and transmits a service worker (SW) script file that is a data processing program to the reception apparatus. The service worker (SW) script file executes a process for extracting an advertisement segment file transmitted from the advertisement server and stored in the proxy cache of the reception apparatus from the browser cache and storing the advertisement segment file into the browser cache. Further, the service worker (SW) script file inputs a URL with a query parameter generated by the reproduction controlling unit of the reception apparatus utilizing the MPD to generate a period information file. In other words, the service worker (SW) script file executes the link resolution (XlinkResolver) process to generate a period information file.

The service worker (SW) scripts executes the processes described above.

This service worker (SW) script executes a process for generating a period information file in which control information necessary for the reception apparatus to acquire, decode and output (reproduce) an advertisement content such as access information (advertisement segment URL) to each of the various advertisement contents transmitted at step S501 and so forth is recorded.
(Steps S503 and S504)

Processes at steps S503 to S504 are processes by the browser program (script) execution unit of the reception apparatus.

At step S503, the service worker (SW) script file received from the advertisement server at step S502 is activated.

Further, at step S504, the service worker (SW) script file is executed to acquire an advertisement segment file stored in the proxy cache and store the advertisement segment file into a browser cache that is a management cache of the service worker (SW).
(Step S505)

At step S505, the advertisement server executes a transmission process of an MPD.

The MPD to be transmitted here is the MPD described hereinabove, for example, with reference to FIG. 11. In particular, an incomplete URL is recorded which includes period information corresponding to an advertisement and in which link information (Xlink), namely, a user information setting field, is provided in the period information corresponding to an advertisement.

In the reception apparatus, a URL for acquisition of one user-corresponding period information file in which access information to a specific advertisement content or the like is recorded can be generated by setting predetermined user information (parameter) to the user information setting field.
(Step S506)

At step S506, a process of the reproduction controlling unit of the reception apparatus is performed.

The reproduction controlling unit of the reception apparatus acquires the MPD transmitted from the transmission apparatus and executes analysis (parse) of the acquired MPD.

It is to be noted that the MPD is received by the middleware of the reception apparatus, stored into the cache unit of the proxy server and then acquired from the cache unit by the reproduction controlling unit.

The MPD is the MPD described hereinabove with reference to FIG. 11. In particular, the MPD includes period information corresponding to an advertisement, and in the period information corresponding to an advertisement, the incomplete URL in which the user information setting field is provided is recorded.
(Step S507)

At step S507, the reproduction controlling unit of the reception apparatus acquires the URL having the link information (Xlink) recorded in the period information corresponding to an advertisement of the MPD acquired at step S506, namely, having the user information setting field, and sets user information (parameter) to the user information setting field.

For example, such user information as
age=10 to 19, and
Location=LA
is set.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs the URL (period information file access information) in which the user information (parameter) is set to the user information setting field to the program (script) execution unit to request for analysis (link resolution) of the link information (Xlink).

The requesting process is executed, for example, as an HTTP-GET request.
(Step S508)

A process at step S508 is a process of the browser program (script) execution unit of the reception apparatus.

At step S508, the browser program (script) execution unit executes the service worker (SW) script to analyze the URL with a query parameter, namely, the URL in which the user information (parameter) is set to the user information setting field inputted from the reproduction controlling unit at step S507 to generate a period information file corresponding to the URL and outputs the period information file to the reproduction controlling unit.

This outputting process is executed, for example, as an HTTP-response.

This period information file is a period information file according to the user information (parameter) set by the reproduction controlling unit at step S507, and is a period information file in which access information (advertisement segment URL) to an optimum advertisement content to be provided to a specific user selected based on the set user information (age, Location and so forth) and so forth are recorded.
(Step S509)

Finally at step S509, the reproduction controlling unit of the reception apparatus reads out and analyzes the recorded information of the period information file acquired from the browser program (script) execution unit.

The reproduction controlling unit acquires an advertisement segment file in which an advertisement content is stored utilizing the access information (advertisement segment URL) to the advertisement content included in the recorded information of the period information file, and outputs the advertisement segment file through the outputting unit such as the display unit or the speaker of the reception apparatus.

It is to be noted that a decoding mode for the advertisement content and control information such as an outputting time period are recorded in the period information file, and the reproduction controlling unit executes a process in accordance with the information recorded in the period information file to execute an outputting process of the advertisement content.

Here, the advertisement content outputted to the reception apparatus is an advertisement selected in response to the user information set by the reproduction controlling unit at step S507, and is an advertisement corresponding to a user whose main target is a user selected based on characteristics of a user (viewer), for example, based on an age, a residence and so forth of the user.

8-6. (Working Example 6) Working Example Wherein Question-Answer Type Metadata (PDI) is Utilized Now, as a working example 6, a working example is described in which question-answer type metadata (PDI) is utilized.

The PDI (Preference Demographic Interest) is a format of question-answer (query-answer) type metadata prescribed in the ATSC (Advanced Television System Committee) 2.0 standard that is a standard relating to a data distribution system through a broadcasting wave and a network.

The PDI is metadata that makes it possible to perform question (query) to a reception apparatus (client) and acquire an answer (answer) of a user at the reception apparatus (client) side.

The question (query) to the reception apparatus (client) is a question for inquiring about a hobby and taste (Preference) of the user, a user attribute (Demographic) and an interest of a user at the reception apparatus (client) side. An answer (answer) of the user at the reception apparatus (client side) to the questions is acquired.

For example, it is possible to perform, on the basis of the PDI, a process for selecting and providing a content or data to be provided to the reception apparatus (client) on the basis of the answer acquired from the reception apparatus (client).

The working example 6 described below is a working example in which an advertisement to be provided to the reception apparatus (client) is selected utilizing the PDI.

FIG. 37 is a view depicting the working example 6, namely, an example of a configuration of an MPD utilized in working examples in which the question-answer type metadata (PDI) is utilized to provide an advertisement corresponding to a user.

FIG. 37 depicts an example of a configuration of the MPD that is control information description data (signaling data) corresponding to a content outputting process for outputting a broadcasting program and an advertisement alternately described hereinabove with reference to FIG. 5.

The MPD is divided into period information 511 to 514 of a unit of an advertisement and a broadcasting program that correspond to output contents within a predetermined period.

The period information 511 is control information (signaling data) corresponding to an advertisement outputted from the reception apparatus within time t0 to t1.

The period information 512 is control information (signaling data) corresponding to a broadcasting program outputted from the reception apparatus within time t1 to t2.

The period information 513 is control information (signaling data) corresponding to an advertisement outputted from the reception apparatus within time t2 to t3.

The period information 514 is control information (signaling data) corresponding to a broadcasting program outputted from the reception apparatus within time t3 to t4.

In the period information, information necessitated for acquisition of data (content) outputted to the reception apparatus such as access information (URL) to a broadcasting program or an advertisement transmitted from the transmission apparatus and various kinds of information necessitated for the reception apparatus to extract and output a content such as a decoding method (codec) are recorded.

The transmission apparatus transmits the MPD depicted in FIG. 37 to the reception apparatus before time to. The reception apparatus refers to the MPD to acquire an advertisement or a broadcasting program through a broadcasting wave or a network, performs a decoding process and so forth using a designated codec and outputs the advertisement or the broadcasting program to the display unit, speaker or the like.

FIG. 38 is a view illustrating a configuration of the period information 511 in the MPD depicted in FIG. 37. The period information 511 is period information that is control information corresponding to an advertisement outputted from the reception apparatus within time t0 to t1.

As depicted in FIG. 38, the period information 511 corresponding to an advertisement has the following description data:

Period A1 (Ad Break #1)
@xlink:href=http://adservice.com?pdi=$pdi$
@xlink:actuate="onRequest"
@start=0
@duration=60 sec
...

Although this period information has a configuration substantially similar to that of the period information described hereinabove with reference to FIG. 11 or 13, it is different in configuration of the user information setting field in link information 520. The configuration of the other part is similar to that of the period information described hereinabove with reference to FIG. 11 or 13.

Also the period information 511 depicted in FIG. 38 omits, similarly to the period information 311 described hereinabove with reference to FIG. 13, description of particular data of the adaptation,
the representation, and
the segment info
and has recorded therein the link information (Xlink) 520 as access information for acquiring period information having particular description of them.

The reception apparatus sets user information (parameter) to a user information setting field (pdi=$pdi$) in the access information (URL) included in the link information (Xlink) in the period information 311 corresponding to an advertisement depicted in FIG. 13.

Data that is accessible using the access information (URL) to which the user information (parameter) is set is a period information file corresponding to advertisement data corresponding to the user.

In the present working example, when user information (parameter) is set to the user information setting field (pdi=$pdi$), the question-answer type metadata (PDI) is utilized.

By setting a predetermined parameter, namely, a parameter including query-answer (question-answer) data of the PDI, to the user information setting field utilizing the question-answer type metadata (PDI), access information (URL) to the period information file corresponding to advertisement data corresponding to the user is generated.

In the following, the working example 6 that utilizes the question-answer type metadata (PDI) is described successively in regard to the following four particular working examples:

(Working example 6-1) Working example wherein a mapping table between access information (URLs) to period information files and PDI instances is provided to a reception apparatus;

(Working example 6-2) Working example wherein PDI table is utilized in configuration in which script (program) for inputting URL with query parameter to generate period information file is provided to reception apparatus;

(Working example 6-3) Working example wherein a PDI table is utilized in a configuration in which a period information file is stored into a cache unit (proxy cache) utilizing a service worker (SW); and (Working example 6-4) Working example wherein a PDI table is utilized in a configuration in which a period information file is generated utilizing a service worker (SW) with a URL with a query parameter inputted.

8-6-1. (Working Example 6-1) Working Example Wherein Mapping Table Between Access Information (URLs) to Period Information Files and PDI Instances is Provided to Reception Apparatus As the working example 6-1, a working example in which a mapping table between access information (URLs) to period information files and PDI instances is provided to the reception apparatus is described.

An example of the mapping table (correspondence table) between access information (URLs) to period information files and PDI instances is depicted in FIGS. 39 and 40. FIGS. 39 and 40 are views depicting part of the mapping table.

In FIGS. 39 and 40, access information (URLs) to the following two period information files, namely, (A) URL-1=http://a.com/period-1.xml, and (B) URL-2=http://a.com/period-2.xml is depicted.

Further, a PDI instance (=PDI query-answer parameter setting example) associated with each pieces of the access information (URL-1 and URL-2) to the two period information files is depicted.

As a PDI instance associated with the period information file access information (URL-1) given by (A) URL-1=http://a.com/period-1.xml, the following two PDI instances are available:

```
(a1) PDI-instance-1
    <PDITable ...>
        <QIAType @id='123' ... >
            <Q ... ><QText ...>How old are you?</QText></Q>
            <A @answer='35' ... />
        <QIAType>
    </PDITable>)
```

```
(a2) PDI instance-2
    <PDITable ...>
        <QBAType @id='456' ... >
            <Q><QText>Are you male?</QText></Q>
            <A @answer='true'/>
        <QBAType>
    </PDITable>)
```

(a1) is an example of the PDI of the QIA (Query for Integer Answer) type. The PDI of the QIA type is a PDI having a question (query) that requests an integral value (Integer) as an answer (answer).

The PDI instance-2 is a PDI instance in which the query answers (question answers) of the question (query)=How old are you? (How old are you?), and the answer (answer)=35 are set.

(a2) is an example of the PDI of the QBA (Query for Boolean Answer) type. The PDI of the QBA type is a PDI having a question (query) that requests a logical value (Boolean value) such as true or false as an answer (answer).

The PDI instance-2 is a PDI instance in which the query and answer (question and answers) of the question (query)=Are you male? (Are you male?), and the answer (answer)=true are set.

In particular, if one of 35 years old, and male, which are user information, is obtained as an answer, then a period information file acquired in accordance with the period information file access information (URL-1) given by (A) URL-1=http://a.com/period-1.xml is selected and a content acquired based on advertisement content access information (advertisement segment URL) recorded in the selected period information file is provided to and outputted from the reception apparatus. This advertisement is an advertisement targeting persons of 35 years old or the male as the main target.

It is to be noted that the PDI instances of (a1) and (a2) depicted in FIG. 39 are set as a URL of the period information file by storing them into the user information setting field in the MPD described hereinabove with reference to FIGS. 37 and 38.

Meanwhile, as a PDI instance associated with the period information file access information (URL-2) given by (B) URL-2=http://a.com/period-2.xml depicted in FIG. 40, three PDI instances (b1) to (b3) depicted in FIG. 40 are available.

(b1) is an example of a PDI of the QSA (Query for Selection Answer) type. The PDI of the QSA type is a PDI having a question (query) for requesting selection from a plurality of answer candidates prescribed in advance as an answer (answer).

(b2) is an example of a PDI of the QTA (Query for Text Answer) type. The PDI of the QTA type is a PDI having a question (query) for requesting inputting of an arbitrary text as an answer (answer).

(b3) is an example of a PDI of the QBA (Query for Boolean Answer) type. The PDI of the QBA type is a PDI having a question (query) for requesting a logical value (Boolean value) such as true or false as an answer (answer).

If the reception apparatus sets user information (query parameter) coincident with the PDI instance indicated by one of (b1) to (b3) of FIG. 40, then a period information file to be acquired in accordance with the period information file access information (URL-2) given by (B) URL-2=http://a.com/period-2.xml
is selected, and a content acquired in accordance with advertisement content access information (advertisement segment URL) recorded in the selected period information file is provided to and outputted from the reception apparatus.

It is to be noted that the mapping table provided from the transmission apparatus 20 to the reception apparatus 30 actually is transmitted, for example, as the XML data depicted in FIG. 41. It is to be noted that the XML data is transmitted as service layer signaling data (Service Layer Signaling) to the reception apparatus (client) side similarly to XML data that describe other control information and is updated and managed by the reception apparatus side.

It is to be noted that the mapping table has a version identifier set thereto, and if the mapping table is updated, then the version identifier is changed, and when the reception apparatus detects that the mapping table is updated, it executes a data updating process of replacing the mapping table stored in the cache unit with new data.

Figure 42:
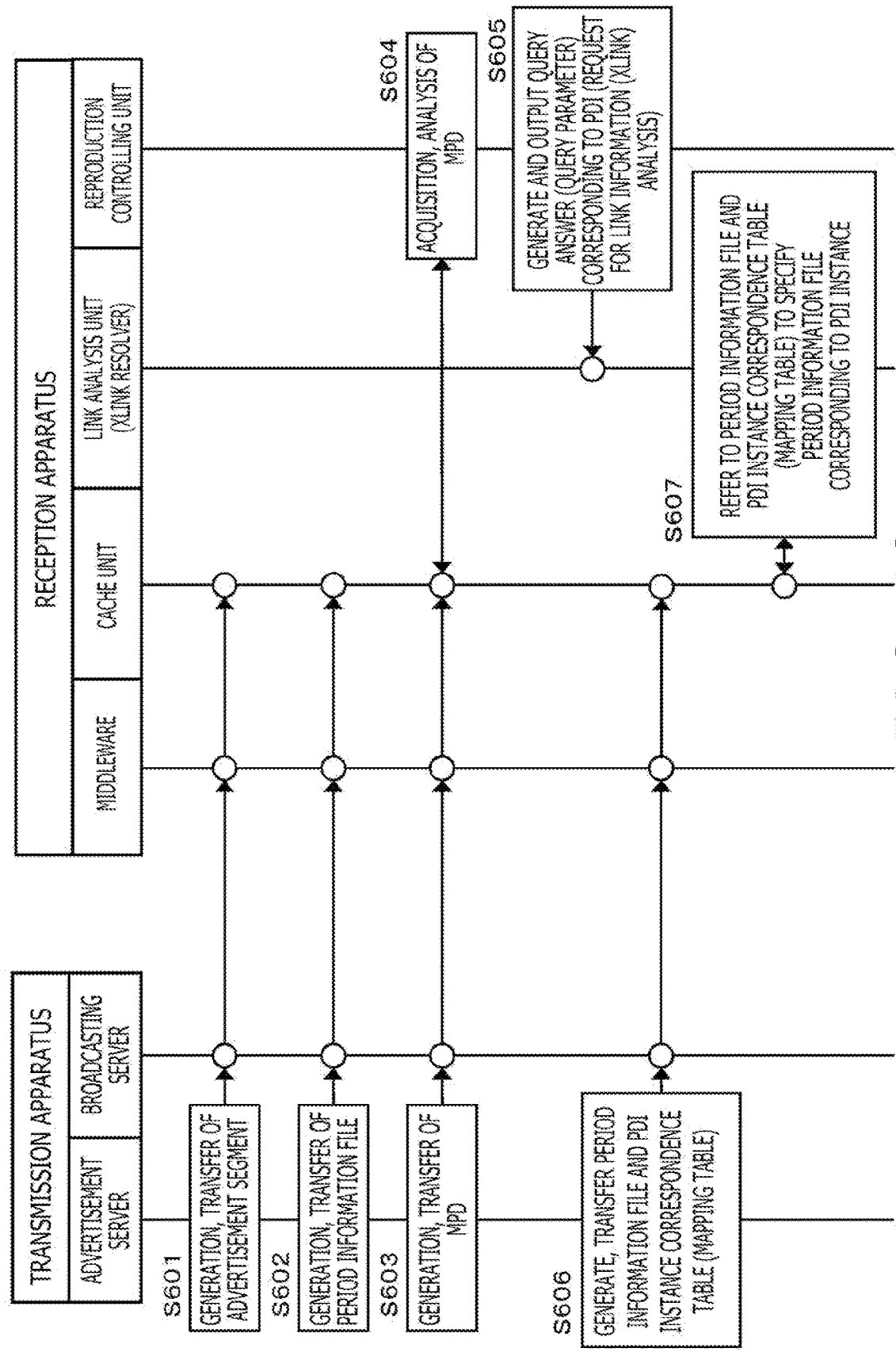
FIG. 42 is a view illustrating a processing sequence of a working example in which a mapping table between access information (URLs) to period information files and PDI instances is provided to the reception apparatus.
Figure 43:
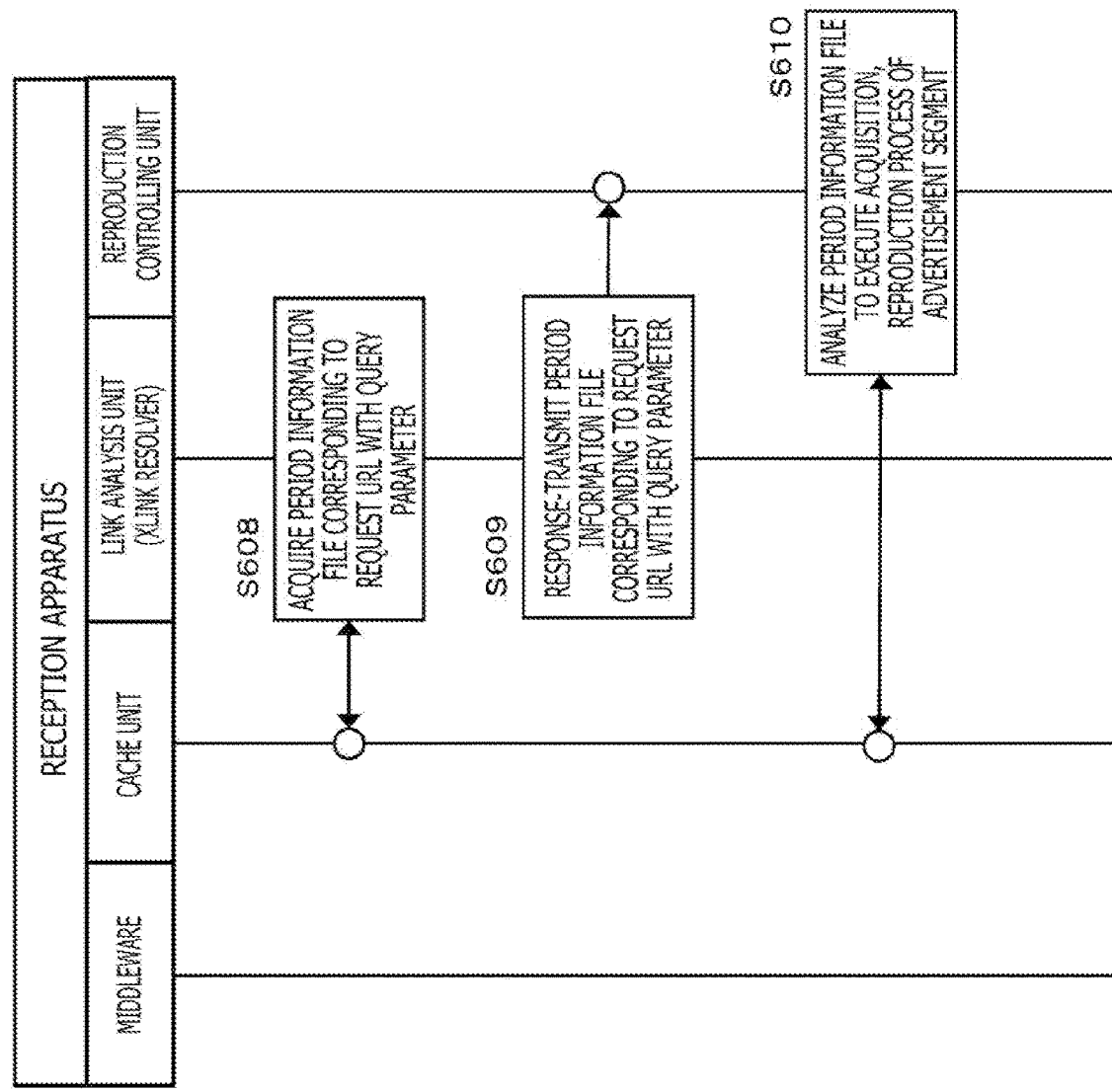
FIG. 43 is a view illustrating a processing sequence of the working example in which a mapping table between access information (URLs) to period information files and PDI instances is provided to the reception apparatus.

Now, a processing sequence of the present working example 6-1, namely, a working example in which a mapping table between access information (URLs) to a period information file and PDI instances is provided to the reception apparatus is described with reference to sequence diagrams depicted in FIGS. 42, 43 and so forth. In FIGS. 42 and 43, the following apparatus and components are depicted from the left:

(a) an advertisement server that is a component of the transmission apparatus;
(b) a broadcasting server that is a component of the transmission apparatus;
(c) middleware that is a component of the reception apparatus;
(d) a cache unit (proxy cache) of a proxy server that is a component of the reception apparatus;
(e) a link resolution unit (XlinkResolver) of the proxy server that is a component of the reception apparatus; and
(f) a reproduction controlling unit that is a component of the reception apparatus.

Processes at steps depicted in FIGS. 42 and 43 are successively described blow.

(Step S601)

At step S601, the advertisement server generates and transfers an advertisement segment file in which advertisement contents are stored. The advertisement server performs multicast transmission setting a reception apparatus as a transmission target through a broadcasting wave or a network.

It is to be noted that an advertisement transmitted from the advertisement server includes different advertisement contents corresponding to various users. In particular, the advertisement server transmits an advertisement segment file in which various advertisement contents according to users for being provided to different users who have various ages and various residences are stored.

It is to be noted that the transmission process of an advertisement segment file may be set so as to be continuously and repetitively executed.

(Step S602)

At step S602, the advertisement server generates and transmits a period information file in which control information necessary for the reception apparatus to acquire, decode and output (reproduce) an advertisement content such as access information (advertisement segment URL) to each of the various advertisement contents transmitted at step S601 is recorded.

The period information files generated and transmitted by the advertisement server are a number of different period information files corresponding to the number of types of advertisement segments generated and transmitted at step S601.

The plurality of different period information files are multicast transmitted through a broadcasting wave or a network.

It is to be noted that also the period information files may be set so as to be continuously and repetitively transmitted.

(Step S603)

Further, at step S603, the advertisement server executes a transmission process of an MPD.

The MPD to be transmitted here is the MPD described, for example, with reference to FIGS. 37 and 38. In particular, an incomplete URL is recorded which includes period information corresponding to an advertisement and in which link information (Xlink), namely, a field to which user information is to be set in accordance with a PDI configuration, is provided in the period information corresponding to an advertisement.

In the reception apparatus, a URL for acquisition of one user-corresponding period information file in which access information to a specific advertisement content or the like is recorded can be generated by setting predetermined user information (parameter) to the user information setting field.

(Step S604)

At step S604, a process of the reproduction controlling unit of the reception apparatus is performed.

The reproduction controlling unit of the reception apparatus acquires the MPD transmitted from the transmission apparatus and executes analysis (parse) of the acquired MPD.

It is to be noted that the MPD is received by the middleware of the reception apparatus and is stored into the cache unit of the proxy server, and then the reproduction controlling unit acquires the MPD from the cache unit.

(Step S605)

At step S605, the reproduction controlling unit of the reception apparatus acquires the link information (Xlink) recorded in the period information corresponding to an advertisement of the MPD acquired at step S604, namely, the URL having the user information setting field, and sets user information (parameter) to the user information setting field.

In particular, similarly to the PDI instance described with reference to FIGS. 39 and 40, an answer (answer) according to a query of any of various types of PDIs is set as user information.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs the user information in accordance with the PDI format to the proxy server to request analysis (link resolution) of the link information (Xlink).

(Step S606)

A process at step S606 is a process of the advertisement server.

The advertisement server generates and transmits a period information file and a PDI instance correspondence table (mapping table).

The PDI instance correspondence table is the mapping table described with reference to FIGS. 39 and 40. However, actual transmission data is XML data described, for example, with reference to FIG. 41.

The mapping table can be transmitted or can be updated and transmitted periodically at any time. A version identifier is set to the mapping table, and the reception apparatus performs a process for performing cache of update data at any time by version management.

(Steps S607 to S609)

At steps S607 to S609, the proxy server of the reception apparatus executes a process in accordance with the link resolution request (S605) from the reproduction controlling unit.

In particular, the link resolution unit (XLinkResolver) of the proxy server acquires a period information file accessed in accordance with the URL mapped based on the PDI instance from the cache unit (proxy cache) and outputs the period information file to the reproduction controlling unit.

The link resolution unit (XLinkResolver) of the proxy server selectively acquires one period information file from the cache unit (proxy cache) utilizing the mapping table received from the advertisement server at step S606 and outputs the period information file to the reproduction controlling unit.

The link resolution unit (XLinkResolver) of the proxy server first extracts a PDI instance that coincides with the user information inputted from the reproduction controlling unit of the reception apparatus, namely, the data including the PDI-format query answer information, from the mapping table.

Then, in the mapping table, a URL of the period information file associated with the coinciding PDI instance is selected, and one period information file is acquired applying the URL and outputted to the reproduction controlling unit.

The period information file is the period information file selected in response to the user information (parameter) set by the reproduction controlling unit at step S605 and is a period information file in which access information (advertisement segment URL) to an optimum advertisement content to be provided to a specific user or the like selected on the basis of the set user information (answer to the PDI) is recorded.

(Step S610)

Finally at step S610, the reproduction controlling unit of the reception apparatus reads out and analyzes the recorded information of the period information file acquired from the proxy server.

The reproduction controlling unit acquires an advertisement segment file in which advertisement contents are stored utilizing the access information (advertisement segment URLs) to the advertisement contents included in the recorded information of the period information file and outputs the advertisement segment file through the outputting unit such as the display unit or the speaker of the reception apparatus.

It is to be noted that a decoding mode for the advertisement content and control information such as an outputting time period are recorded in the period information file, and the reproduction controlling unit executes a process in accordance with the information recorded in the period information file to execute an outputting process of the advertisement content.

Here, the advertisement content outputted to the reception apparatus is an advertisement selected in response to the user information set by the reproduction controlling unit at step S605 and is an advertisement corresponding to users whose main target is a user selected based on characteristics of a user (viewer), for example, based on an age, a residence and so forth of the user.

8-6-2. (Working Example 6-2) Working Example Wherein PDI Table is Utilized in Configuration in which Script (Program) for Inputting URL with Query Parameter to Generate Period Information File is Provided to Reception Apparatus Now, as the working example 6-2, a working example is described in which a PDI table is utilized in a configuration in which a script (program) for inputting a URL with a query parameter to generate a period information file is provided to the reception apparatus.

The present working example 6-2 is a working example in which the reception apparatus 30 inputs a URL with a query parameter generated by the reproduction controlling unit utilizing a script (program) received from the transmission apparatus 20 to generate a period information file.

In the present working example, user information having a PDI configuration that has a query-answer configuration is outputted from the reproduction controlling unit (DASH Client) of the reception apparatus to a program (script) execution unit.

For example, a URL with a query parameter that is a URL of the MPD/Period/@xlink:href attribute, for example, such user information as

--- http://a.com/XLinkResolver?<PDITable ...><QIAType
@id='123' ... ><Q ... ><QText ...>How old are
you?</QText></Q><A @answer='35' ...
/><QIAType></PDITable>

--- is outputted to the program (script) execution unit.

The program (script) execution unit executes the program (script) to generate a specific period information file corresponding to the user information in accordance with the PDI including the user information and outputs the generated period information file to the reproduction controlling unit.

A processing sequence of the present working example 6-2, namely, the working example in which a script (program) for inputting a URL with a query parameter to generate a period information file is provided to the reception apparatus, is described with reference to sequence diagrams depicted in FIGS. 44, 45 and so forth.

Figure 44:
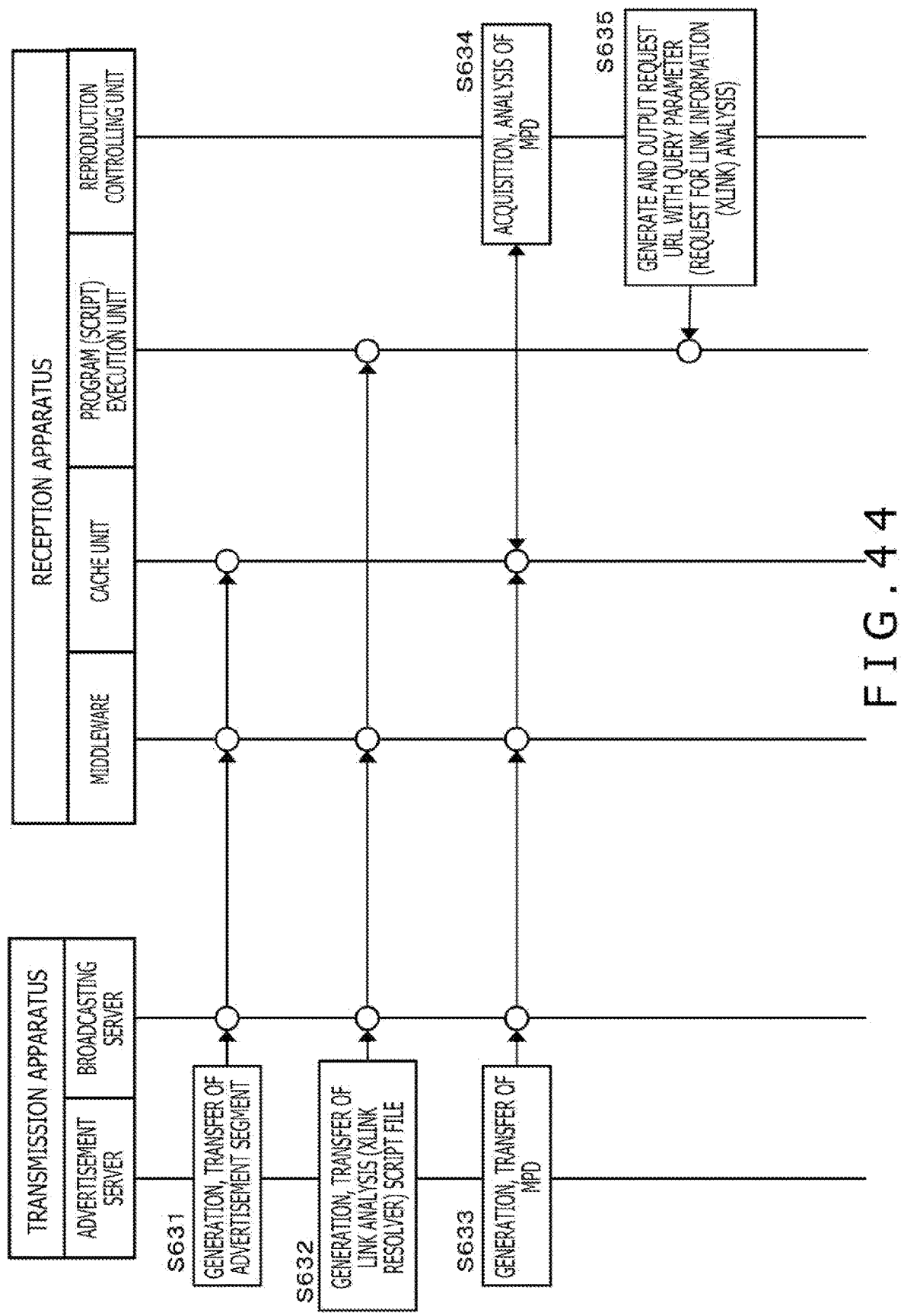
FIG. 44 is a view illustrating a processing sequence of a working example in which a script (program) for inputting a URL with a query parameter to generate a period information file is provided to the reception apparatus.

In FIGS. 44 and 45, the following apparatus and components are depicted from the left:

(a) an advertisement server that is a component of the transmission apparatus;

(b) a broadcasting server that is a component of the transmission apparatus;

(c) middleware that is a component of the reception apparatus;

(d) a cache unit (proxy cache) of a proxy server that is a component of the reception apparatus;

(e) a program (script) execution unit that is a component of the reception apparatus; and (f) a reproduction controlling unit that is a component of the reception apparatus.

It is to be noted that "(e) the program (script) execution unit that is a component of the reception apparatus" may be configured in the proxy server 120 in the reception apparatus or may be configured in the reproduction controlling unit 131. Alternatively, the program (script) execution unit may be set as an independent data processing unit.

Processes at steps depicted in FIGS. 44 and 45 are successively described.

(Step S631)

At step S631, the advertisement server generates and transfers an advertisement segment file in which advertisement contents are stored. The advertisement server performs multicast transmission setting a reception apparatus as a transmission target through a broadcasting wave or a network.

It is to be noted that an advertisement transmitted from the advertisement server includes different advertisement contents corresponding to various users. In particular, the advertisement server transmits an advertisement segment file in which various advertisement contents according to users for being provided to different users who have various ages and various residences are stored. It is to be noted that the transmission process of an advertisement segment file may be set so as to be continuously and repetitively executed.

(Step S632)

At step S632, the advertisement server generates and transmits a script file that is a data processing program to the reception apparatus.

The script is a script for inputting a URL with a query parameter generated utilizing an MPD by the reproduction controlling unit of the reception apparatus to generate a period information file.

In particular, the script is a script for executing a link resolution (XlinkResolver) process to generate a period information file.

This script executes a process for generating a period information file that records control information necessary for the reception apparatus to acquire, decode and output (reproduce) an advertisement content such as access information (advertisement segment URL) to each of the various advertisement contents transmitted at step S631.

(Step S633)

Further, at step S633, the advertisement server executes a transmission process of an MPD.

The MPD transmitted here is, for example, the MPD described hereinabove with reference to FIGS. 37 and 38. In particular, an incomplete URL that includes period information corresponding to an advertisement and in which link information (Xlink), namely, a field for setting user information in accordance with the PDI configuration, is provided in the period information corresponding to an advertisement, is recorded in the MPD.

By setting predetermined user information (parameter) in the user information setting field in the reception apparatus, a URL for acquiring one user-corresponding period information file in which access information to a specific advertisement content or the like is recorded can be generated.

(Step S634)

A process at step S634 is a process of the reproduction controlling unit of the reception apparatus.

The reproduction controlling unit of the reception apparatus acquires the MPD transmitted from the transmission apparatus and executes analysis (parse) of the acquired MPD.

It is to be noted that the MPD is received by the middleware of the reception apparatus and stored into the cache unit of the proxy server, and thereafter, the reproduction controlling unit acquires the MPD from the cache unit.

(Step S635)

At step S635, the reproduction controlling unit of the reception apparatus acquires the link information (Xlink) recorded in the period information corresponding to an advertisement of the MPD acquired at step S634, namely, link information (Xlink) having a user information setting field of the PDI format, and sets the user information (parameter) to the user information setting field.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs PDI data in which the user information (parameter) is set to the user information setting field to the program (script) execution unit to request for analysis (link resolution) of the link information (Xlink).

The requesting process is executed, for example, as an HTTP-GET request.

(Steps S636 and S637)

Processes at steps S636 and S637 are processes of the program (script) execution unit of the reception apparatus.

At step S636, the script received from the advertisement server at step S632 is activated.

In particular, a script for inputting a URL with a query parameter including the PDI information to generate a period information file is activated.

Further, the script is executed at step S637 to analyze the user information (parameter) of the PDI format inputted from the reproduction controlling unit at step S635 to generate a period information file corresponding to the user information, and outputs the period information file to the reproduction controlling unit. The outputting process is executed, for example, as an HTTP-response.

The period information file is the period information file according to the user information (parameter) set by the reproduction controlling unit at step S635, and is a period information file in which access information (advertisement segment URL) or the like to an optimum advertisement content to be provided to a specific user selected based on the set user information (age, Location or the like) is recorded.

(Step S638)

Finally at step S638, the reproduction controlling unit of the reception apparatus reads out and analyzes the recorded information of the period information file acquired from the program (script) execution unit. The reproduction controlling unit acquires an advertisement segment file in which an advertisement content is stored utilizing the access information (advertisement segment URL) to the advertisement contents included in the recorded information of the period information file and outputs the acquired file through the outputting unit such as the display unit or the speaker of the reception apparatus.

It is to be noted that a decoding mode for the advertisement content and control information such as an outputting time period are recorded in the period information file, and the reproduction controlling unit executes a process in accordance with the information recorded in the period information file to execute an outputting process of the advertisement content.

Here, the advertisement content outputted to the reception apparatus is an advertisement selected in response to the user information set by the reproduction controlling unit at step S635, and is an advertisement corresponding to a user whose main target is a user selected based on characteristics of a user (viewer), for example, based on an age, a residence and so forth of the user.

8-6-3. (Working Example 6-3) Working Example Wherein PDI Table is Utilized in Configuration in which Period Information File is Stored into Cache Unit (Proxy Cache) Utilizing Service Worker (SW)

Now, as the working example 6-3, a working example is described in which a PDI table is utilized in a configuration in which a period information file is stored into a cache unit (proxy cache) utilizing a service worker (SW).

As described hereinabove with reference to FIGS. 30 to 32, the service worker (SW: Service Worker) is a program that executes an application (=application program) executed by the reception apparatus (client) 30, an acquisition process of a data file or the like utilized upon execution of the application, a storage process into the storage unit (cache), an updating process, a deletion process and so forth. In particular, the service worker is configured, for example, from JavaScript (registered trademark).

The service worker (SW) is set, for example, corresponding to a broadcasting program (broadcasting content) provided by the transmission apparatus 20, and is provided to the reception apparatus 30 as an application controlling and management program provided from the transmission apparatus 20 to the reception apparatus 30.

The present working example 6-3 is a working example in which a process for storing the period information file into the cache unit (proxy cache) is executed utilizing the service worker (SW).

A processing sequence of the present working example 6-3, namely, the working example in which a process for storing the period information file into the cache unit (proxy cache) is executed utilizing the service worker (SW), is described with reference to sequence diagrams depicted in FIGS. 46, 47 and so forth.

In FIGS. 46 and 47, the following apparatus and components are depicted from the left:
(a) an advertisement server that is a component of the transmission apparatus;
(b) a broadcasting server that is a component of the transmission apparatus;
(c) middleware that is a component of the reception apparatus;
(d) a cache unit (proxy cache) of a proxy server that is a component of the reception apparatus;
(e) a browser cache that is a component of the reception apparatus;
(f) a browser program (script) execution unit that is a component of the reception apparatus; and
(g) a reproduction controlling unit that is a component of the reception apparatus.

It is to be noted that (e) the browser cache that is a component of the reception apparatus and (f) the browser program (script) execution unit that is a component of the reception apparatus are the management cache and the execution unit of the service worker (SW) described above.

Processes at steps depicted in FIGS. 46 and 47 are described below successively.

(Step S651)

At step S651, the advertisement server generates and transfers an advertisement segment file in which advertisement contents are stored. The advertisement server performs multicast transmission setting a reception apparatus as a transmission target through a broadcasting wave or a network.

It is to be noted that an advertisement transmitted from the advertisement server includes different advertisement contents corresponding to various users. In particular, the advertisement server transmits an advertisement segment file in which various advertisement contents according to users for being provided to different users who have various ages and various residences are stored. It is to be noted that the transmission process of an advertisement segment file may be set so as to be continuously and repetitively executed.

(Step S652)

At step S652, the advertisement server generates and transmits a period information file in which control information necessary for the reception apparatus to acquire, decode and output (reproduce) an advertisement content such as access information (advertisement segment URL) to each of the various advertisement contents transmitted at step S651 is recorded.

The period information files generated and transmitted by the advertisement server are a number of different period information files corresponding to the number of types of advertisement segments generated and transmitted at step S651.

The plurality of different period information files are multicast transmitted through a broadcasting wave or a network.

It is to be noted that also the period information files may be set so as to be continuously and repetitively transmitted.

(Step S653)

At step S653, the advertisement server generates and transmits a service worker (SW) script file that is a data processing program to the reception apparatus. The service worker (SW) script file is a script that executes a process for acquiring a period information file or an advertisement segment file stored in the proxy cache of the reception apparatus and storing the acquired file into a browser cache that is a management cache of the service worker (SW).

(Steps S654 to S656)

Processes at steps S654 to S656 are processes of the browser program (script) execution unit of the reception apparatus.

At step S654, the service worker (SW) script file received from the advertisement server at step S652 is activated.

In particular, the service worker (SW) script file that executes a process for acquiring a period information file or an advertisement segment file stored in the proxy cache of the reception apparatus and storing the acquired file into a browser cache that is a management cache of the service worker (SW) is activated.

Further, at steps S655 and S656, the service worker (SW) script file is executed and the period information file or the advertisement segment file stored in the proxy cache are acquired and stored into the browser cache that is a management cache of the service worker (SW).

(Step S657)

At step S657, the advertisement server executes a transmission process of an MPD.

The MPD transmitted here is, for example, the MPD described hereinabove with reference to FIGS. 37 and 38. In particular, an incomplete URL that includes period information corresponding to an advertisement and in which link information (Xlink), namely, a field to which user information is to be set in accordance with a PDI configuration, is provided in the period information corresponding to an advertisement, is recorded in the MPD.

If predetermined user information (parameter) is set to the user information setting field by the reception apparatus, then a URL for acquiring one user-corresponding period information file in which access information to a specific advertisement content or the like is recorded can be generated.

(Step S658)

A process at step S658 is a process of the reproduction controlling unit of the reception apparatus.

The reproduction controlling unit of the reception apparatus acquires the MPD transmitted from the transmission apparatus and executes analysis (parse) of the acquired MPD.

It is to be noted that the MPD is received by the middleware of the reception apparatus and is stored into the cache unit of the proxy server, and thereafter, the MPD is acquired from the cache unit by the reproduction controlling unit.

(Step S659)

At step S659, the reproduction controlling unit of the reception apparatus acquires link information (Xlink) recorded in the period information corresponding to an advertisement of the MPD acquired at step S658, namely, link information (Xlink) having a user information setting field of the PDI format, and sets the user information (parameter) to the user information setting field.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs PDI data in which the user information (parameter) is set to the user information setting field to the program (script) execution unit to request for analysis (link resolution) of the link information (Xlink).

The requesting process is executed, for example, as an HTTP-GET request.

(Step S660)

A process at step S660 is a process of the browser cache of the reception apparatus.

The browser cache executes a response process to the HTTP-GET request inputted from the reproduction controlling unit.

In particular, the user information (parameter) of the PDI format inputted from the reproduction controlling unit is analyzed to acquire a period information file corresponding to the user information, and outputs the period information file to the reproduction controlling unit.

The outputting process is executed, for example, as an HTTP-response.

The period information file is the period information file according to the user information (parameter) set by the reproduction controlling unit at step S659, and is a period information file in which access information (advertisement segment URL) to an optimum advertisement content to be provided to a specific user selected based on the set user information (age, Location and so forth) and so forth are recorded.

(Step S661)

Finally, at step S661, the reproduction controlling unit of the reception apparatus reads out and analyzes the recorded information of the period information file acquired from the browser cache.

The reproduction controlling unit acquires an advertisement segment file in which an advertisement content is stored utilizing the access information (advertisement segment URL) to the advertisement content included in the recorded information of the period information file, and outputs the acquired file through an outputting unit such as the display unit or the speaker of the reception apparatus.

It is to be noted that a decoding mode for the advertisement content and control information such as an outputting time period are recorded in the period information file, and the reproduction controlling unit executes a process in accordance with the information recorded in the period information file to execute an outputting process of the advertisement content.

Here, the advertisement content outputted to the reception apparatus is an advertisement selected in response to the user information set by the reproduction controlling unit at step S659, and is an advertisement corresponding to a user whose main target is a user selected based on characteristics of a user (viewer), for example, based on an age, a residence and so forth of the user.

8-6-4. (Working Example 6-4) Working Example Wherein PDI Table is Utilized in Configuration in which Period Information File is Generated Utilizing Service Worker (SW) with URL with Query Parameter Inputted Now, as the working example 6-4, a working example is described in which a PDI table is utilized in a configuration in which a URL with a query parameter is inputted to generate a period information file utilizing a service worker (SW).

The present working example 6-4 is a working example in which a process for generating a period information file is executed utilizing a service worker (SW).

The present working example 6-4 is a working example in which the reception apparatus 30 utilizes a service worker (SW) script transmitted from the transmission apparatus 20 and inputs a URL with a query parameter generated by the reproduction controlling unit to generate a period information file.

A processing sequence of the present working example 6-4, namely, a working example in which a period information file is generated utilizing the service worker (SW), is described with reference to sequence diagrams depicted in FIGS. 48, 49 and so forth.

Figure 48:
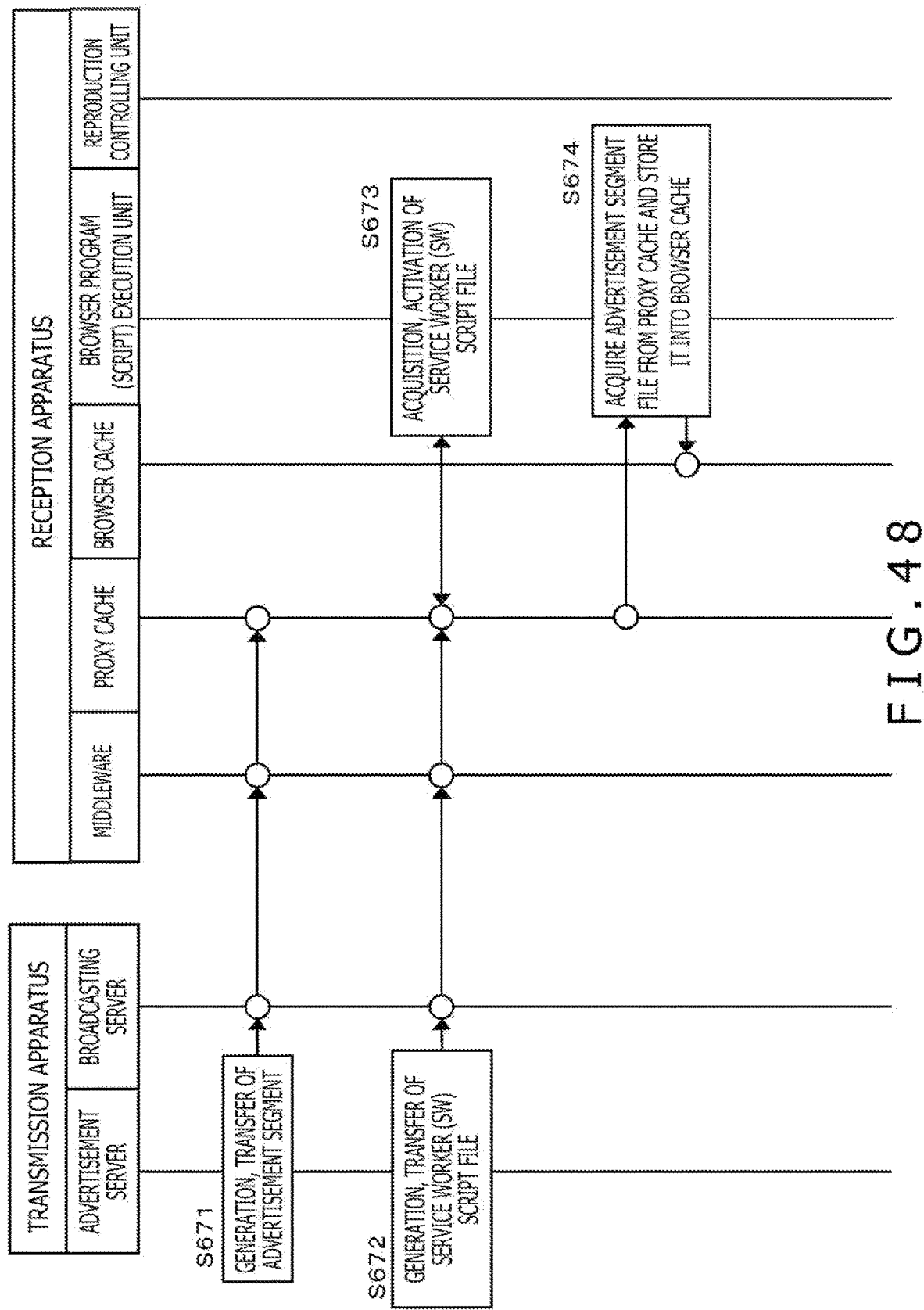
FIG. 48 is a view illustrating a processing sequence of a working example in which a period information file is generated utilizing a service worker (SW).

In FIGS. 48 and 49, the following apparatus and components are depicted from the left:

(a) an advertisement server that is a component of the transmission apparatus;
(b) a broadcasting server that is a component of the transmission apparatus;
(c) middleware that is a component of the reception apparatus;
(d) a cache unit (proxy cache) of a proxy server that is a component of the reception apparatus;
(e) a browser cache that is a component of the reception apparatus;
(f) a browser program (script) execution unit that is a component of the reception apparatus; and
(g) a reproduction controlling unit that is a component of the reception apparatus.

It is to be noted that, among the components described above, (e) the browser cache that is a component of the reception apparatus and (f) the browser program (script) execution unit that is a component of the reception apparatus are the management cache and the execution unit of the service worker (SW) described above.

In the following, processes at steps depicted in FIGS. 48 and 49 are successively described.

(Step S671)

At step S671, the advertisement server generates and transfers an advertisement segment file in which advertisement contents are stored. The advertisement server performs multicast transmission setting a reception apparatus as a transmission target through a broadcasting wave or a network.

It is to be noted that an advertisement transmitted from the advertisement server includes different advertisement contents corresponding to various users. In particular, the advertisement server transmits an advertisement segment file in which various advertisement contents according to users for being provided to different users who have various ages and various residences are stored. It is to be noted that the transmission process of an advertisement segment file may be set so as to be continuously and repetitively executed.

(Step S672)

At step S672, the advertisement server generates and transmits a service worker (SW) script file that is a data processing program to the reception apparatus. The service worker (SW) script file executes a process for extracting from a browser cache an advertisement segment file transmitted from the advertisement server and stored in the proxy cache of the reception apparatus and storing the advertisement segment file into the browser cache. Further, the service worker (SW) script file inputs a URL with a query parameter generated by the reproduction controlling unit of the reception apparatus utilizing the MPD to generate a period information file. In other words, the service worker (SW) script file executes the link resolution (XlinkResolver) process to generate a period information file.

The service worker (SW) scripts executes the processes described above.

This service worker (SW) script executes a process for generating a period information file in which control information necessary for the reception apparatus to acquire, decode and output (reproduce) an advertisement content such as access information (advertisement segment URL) to each of the various advertisement contents transmitted at step S671 is recorded.

(Steps S673 and S674)

Processes at steps S673 and S674 are processes by the browser program (script) execution unit of the reception apparatus.

At step S673, the service worker (SW) script file received from the advertisement server at step S672 is activated.

Further, at step S674, the service worker (SW) script is executed to acquire an advertisement segment file stored in the proxy cache and store the advertisement segment file into a browser cache that is a management cache of the service worker (SW).

(Step S675)

At step S675, the advertisement server executes a transmission process of an MPD.

The MPD to be transmitted here is the MPD described hereinabove, for example, with reference to FIGS. 37 and 38. In particular, an incomplete URL is recorded which includes period information corresponding to an advertisement and in which link information (Xlink), namely, a field to which user information is to be set in accordance with a PDI configuration, is provided in the period information corresponding to an advertisement.

In the reception apparatus, a URL for acquisition of one user-corresponding period information file in which access information to a specific advertisement content or the like is recorded can be generated by setting predetermined user information (parameter) to the user information setting field.

(Step S676)

At step S676, a process of the reproduction controlling unit of the reception apparatus is performed.

The reproduction controlling unit of the reception apparatus acquires the MPD transmitted from the transmission apparatus and executes analysis (parse) of the acquired MPD.

It is to be noted that the MPD is received by the middleware of the reception apparatus, stored into the cache unit of the proxy server and then acquired from the cache unit by the reproduction controlling unit.

(Step S677)

At step S677, the reproduction controlling unit of the reception apparatus acquires the link information (Xlink) recorded in the period information corresponding to an advertisement of the MPD acquired at step S676, namely, the link information (Xlink) having the user information setting field of the PDI format, and sets user information (parameter) to the user information setting field.

The setting process of user information may be such that, for example, user information registered (recorded) in advance in the storage unit of the reception apparatus is used or may be configured such that user information is successively inputted by a user such that such user input information is used.

The reproduction controlling unit of the reception apparatus outputs the PDI data in which the user information (parameter) is set to the user information setting field to the program (script) execution unit to request for analysis (link resolution) of the link information (Xlink).

The requesting process is executed, for example, as an HTTP-GET request.

(Step S678)

A process at step S678 is a process of the browser program (script) execution unit of the reception apparatus.

At step S678, the browser program (script) execution unit executes the service worker (SW) script. That is, the browser program (script) execution unit analyzes the user information (parameter) of the PDI format inputted from the reproduction controlling unit at step S677 to generate a period information file corresponding to the user information and outputs the period information file to the reproduction controlling unit.

This outputting process is executed, for example, as an HTTP-response.

This period information file is a period information file according to the user information (parameter) set by the reproduction controlling unit at step S677, and is a period information file in which access information (advertisement segment URL) to an optimum advertisement content to be provided to a specific user selected based on the set user information (age, Location and so forth) and so forth are recorded.

(Step S679)

Finally at step S679, the reproduction controlling unit of the reception apparatus reads out and analyzes the recorded information of the period information file acquired from the program (script) execution unit.

The reproduction controlling unit acquires an advertisement segment file in which an advertisement content is stored utilizing the access information (advertisement segment URL) to the advertisement content included in the recorded information of the period information file, and outputs the advertisement segment file through the outputting unit such as the display unit or the speaker of the reception apparatus.

It is to be noted that a decoding mode for the advertisement content and control information such as an outputting time period are recorded in the period information file, and the reproduction controlling unit executes a process in accordance with the information recorded in the period information file to execute an outputting process of the advertisement content.

Here, the advertisement content outputted to the reception apparatus is an advertisement selected in response to the user information set by the reproduction controlling unit at step S677, and is an advertisement corresponding to a user whose main target is a user selected based on characteristics of a user (viewer), for example, based on an age, a residence and so forth of the user.

9. Example of Configuration of Transmission Apparatus and Reception Apparatus Now, an example of an apparatus configuration of the transmission apparatus (server) 20 and the reception apparatus (client) 30 that are communication apparatus is described with reference to FIGS. 50 and 51.

Figure 50:
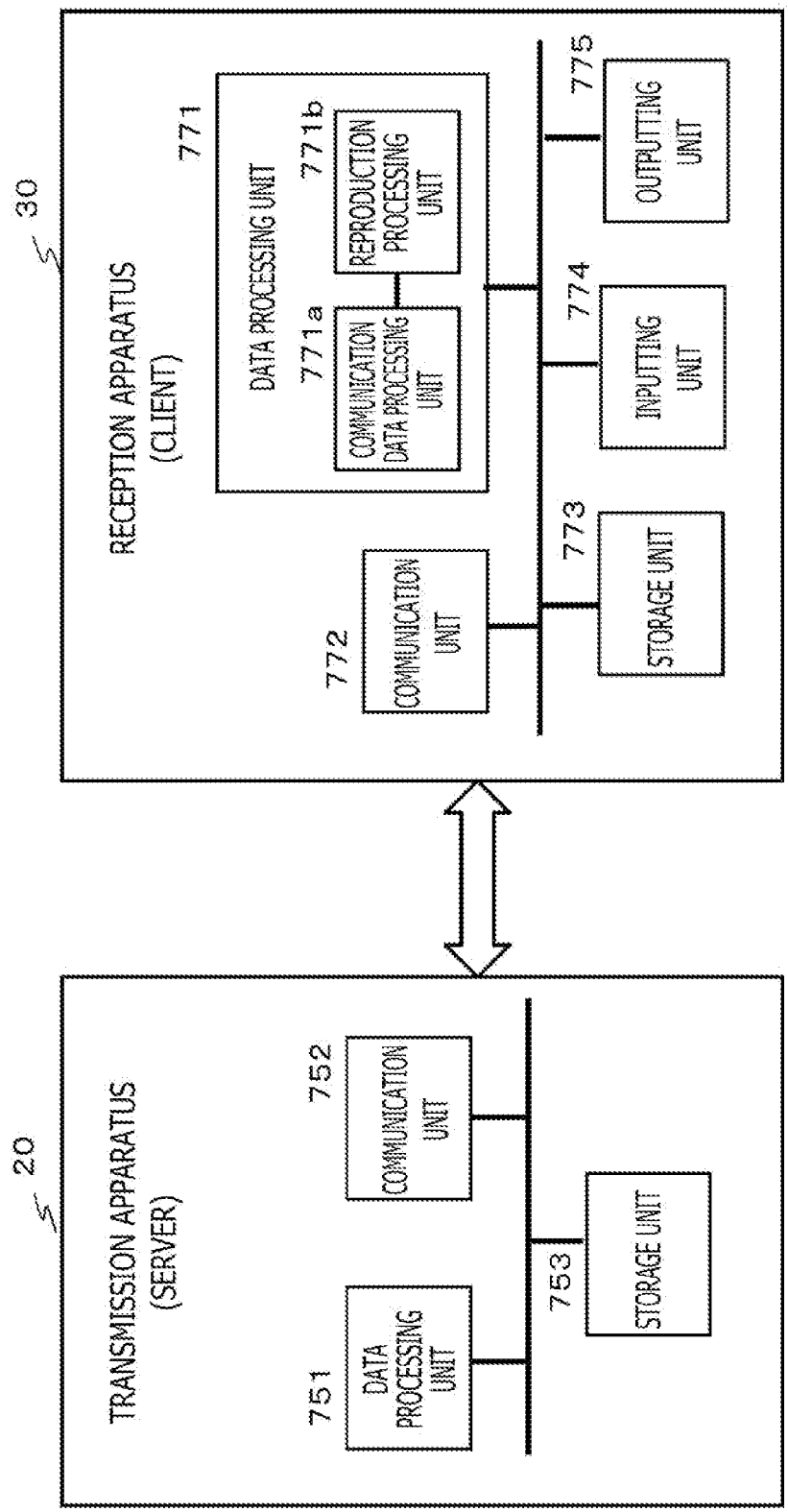
FIG. 50 is a view illustrating an example of a configuration of the transmission apparatus and the reception apparatus that are communication apparatus.

FIG. 50 depicts an example of the configuration of the transmission apparatus (server) 20 and the reception apparatus (client) 30.

The transmission apparatus (server) 20 includes a data processing unit 751, a communication unit 752 and a storage unit 753.

The reception apparatus (client) 30 includes a data processing unit 771, a communication unit 772, a storage unit 773, an inputting unit 774 and an outputting unit 775.

The data processing unit includes a communication data processing unit 771a and a reproduction processing unit 771b.

The data processing unit 751 of the transmission apparatus (server) 20 executes various data processes for executing a data distribution service. For example, the data processing unit 751 performs generation and transmission control of configuration data of a data distribution service. Further, the data processing unit 751 performs generation and transmission processes of an application, a period information file and a service worker (SW) to be provided to the reception apparatus (client) 30 and other various data and signaling data.

The communication unit 752 performs a communication process such as distribution of, in addition to an AV segment, an application, a period information file, a service worker (SW), other various data, signaling data and so forth.

An AV segment, an application, a period information file, a service worker (SW), data to be utilized by the application, signaling data and so forth that are to be distributed are stored in the storage unit 753. Further, the storage unit 753 is utilized as a work area for the data process executed by the data processing unit 751 and is utilized also as a storage region for various parameters.

On the other hand, the reception apparatus (client) 30 includes the data processing unit 771, communication unit 772, storage unit 773, inputting unit 774 and outputting unit 775.

The communication unit 772 receives data distributed from the transmission apparatus (server) 20, for example, an AV segment, an application, a period information file, a service worker (SW), data utilized by the application, signaling data and so forth.

The data processing unit 771 includes the communication data processing unit 771a and the reproduction processing unit 771b and executes, for example, the processes in accordance with the working examples described above or the like.

In particular, the data processes utilizing an application, a period information file, an API (Application Program Interface) and a service worker (SW) or the like is executed.

Various commands as instruction commands of a user such as, for example, channel selection, application activation and installation commands are inputted through the inputting unit 774.

Reproduction data is outputted to the outputting unit 775 such as a display unit or a speaker.

The storage unit 773 stores an AV segment, a service worker (SW), an application, data utilized by the application, signaling data and so forth therein.

Further, the storage unit 773 is utilized as a work area for data processes executed by the data processing unit 771 and is utilized also as a storage region for various parameters.

FIG. 51 depicts an example of a hardware configuration of a communication apparatus that can be applied as the transmission apparatus 20 and the reception apparatus 30.

A central processing unit (CPU) 801 functions as a data processing unit that executes various processes in accordance with a program stored in a read only memory (ROM) 802 or a storage unit 808. For example, the processes in accordance with the sequences described in connection with the working examples described above are executed. A program to be executed by the CPU 801, data and so forth are stored into a random access memory (RAM) 803. The CPU 801, ROM 802 and RAM 803 are connected to each other through a bus 804.

The CPU 801 is connected to an input/output interface 805 through the bus 804, and an inputting unit 806 configured from various switches, a keyboard, a mouse, a microphone and so forth and an outputting unit 807 configured from a display unit, a speaker and so forth are coupled to the input/output interface 805. The CPU 801 executes various processes in response to an instruction inputted from the inputting unit 806 and outputs a result of the processes, for example, to the outputting unit 807.

A storage unit 808 connected to the input/output interface 805 is configured, for example, from a hard disk drive or the like and stores programs to be executed by the CPU 801 and various data. A communication unit 809 functions as a transmission and reception unit of data communication through a network such as the Internet or a local area network and also as a transmission and reception unit of a broadcasting wave, and performs communication with an external apparatus.

A drive 810 connected to the input/output interface 805 drives a removable medium 811 such as a magnetic disk, an optical disk, a magneto-optical disk or a semiconductor memory such as a memory card and executes recording or reading of data.

It is to be noted that, while encoding or decoding of data can be executed as a process of the CPU 801 as the data processing unit, a configuration may be applied in which a codec as hardware for exclusive use for executing an encoding process or a decoding process is provided.

10. Summary of Configuration of Present Disclosure

The working examples of the present disclosure have been described in detail with reference to the embodiment of the present disclosure. However, it is self-evident that those skilled in the art can implement modification or substitution without departing from the scope of the present disclosure. In particular, the present invention has been disclosed in the form of illustration and is not to be construed as restrictive. In order to decide the subject matter of the present disclosure, the claims should be referred to.

It is to be noted the technology disclosed in the present specification can be configured in such a manner as described below.

(1) A reception apparatus, including:
a communication unit configured to receive signaling data having a user information setting region; and
a data processing unit configured to set user information to the user information setting region and apply the generated user information-set data to acquire a control information file of the user information-corresponding content, and
apply description data of the acquired control information file to acquire the user information-corresponding content.

(2) The reception apparatus according to (1), wherein the data processing unit
applies the user information-set data to generate access information to the control information file and applies the generated access information to acquire the control information file.

(3) The reception apparatus according to (1), wherein the data processing unit
applies the user information-set data to generate the control information file.

(4) The reception apparatus according to any one of (1) to (3), wherein
the signaling data is an media presentation description, and
the data processing unit sets user information to a user information setting region included in a signaling data recording region corresponding to the user information-corresponding content of the media presentation description.

(5) The reception apparatus according to (4), wherein
the media presentation description includes period information in which control information in a unit of a reproduction time period is recorded, and
the data processing unit sets user information to the user information setting region included in the period information corresponding to the user information-corresponding content of the media presentation description.

(6) The reception apparatus according to any one of (1) to (5), wherein the user information-corresponding content is an advertisement content selected in response to the user information.

(7) The reception apparatus according to any one of (1) to (6), wherein the user information-set data generated by setting user information to the user information setting region is a uniform resource locator that is access information to the control information file or data capable of specifying the uniform resource locator.

(8) The reception apparatus according to any one of (1) to (7), wherein the user information setting region is a data region having a preference demographic interest format for inputting an answer (query parameter) to a question (query).

(9) The reception apparatus according to any one of (1) to (8), wherein the communication unit receives
a media presentation description that is first signaling data having the user information setting region,
a plurality of second signaling data that have user information-set data different from each other, and
a control information file associated with each of the plurality of second signaling data, and
the data processing unit
selects the second signaling data including the user information-set data that coincides with the user information-set data generated by setting user information to the user information setting region of the media presentation description and
acquires a control information file associated with the selected second signaling data.

(10) The reception apparatus according to any one of (1) to (8), wherein the communication unit receives
a media presentation description that is first signaling data having the user information setting region, and
a mapping table between access information to control information files of user information-corresponding contents and user information-set data, and
the data processing unit
extracts data that coincides with the user information-set data generated by setting user information to the user information setting region of the media presentation description from the mapping table, and
selects access information to the control information file associated with the extracted data from the mapping table and acquires a control information file of the user information-corresponding content based on the selected access information.

(11) The reception apparatus according to any one of (1) to (8), wherein the communication unit
further receives a script file for generating the control information file, and
the data processing unit
applies the script file to generate a control information file of the user information-corresponding content based on the user information-set data.

(12) The reception apparatus according to any one of (1) to (8), wherein the communication unit
receives a script file for executing a fetching process of the control information file and the user information-corresponding content into a browser cache, and
the data processing unit
applies the script file to execute a fetching process of the control information file and the user information-corresponding content into the browser cache.

(13) A transmission apparatus, including:
a communication unit configured to transmit signaling data having a user information setting region, a control information file capable of being accessed or generated applying user information-set data generated by setting user information to the user information setting region in a reception apparatus, and
a user information-corresponding content capable of being acquired or regenerated based on description data of the control information file.

(14) The transmission apparatus according to (13), wherein
the signaling data is a media presentation description, and
the media presentation description is configured so as to include period information in which control information in a unit of a reproduction time period is recorded while the user information setting region is included in the period information corresponding to a user information-corresponding content.

(15) The transmission apparatus according to (13) or (14), wherein the user information setting region is a data region having a preference demographic interest format for inputting an answer (query parameter) to a question (query).

(16) The transmission apparatus according to any one of (13) to (15), wherein the communication unit transmits a media presentation description that is first signaling data having the user information setting region, second signaling data including user information-set data, and a control information file associated with each pieces of the second signaling data.

(17) The transmission apparatus according to any one of (13) to (15), wherein the communication unit transmits a media presentation description that is first signaling data having the user information setting region, and a mapping table between access information to the control information files of the user information-corresponding contents and the user information-set data.

(18) The transmission apparatus according to any one of (13) to (15), wherein the communication unit transmits a script file for generating the control information file based on the user information-set data.

(19) A data processing method executed by a reception apparatus, including:

receiving, by a communication unit, signaling data having a user information setting region;

setting, by a data processing unit, user information to the user information setting region and applying the generated user information-set data to acquire a control information file of the user information-corresponding content; and applying, by the data processing unit, description data of the acquired control information file to execute an acquisition process of the user information-corresponding content.

(20) A data processing method executed by a transmission apparatus, including:

transmitting signaling data having a user information setting region;

a control information file capable of being accessed or generated applying user information-set data generated by setting user information to the user information-set region in a reception apparatus; and a user information-corresponding content capable of being acquired or reproduced based on description data of the control information file.

Further, the series of processes described in the specification can be executed by hardware, software or a composite configuration of the hardware and software. Where the processes are executed by software, a program in which the processing sequence is recorded can be installed into a memory in a computer incorporated in hardware for exclusive use and executed or the program can be installed and executed into and by a general purpose computer that can execute various processes. For example, the program can recorded in advance in a recording medium. The program can be not only installed from a recording medium into a computer but also can be received through a network such as a LAN (Local Area Network) or the Internet and installed into a recording medium such as a built-in hard disk.

It is to be noted that the various processes described in the specification can be not only executed in a time series in accordance with the description but also executed in parallel or individually in response to a processing capacity of an apparatus that performs the processes or as occasion demands. Further, the term system in the present specification signifies a logical aggregation configuration of a plurality of apparatus and is not limited to a system in which apparatus of the components are provided in the same housing.

INDUSTRIAL APPLICABILITY

As described above, with the configuration of the embodiment of the present disclosure, an apparatus and a method by which a content such as an advertisement corresponding to a user at the reception apparatus side can be selectively outputted to the reception apparatus are implemented.

In particular, the transmission apparatus transmits signaling data (MPD) having a user information setting region, a control information file capable of being accessed or generated applying user information-set data generated by a process for the MPD, and a user information-corresponding advertisement capable of being acquired and reproduced on the basis of description data of the control information file. The reception apparatus sets user information to the user information setting region of the MPD, applies the generated user information-set data to acquire a control information file of a user information-corresponding advertisement, applies the description data of the acquired control information file to acquire the user information-corresponding advertisement, and outputs the user information-corresponding advertisement.

By the present configuration, an apparatus and a method by which a content such as an advertisement or the like according to a user at the reception apparatus side can be selectively outputted to the reception apparatus can be implemented.

REFERENCE SIGNS LIST

10 Communication system
20 Transmission apparatus
21 Broadcasting server
22 Advertisement server
23 Data distribution server
30 Reception apparatus
31 TV
32 PC
33 Portable terminal
35 Tuner-incorporating reception apparatus
36 Tuner non-incorporating reception apparatus
50 Signaling data
60 AV segment
70 Other data
110 Middleware
111 Communication unit (PHY/MAC)
112 Signaling acquisition unit
113 Signaling analysis unit
114 Segment acquisition unit
120 HTTP proxy server
121 Cache unit
122 Address & link resolution unit
131 Reproduction controlling unit
132 Output controlling unit
201 MPD acquisition unit
202 MPD analysis unit
203 Segment acquisition unit
204 Segment analysis unit
211 Decoding unit
212 Outputting unit
311 to 314 Period information
401 Signaling data
402 Period information file 450 Browser
451 Display processing unit
452 Service worker (SW)
453 Cache
455, 456 Web page
511 to 514 Period information
751 Data processing unit
752 Communication unit
753 Storage unit
771 Data processing unit
772 Communication unit
773 Storage unit
774 Inputting unit
775 Outputting unit
801 CPU
802 ROM
803 RAM
804 Bus
805 Input/output unit
806 Inputting unit
807 Outputting unit
808 Storage unit
809 Communication unit
810 Drive
811 Removable medium

The invention claimed is:

1. A reception apparatus, comprising:
circuitry configured to:
receive signaling data including a media presentation description that includes link information and a plurality of different sets of user information,
modify a user information region of the link information, by adding particular user information of the plurality of different sets of user information, to generate a uniform resource locator (URL),
acquire, based on the generated URL, particular control information associated with a particular content of a plurality of different contents, and
acquire the particular content corresponding to the particular user information, based on description data of the acquired particular control information.

2. The reception apparatus according to claim 1, wherein the circuitry is further configured to:
generate access information to the particular control information based on the generated URL, and
acquire the particular control information based on the generated access information.

3. The reception apparatus according to a claim 1, wherein the circuitry is further configured to set the particular user information in accordance with the media presentation description.

4. The reception apparatus according to claim 1, wherein the media presentation description includes period information in which control information in a unit of a reproduction time period is recorded, and
the circuitry is further configured to set the particular user information in accordance with the period information of the particular content.

5. The reception apparatus according to claim 1, wherein the particular content corresponding to the particular user information is an advertisement content.

6. The reception apparatus according to claim 1, wherein the particular user information includes an interest format for inputting an answer to a question.

7. The reception apparatus according to claim 1, wherein the circuitry is further configured to:
receive a mapping table, associated with the link information, to control information corresponding to the plurality of different contents,
extract data based on the link information from the mapping table, and
select access information to the particular control information associated with the extracted data from the mapping table, and acquire the particular control information of the particular content corresponding to the particular user information based on the selected access information.

8. The reception apparatus according to claim 1, wherein the circuitry is further configured to:
receive a script for generating the particular control information, and
execute the script to generate the particular control information of the content corresponding to the particular user information based on the link information.

9. The reception apparatus according to claim 1, wherein the circuitry is further configured to:
receive a script for executing a fetching process of the particular control information and the particular content corresponding to the particular user information into a browser cache, and
execute the script to execute the fetching process of the particular control information and the particular content corresponding to the particular user information into the browser cache.

10. The reception apparatus according to claim 1, further comprising:
a display configured to reproduce the particular content corresponding to the particular user information.

11. A data processing method executed by a reception apparatus, comprising:
receiving signaling data including a media presentation description that includes link information and a plurality of different sets of user information;
modify a user information region of the link information, by adding particular user information of the plurality of different sets of user information, to generate a uniform resource locator (URL);
acquiring, by circuitry, based on the generated URL, particular control information associated with a particular content of a plurality of different contents; and
acquiring the particular content corresponding to the particular user information, based on description data of the acquired particular control information.

12. The data processing method according to claim 11, wherein the acquiring the particular control information comprises:
generating access information to the particular control information based on the generated URL, and
acquiring the particular control information based on the generated access information.

13. The data processing method according to claim 11, further comprising:
setting the particular user information in accordance with the media presentation description.

14. The data processing method according to claim 11, wherein the particular content corresponding to the particular user information is an advertisement content.

15. The data processing method according to claim 11, wherein the particular user information includes an interest format for inputting an answer to a question.

16. The data processing method according to claim 11, further comprising:

receiving a mapping table, associated with the link information, to control information corresponding to the plurality of different contents;
extracting data based on the link information from the mapping table; and
selecting access information to the particular control information associated with the extracted data from the mapping table and acquiring the particular control information of the particular content corresponding to the particular user information based on the selected access information.

* * * * *